(12) United States Patent
Takatsuka et al.

(10) Patent No.: US 12,532,557 B2
(45) Date of Patent: Jan. 20, 2026

(54) LIGHT RECEIVING ELEMENT, OPTICAL DEVICE, AND ELECTRONIC APPARATUS

(71) Applicant: SONY SEMICONDUCTOR SOLUTIONS CORPORATION, Kanagawa (JP)

(72) Inventors: Takafumi Takatsuka, Kanagawa (JP); Kazuki Hizu, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 644 days.

(21) Appl. No.: 17/904,653

(22) PCT Filed: Feb. 19, 2021

(86) PCT No.: PCT/JP2021/006405
§ 371 (c)(1),
(2) Date: Aug. 19, 2022

(87) PCT Pub. No.: WO2021/172216
PCT Pub. Date: Sep. 2, 2021

(65) Prior Publication Data
US 2023/0094219 A1    Mar. 30, 2023

(30) Foreign Application Priority Data

Feb. 27, 2020  (JP) ................... 2020-032278

(51) Int. Cl.
*H10F 39/00*  (2025.01)
(52) U.S. Cl.
CPC ....... *H10F 39/803* (2025.01); *H10F 39/8053* (2025.01); *H10F 39/811* (2025.01)
(58) Field of Classification Search
CPC . H01L 27/146; H10F 39/803; H10F 39/8053; H10F 39/811
See application file for complete search history.

(56) References Cited

U.S. PATENT DOCUMENTS

| 6,384,663 B2 | 5/2002 | Cova |
| 2001/0020673 A1 | 9/2001 | Zappa |

(Continued)

FOREIGN PATENT DOCUMENTS

| CN | 107063452 A | 8/2017 |
| CN | 107271036 A | 10/2017 |

(Continued)

OTHER PUBLICATIONS

Cova, et al., "Avalanche photodiodes and quenching circuits for single-photon detection", Applied Optics, Optical Society of America, Washington, DC, US, vol. 35, No. 12, Apr. 20, 1996, pp. 1956-1976.

(Continued)

*Primary Examiner* — Georgia Y Epps
*Assistant Examiner* — Don J Williams
(74) *Attorney, Agent, or Firm* — CHIP LAW GROUP

(57) ABSTRACT

A light receiving element capable of reducing at least either power consumption or a dead time while reducing an input voltage to a readout circuit is proposed. There is provided a light receiving element (200) including a photon response multiplication part (210) that includes a charge multiplication region capable of multiplying a charge generated in response to incidence of a photon, a first resistor part (211) that is connected at one end to one end of the photon response multiplication part and has a resistance value larger than a resistance value of the photon response multiplication part, a second resistor part (212) that is connected at one end to the other end of the first resistor part, and a readout unit (230) that is connected to the other end of the first resistor part and reads an output from the photon response multiplication part via the first resistor part.

20 Claims, 36 Drawing Sheets

(56) References Cited

U.S. PATENT DOCUMENTS

| | | | |
|---|---|---|---|
| 2001/0020863 A1 | 9/2001 | Cova | |
| 2004/0081050 A1* | 4/2004 | Yamamoto | G11B 7/13 369/53.26 |
| 2011/0134264 A1* | 6/2011 | Nishihara | H10F 39/014 348/222.1 |
| 2011/0147567 A1* | 6/2011 | Grazioso | H10F 39/803 250/208.1 |
| 2013/0321039 A1* | 12/2013 | Soeda | B06B 1/0207 327/111 |
| 2013/0334434 A1 | 12/2013 | Nyman | |
| 2014/0231951 A1* | 8/2014 | Yoon | H10F 77/122 438/59 |
| 2016/0254307 A1 | 9/2016 | Nagano | |
| 2017/0089756 A1 | 3/2017 | Scott | |
| 2018/0217278 A1 | 8/2018 | O'Neill | |
| 2018/0261712 A1* | 9/2018 | Moktadir | H10F 77/1248 |
| 2019/0204461 A1 | 7/2019 | Lerche | |

FOREIGN PATENT DOCUMENTS

| | | |
|---|---|---|
| CN | 107851655 A | 3/2018 |
| CN | 110196106 A | 9/2019 |
| CN | 110249624 A | 9/2019 |
| CN | 110308451 A | 10/2019 |
| CN | 110324544 A | 10/2019 |
| CN | 110709730 A | 1/2020 |
| EP | 3570534 A1 | 11/2019 |
| JP | 2006179587 A | 7/2006 |
| JP | 2015117970 A | 6/2015 |
| JP | 2017-520134 A | 7/2017 |
| JP | 2018179732 A | 11/2018 |
| JP | 2019-103121 A | 6/2019 |
| JP | WO2018211801 A1 | 2/2020 |
| TW | 201340304 A | 10/2013 |
| WO | WO-2018088478 A1 | 5/2018 |
| WO | WO-2019087783 A1 | 5/2019 |
| WO | WO-2021172216 A1 | 9/2021 |

OTHER PUBLICATIONS

International Search Report and Written Opinion of PCT Application No. PCT/JP2021/006405, issued on May 25, 2021, 10 pages of ISRWO.

Andrea Gallivanoni et al: "Progress in Quenching Circuits for Single Photon Avalanche Diodes", IEEE Transactions on Nuclear Science, IEEE, USA, vol. 57, No. 6, Dec. 15, 2010 (Dec. 15, 2010), pp. 3815-3826, XP011339767, ISSN: 0018-9499, DOI: 10.1109/TNS.2010.2074213 * p. 3820, col. 2, paragraph IV—p. 3821, col. 1;paragraph V; figure 15 ** p. 3823, col. 2, paragraph V;figure 16.

* cited by examiner

LIGHT RECEIVING ELEMENT, OPTICAL DEVICE, AND ELECTRONIC APPARATUS

CROSS REFERENCE TO RELATED APPLICATIONS

This application is a U.S. National Phase of International Patent Application No. PCT/JP2021/006405 filed on Feb. 19, 2021, which claims priority benefit of Japanese Patent Application No. JP 2020-032278 filed in the Japan Patent Office on Feb. 27, 2020. Each of the above-referenced applications is hereby incorporated herein by reference in its entirety.

TECHNICAL FIELD

The present disclosure relates to a light receiving element, an optical device, and an electronic apparatus.

BACKGROUND ART

As one of optical elements configured to photoelectrically convert received light into an electric signal and output the electric signal, a single photon avalanche diode (hereinafter referred to as a SPAD) that uses avalanche multiplication is known. The avalanche multiplication refers to a phenomenon in which an electron and a hole generated by incidence of a photon are accelerated by a high electric field, and a new electron and a hole are generated one after another. Because a set of an electron and a hole is increased many times and a large current flows, the SPAD using this has an advantage that weak light can be detected.

CITATION LIST

Non-Patent Document

Non-Patent Document 1: APPLIED OPTICS, Vol. 35, No. 12, 20 Apr. 1996

SUMMARY OF THE INVENTION

Problems to be Solved by the Invention

During the operation of the SPAD, a reverse bias voltage of, for example, several 10 V is applied between the cathode and the anode of the SPAD. Thus, a change in a cathode potential caused by the large current generated by the SPAD may also be large. Since the change in the cathode potential is read out by a readout circuit, an input voltage of the readout circuit also greatly changes. In this case, it is necessary to suppress the change to be smaller than the withstand voltage of the readout circuit. Further, in the SPAD, since the large current flows due to avalanche amplification, power consumption tends to increase.

In order to make the input voltage to the readout circuit smaller than the withstand voltage and lower the power consumption, resistance voltage division may be used (Non-Patent Document 1). However, a time constant that is determined by a resistance value of a resistor for the resistance voltage division and by a cathode parasitic capacitance of the SPAD and an input parasitic capacitance to the readout circuit becomes large, and a recharge period for the SPAD may become long. The recharge period is what is called a dead time in which the SPAD cannot detect a photon. That is, in the resistance voltage division, even if the input voltage to the readout circuit can be made smaller than the withstand voltage and the power consumption can be reduced, the disadvantage of an increase in the dead time may occur.

Accordingly, the present disclosure proposes a light receiving element, an optical device, and an electronic apparatus capable of reducing at least either power consumption or a dead time while reducing an input voltage to a readout circuit.

Solutions to Problems

According to the present disclosure, there is provided a light receiving element including a photon response multiplication part that includes a charge multiplication region capable of multiplying a charge generated in response to incidence of a photon, a first resistor part that is connected at one end to one end of the photon response multiplication part and has a resistance value larger than a resistance value of the photon response multiplication part, a second resistor part that is connected at one end to the other end of the first resistor part, and a readout unit that is connected to the other end of the first resistor part and reads an output from the photon response multiplication part via the first resistor part.

Further, according to the present disclosure, there is provided an optical device including a plurality of light receiving elements that is arranged in a matrix, in which each of the plurality of light receiving elements includes a photon response multiplication part that includes a charge multiplication region capable of multiplying a charge generated in response to incidence of a photon, a first resistor part that is connected at one end to one end of the photon response multiplication part and has a resistance value larger than a resistance value of the photon response multiplication part, a second resistor part that is connected at one end to the other end of the first resistor part, and a connection point to which the other end of the first resistor part, the one end of the second resistor part, and a readout unit that reads an output from the photon response multiplication part are connected.

Furthermore, according to the present disclosure, there is provided an electronic apparatus including an optical system, and an optical device in which a plurality of light receiving elements is arranged in a matrix, in which each of the plurality of light receiving elements includes a photon response multiplication part that includes a charge multiplication region capable of multiplying a charge generated in response to incidence of a photon that has transmitted through the optical system, a first resistor part that is connected at one end to one end of the photon response multiplication part and has a resistance value larger than a resistance value of the photon response multiplication part, a second resistor part that is connected at one end to the other end of the first resistor part, and a connection point to which the other end of the first resistor part, the one end of the second resistor part, and a readout unit that reads an output from the photon response multiplication part are connected.

MODE FOR CARRYING OUT THE INVENTION

Figure 1:
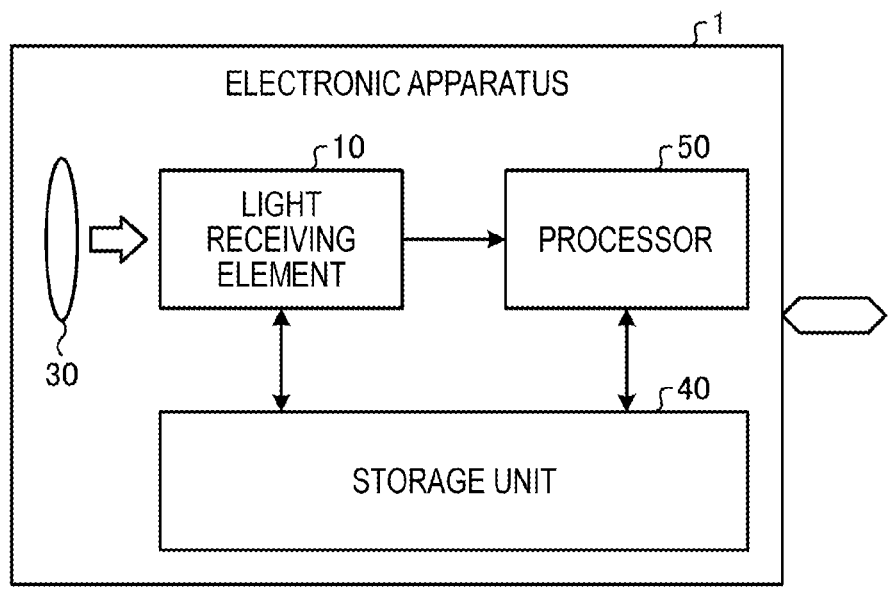
FIG. 1 is a block diagram illustrating a schematic configuration example of an electronic apparatus to which an optical device according to an existing technology is applied.

Hereinafter, embodiments of the present disclosure will be described in detail on the basis of the drawings. Note that in each of the following embodiments, the same parts are denoted by the same reference numerals, and redundant description will be omitted.

Prior to describing the embodiments of the present disclosure, in order to facilitate understanding of the embodiments of the present disclosure, existing technologies related to the embodiments of the present disclosure will be described.

FIG. 1 is a block diagram illustrating a schematic configuration example of an electronic apparatus to which an optical device according to an existing technology is applied. As illustrated in FIG. 1, the electronic apparatus 1 includes, for example, an imaging lens 30, an optical device 10, a storage unit 40, and a processor 50.

The imaging lens 30 is an example of an optical system that condenses incident light and forms an image thereof on a light receiving surface of the optical device 10. The light receiving surface may be a surface on which pixels are arranged in a matrix in the optical device 10. The optical device 10 photoelectrically converts the incident light to generate image data. Further, the optical device 10 executes predetermined signal processing such as noise removal and white balance adjustment on the generated image data.

The storage unit 40 includes, for example, a flash memory, a dynamic random access memory (DRAM), a static random access memory (SRAM), or the like, and records image data or the like input from the optical device 10.

The processor 50 is configured using, for example, a central processing unit (CPU) or the like, and may include an application processor that executes an operating system, various application software, and the like, a graphics processing unit (GPU), a baseband processor, and the like. The processor 50 executes various processes as necessary on image data input from the optical device 10, image data read from the storage unit 40, or the like, executes display to the user, and transmits the image data to the outside via a predetermined network.

Figure 2:
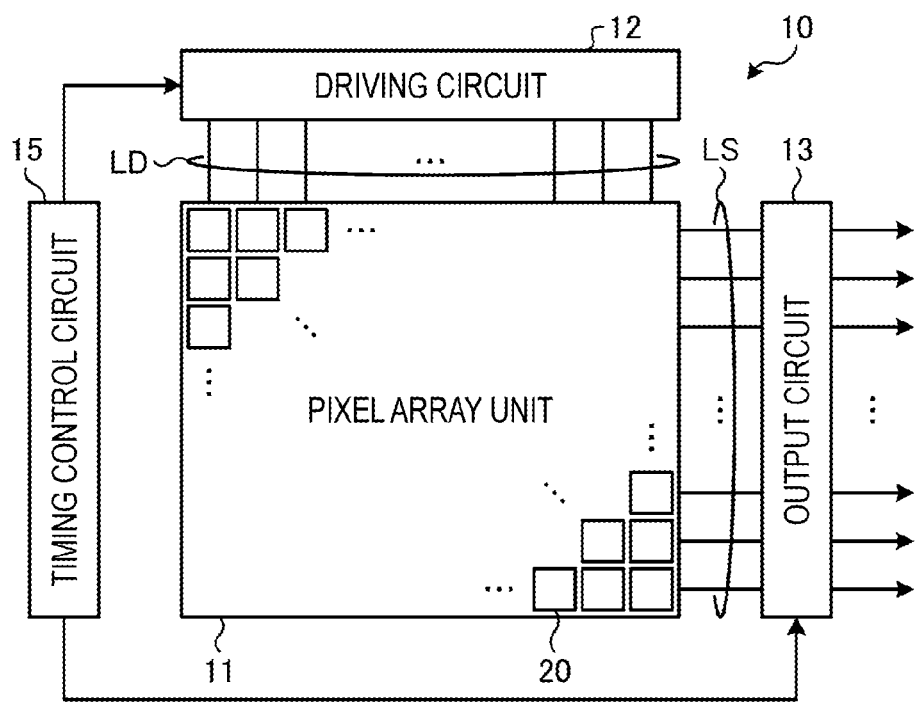
FIG. 2 is a block diagram illustrating a schematic configuration example of the optical device according to the existing technology.

FIG. 2 is a block diagram illustrating a schematic configuration example of the above-described optical device 10.

As illustrated, the optical device 10 includes a pixel array unit 11, a timing control circuit 15, a driving circuit 12, and an output circuit 13.

The pixel array unit 11 includes a plurality of pixels 20 arranged in a matrix. To the plurality of pixels 20, a pixel driving line LD (vertical direction in the drawing) is connected for every column, and an output signal line LS (horizontal direction in the drawing) is connected for every row. One end of the pixel driving line LD is connected to an output end corresponding to each column of the driving circuit 12, and one end of the output signal line LS is connected to an input end corresponding to each row of the output circuit 13.

The driving circuit 12 includes a shift register, an address decoder, and the like, and drives the pixels 20 of the pixel array unit 11 all at once or in units of columns or the like. The driving circuit 12 applies a selection control voltage to the pixel driving line LD corresponding to the column to be read, to thereby select the pixels 20 to be used for detecting incidence of photons in units of columns. A signal (referred to as a detection signal) output from each pixel 20 of the column selectively scanned by the driving circuit 12 is input to the output circuit 13 through each of the output signal lines LS. The output circuit 13 outputs the detection signal input from each pixel 20 to the storage unit 40 or the processor 50 as a pixel signal.

The timing control circuit 15 includes a timing generator or the like that generates various timing signals, and controls the driving circuit 12 and the output circuit 13 on the basis of the various timing signals generated by the timing generator.

Figure 3A:
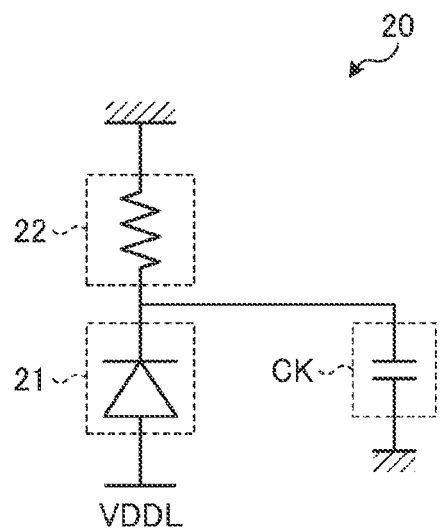
FIG. 3A is a block diagram illustrating an example of a schematic configuration of a pixel of the optical device according to the existing technology.

FIG. 3A is a block diagram illustrating an example of a schematic configuration of the pixel 20 of the pixel array unit 11. As illustrated, the pixel 20 includes a photodiode 21 and a quench resistor 22. In this pixel 20, the photodiode 21 is a single photon avalanche diode (hereinafter referred to as a SPAD 21). In the SPAD 21, even if one photon is incident, a large current is generated by avalanche multiplication, and this current is output as an electric signal. The operation of the SPAD 21 will be described later.

In the illustrated example, the anode of the SPAD 21 is connected to a predetermined power supply, and the cathode of the SPAD 21 is connected to one end of the quench resistor 22. The other end of the quench resistor 22 is grounded. Thus, a reverse bias voltage VDDL can be applied across the SPAD 21 as described later. Further, a cathode parasitic capacitance CK as a parasitic capacitance is generated on the cathode side of the SPAD 21. The cathode parasitic capacitance CK corresponds to a combined capacitance of the capacitance of the SPAD 21, a capacitance generated between the quench resistor 22 and a surrounding insulating layer, a capacitance generated by a wiring connecting the SPAD 21 and the quench resistor 22, a capacitance of an element such as an inverter included in a readout circuit 23, and the like.

Figure 3B:
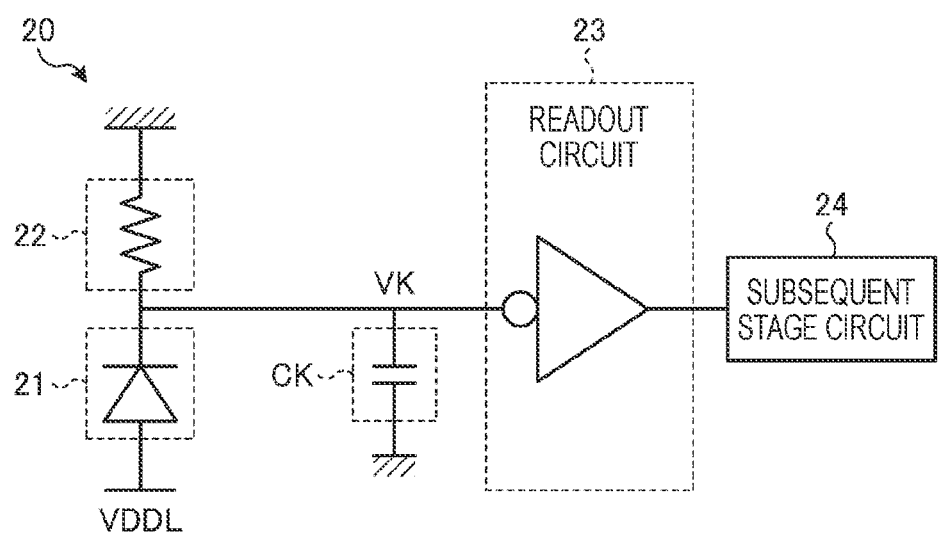
FIG. 3B is a block diagram illustrating another example of the schematic configuration of the pixel of the optical device according to the existing technology.

Referring to FIG. 3B, the readout circuit 23 is connected to a connection point between the SPAD 21 and the quench resistor 22 in the pixel 20. The readout circuit 23 can include, for example, an inverter circuit, and reads a change in potential (that is, cathode potential) at a connection point between the SPAD 21 and the quench resistor 22 as described later.

Further, in the pixel 20, a circuit 24 in a subsequent stage is connected to an output end of the readout circuit 23. The circuit 24 in the subsequent stage can include, for example, a digital counter circuit, with which the pixel 20 can function as a photon counter element. In this case, image data can be generated on the basis of an output signal corresponding to the number of photons detected in each pixel 20. That is, the optical device 10 can function as an imaging sensor.

Further, the circuit 24 in the subsequent stage can include a time-to-digital converter (TDC) instead of the digital counter circuit. The TDC circuit can generate a digital signal indicating a time difference between a predetermined reference signal having a predetermined reference frequency and a detection signal based on the reference signal. In a case where the circuit 24 in the subsequent stage includes the TDC circuit, the optical device 10 can function as a distance measurement element by time of flight (ToF) method, for example.

Figure 3C:
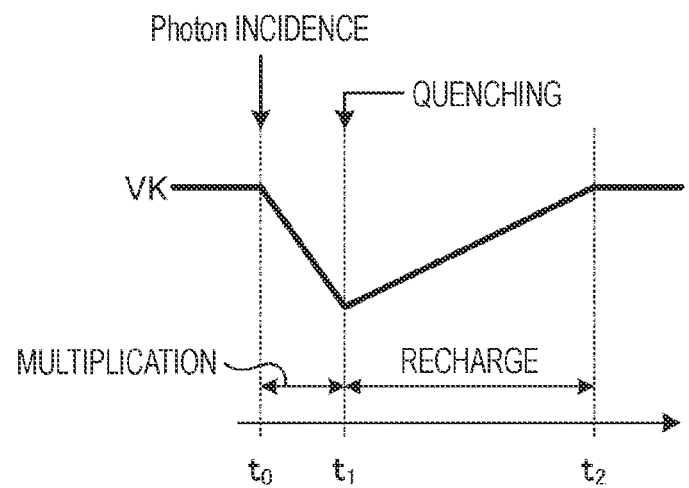
FIG. 3C is a graph schematically illustrating a change in cathode potential when one photon is incident on a photodiode of the pixel of the optical device according to the existing technology.
Figure 3D:
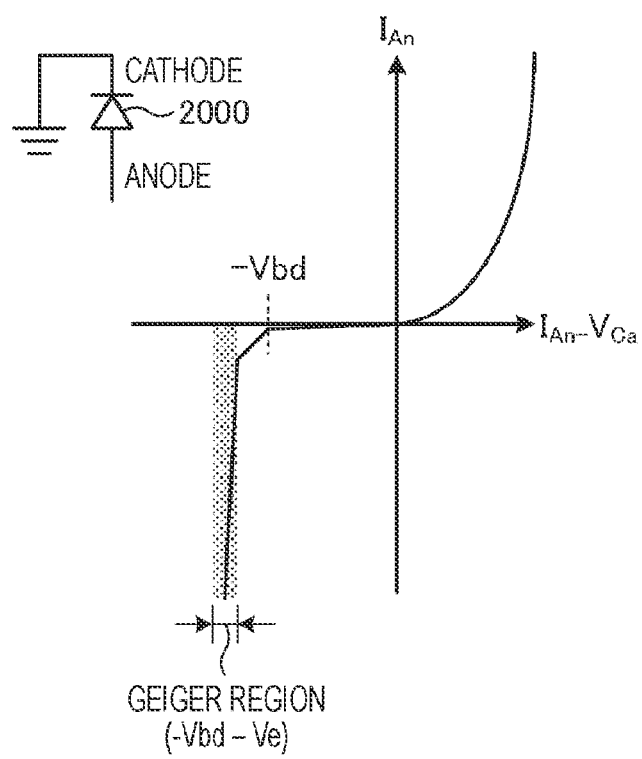
FIG. 3D is a graph schematically illustrating voltage-current characteristics of the photodiode of an image pixel of the optical device according to the existing technology.

Next, the operation of the SPAD 21 will be described with reference to FIGS. 3C and 3D. FIG. 3C is a graph schematically illustrating a change in a cathode potential VK of the SPAD 21 when one photon is incident on the SPAD 21. FIG. 3D is a graph schematically illustrating voltage-current characteristics of the SPAD 21. In FIG. 3D, the horizontal axis indicates a voltage applied across the anode and the cathode of the SPAD 21. This applied voltage is represented by $V_{An}-V_{Ca}$ where an anode potential of the SPAD 21 is $V_{An}$ and the cathode potential is $V_{Ca}$. Further, in FIG. 3D, the vertical axis indicates the current $I_{An}$ flowing through the SPAD 21 in a forward direction (direction from the anode to the cathode).

In a case where a forward bias voltage is applied to the SPAD 21, the current $I_{An}$ flows in the forward direction and its current value increases as the applied voltage increases, as illustrated in FIG. 3D. On the other hand, in a case where the reverse bias voltage is applied to the SPAD 21, when the voltage is low, the current $I_{An}$ does not flow due to rectifying action of the SPAD 21. However, when the reverse bias voltage becomes equal to or lower than a breakdown voltage −Vbd, the avalanche multiplication occurs, and the large current $I_{An}$ flows in the reverse direction. Here, a region between the breakdown voltage (−Vbd) and a voltage (−Vbd−Ve) that is further lower than the breakdown voltage by a voltage Ve (also referred to as an excess voltage Ve) is called a Geiger region. In the Geiger region, gain due to avalanche multiplication is theoretically infinite. By applying the reverse bias voltage of, for example, several 10 V to both ends of the SPAD 21, the SPAD 21 can operate in the Geiger region.

Here, in a case where a predetermined voltage corresponding to the Geiger region is applied across the anode of the SPAD 21 and a ground terminal of the quench resistor 22 from the predetermined power supply, when a photon (may be one photon) is incident on the SPAD 21 (at to in FIG. 3C), an electron-hole pair is generated by the photon, this electron-hole pair is accelerated by a high electric field due to the reverse bias voltage, and such electron-hole pairs are generated one after another. That is, the avalanche multiplication occurs. Thus, a large current flows in the opposite direction.

This current also flows through the quench resistor 22, and thus a voltage drop by the quench resistor 22 occurs. Thus, the applied voltage that is applied to the SPAD 21 decreases. Here, when (the absolute value of) the voltage applied across the cathode and the anode of the SPAD 21 becomes lower than the breakdown voltage (absolute value |Vbd|), the avalanche amplification stops (time $t_1$). A phenomenon in which the avalanche multiplication is stopped is called quenching.

Thereafter, the current is supplied to the SPAD 21 through the quench resistor 22, and the SPAD 21 is charged. This charge is called recharge. The recharge is performed over a certain period (time $t_1$ to $t_2$) with a time constant determined by the cathode parasitic capacitance CK (FIGS. 3A and 3B). When the recharge is completed (time $t_2$), the voltage applied to the SPAD 21 returns to the voltage corresponding to the Geiger region, and the SPAD 21 can operate in this region again. As described above, in a case where the photon is incident on the SPAD 21, the cathode potential VK of the SPAD 21 changes in a pulse shape as illustrated in FIG. 3C. Such a change is read by the readout circuit 23, and consequently, the photon is detected. Note that since the SPAD 21 cannot detect the photon during the recharge period, this period is referred to as a dead time.

First Embodiment

[Configuration of Optical Device According to First Embodiment]

Figure 4A:
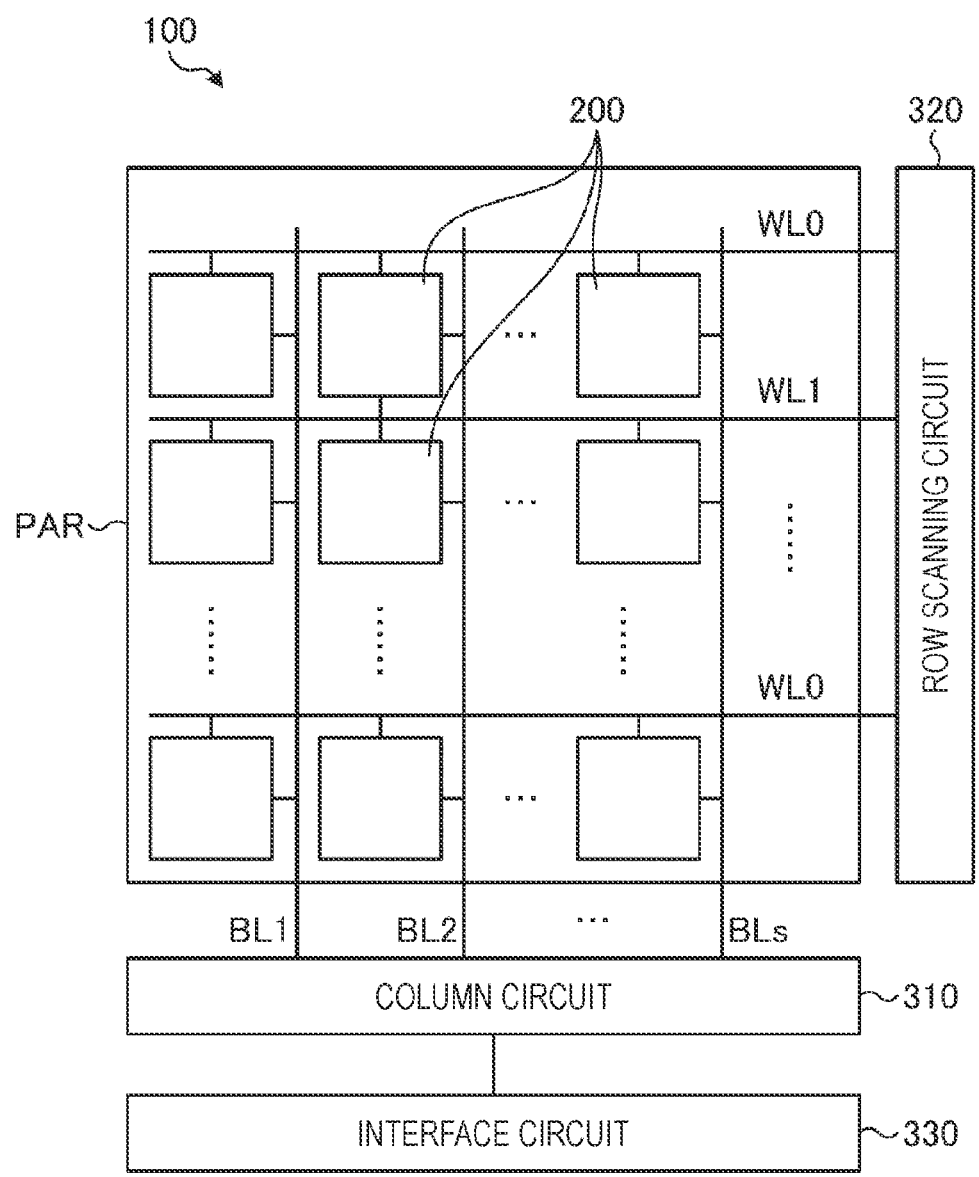
FIG. 4A is a block diagram illustrating a schematic configuration example of an optical device according to a first embodiment.

Next, a configuration example of the optical device according to a first embodiment of the present disclosure will be described. FIG. 4A is a block diagram illustrating a schematic configuration example of the optical device according to the first embodiment. As illustrated, the optical device 100 includes a pixel array unit PAR, a column circuit 310, a row scanning circuit 320, and an interface circuit 330.

The pixel array unit PAR includes a plurality of pixels (light receiving elements) 200 arranged in a matrix. Bit lines $BL_0, BL_1, \ldots$, and $BL_S$ (hereinafter referred to as the bit line BL in a case where it is not particularly necessary to distinguish) are connected to the plurality of pixels 200 for every column, and word lines $WL_0, WL_1, \ldots$, and $WL_N$ (hereinafter referred to as a word line WL in a case where it is not particularly necessary to distinguish) are connected to the plurality of pixels for every row. One end of the bit line BL is connected to an output end corresponding to each column of the column circuit 310, and one end of the word line WL is connected to an input end corresponding to each row of the row scanning circuit 320. Note that for convenience of description, the vertical direction is referred to as a column direction and the horizontal direction is referred to as a row direction in the drawing.

The row scanning circuit 320 drives the pixels 200 of the pixel array unit PAR all at once or in units of columns or the like. The row scanning circuit 320 applies the selection control voltage to the word line WL corresponding to the column to be read out, to thereby select the pixels 200 to be used for detecting incidence of photons in units of columns. A signal (referred to as a detection signal) output from each pixel 200 of the column selectively scanned by the row scanning circuit 320 is input to the column circuit 310 through each of the bit lines BL. The column circuit 310 generates a digital signal by digitally converting the detection signal. The generated digital signal is output to the outside through the interface circuit 330. Note that the column circuit 310 and the row scanning circuit 320 are controlled by a timing signal from a timing control circuit (not illustrated).

[Configuration of Pixel of Optical Device According to First Embodiment]

Figure 4B:
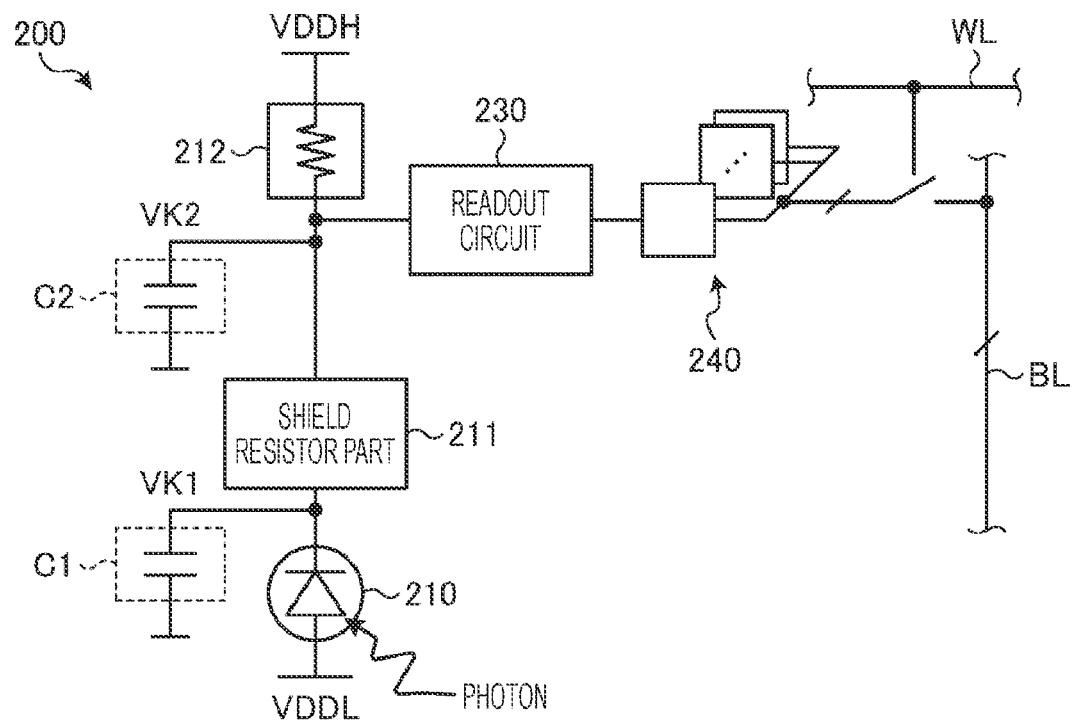
FIG. 4B is a block diagram illustrating a schematic configuration example of a pixel in a pixel array unit of the optical device according to the first embodiment.

FIG. 4B is a block diagram illustrating a schematic configuration example of the pixel 200 in the pixel array unit PAR of the optical device 100 according to the present embodiment. As illustrated, the pixel 200 includes a photodiode 210, a shield resistor part 211, and a quench resistor part 212. The photodiode 210 is a SPAD in the present embodiment, and will be hereinafter referred to as a SPAD 210. The SPAD 210 multiplies a charge generated by photoelectric conversion in response to incidence of one photon by the avalanche multiplication (also referred to as avalanche amplification) to generate a large current, and outputs the current as an electric signal. However, the photodiode 210 is not limited to the SPAD and may be a silicon photomultiplier tube.

One end of the shield resistor part 211 is connected to a cathode of the SPAD 210, and the other end of the shield resistor part 211 is connected to one end of the quench resistor part 212. That is, in the pixel 200, a series circuit is formed in which the SPAD 210, the shield resistor part 211, and the quench resistor part 212 are connected in series.

The shield resistor part 211 and the quench resistor part 212 can be formed by, for example, high-resistance polysilicon. Further, the shield resistor part 211 and the quench resistor part 212 may be formed as metal resistors. As a material for the metal resistor, what is called cermet-based materials such as $TaSiO_2$ and $NbSiO_2$ are exemplified. Here, when a resistance value of the shield resistor part 211 is denoted by Rsh and a resistance value between a cathode and an anode of the SPAD 210 is $R_{ON}$, a relationship of $R_{ON}$<Rsh is satisfied. That is, the shield resistor part 211 is formed to have a resistance value larger than the resistance value between the cathode and the anode of the SPAD 210. Effects caused by such a relationship will be described later.

Further, when a resistance value of the quench resistor part 212 is denoted by Rq, a relationship of Rsh<Rq is satisfied. That is, the shield resistor part 211 and the quench resistor part 212 are formed such that the resistance value Rq of the quench resistor part 212 is larger than the resistance value Rsh of the shield resistor part 211. Effects caused by such a relationship will be described later.

Further, as illustrated in FIG. 4B, a parasitic capacitance C1 is generated on the cathode side of the SPAD 210. The parasitic capacitance C1 corresponds to a combined capacitance such as a capacitance of the SPAD 210 and a capacitance generated by a wiring connecting the SPAD 210 and the shield resistor part 211. Moreover, a parasitic capacitance C2 is generated between the shield resistor part 211 and the quench resistor part 212. The parasitic capacitance C2 corresponds to a combined capacitance of a capacitance generated between the shield resistor part 211 and a surrounding insulating layer, a capacitance generated between the quench resistor part 212 and a surrounding insulating layer, a capacitance generated by a wiring connecting the shield resistor part 211 and the quench resistor part 212, a capacitance of an element such as an inverter included in a readout circuit 230, and the like. Note that since many circuit elements exist such as the shield resistor part 211, the quench resistor part 212, and the readout circuit 230 (described later) around the parasitic capacitance C2 as compared with the periphery of the parasitic capacitance C1, the capacitance (value) of the parasitic capacitance C2 tends to be larger than the capacitance (value) of the parasitic capacitance C1.

One end of the readout circuit 230 is connected to a connection point between the shield resistor part 211 and the quench resistor part 212. The readout circuit 230 can include, for example, an inverter circuit. The readout circuit 230 reads a change in potential at the connection point between the shield resistor part 211 and the quench resistor part 212 as described later.

Further, in the pixel 200, the digital counter circuit 240 is connected to an output end of the readout circuit 230. The digital counter circuit 240 counts the number of changes in potential at the connection point between the shield resistor part 211 and the quench resistor 22 read by the readout circuit 230, that is, the number of photons incident on the SPAD 210, and outputs an output signal corresponding to the counted number. When a selection signal is input from the row scanning circuit 320 (FIG. 4A) to the pixel 200 through the word line WL, the output signal is output from the digital counter circuit 240 to the column circuit 310 through the bit line BL. By converting the output signal into luminance, the optical device 100 can function as an image pickup element.

Note that the TDC circuit may be connected to the subsequent stage of the readout circuit 230 instead of the digital counter circuit. With this configuration, distance measurement by a direct ToF method can be performed on the basis of the difference between a light emission timing and a light reception timing on the basis of the output from the readout circuit 230.

Further, the optical device 100 can also function as a distance measurement unit that performs distance measurement by an indirect ToF method in which a light receiving unit receives light for each phase according to light emission of a predetermined light source unit and calculates distance information on the basis of a light reception signal for each phase output by the light receiving unit by light reception for each phase.

As illustrated in FIG. 4B, a series circuit including the SPAD 210, the shield resistor part 211, and the quench resistor part 212 is connected to the predetermined power supply, the anode of the SPAD 210 is maintained at the potential VDDL, and the other end of the quench resistor part 212 (the end opposite to the one end connected to the shield resistor part 211) is maintained at a potential VDDH. That is, a voltage corresponding to the potential VDDH–potential VDDL is applied to the series circuit including the SPAD 210, the shield resistor part 211, and the quench resistor part 212. Here, since the potential VDDH is higher than the potential VDDL, the reverse bias voltage is applied to the SPAD 210. During the operation of the pixel 200, this applied voltage is set to the predetermined voltage corresponding to the Geiger region described above.

[Operation of pixel of optical device according to first embodiment] Next, the operation of the pixel 200 will be described with reference to FIGS. 5A, 5B, 5C, 5D, and 5E. In FIGS. 5B, 5C, 5D, and 5E, the pixel 200 is schematically illustrated similarly to FIG. 4B, but the digital counter circuit 240 (or TDC circuit), the word line WL, the bit line BL, and the like are omitted.

First, the predetermined voltage is applied to the series circuit by the SPAD 210, the shield resistor part 211, and the quench resistor part 212 by the predetermined power supply. That is, the (reverse bias) voltage corresponding to the Geiger region is applied to the SPAD 210. When photons are incident on the SPAD 210 in this state (time $t_0$ in FIG. 5A), the avalanche multiplication occurs, and the large current flows from the cathode to the anode in the SPAD 210. Here, in FIG. 5B, as a current I2 flowing out from the parasitic capacitance C2 is schematically represented by a thin arrow and a current I1 flowing out from the parasitic capacitance C1 is schematically represented by a thick line, the large current flowing from the cathode to the anode of the SPAD 210 is mainly supplied from the parasitic capacitance C1. This is because the shield resistor part 211 having the resistance value Rsh larger than the resistance value $R_{ON}$ between the cathode and the anode of the SPAD 210 is provided between the parasitic capacitance C2 and the SPAD 210. In other words, while charges accumulated in the parasitic capacitance C1 easily move to the SPAD 210, charges accumulated in the parasitic capacitance C2 are hindered by the shield resistor part 211 and hardly moves to the SPAD 210, and thus the current is mainly supplied from the parasitic capacitance C1 to the SPAD 210 during the avalanche multiplication.

Figure 5A:
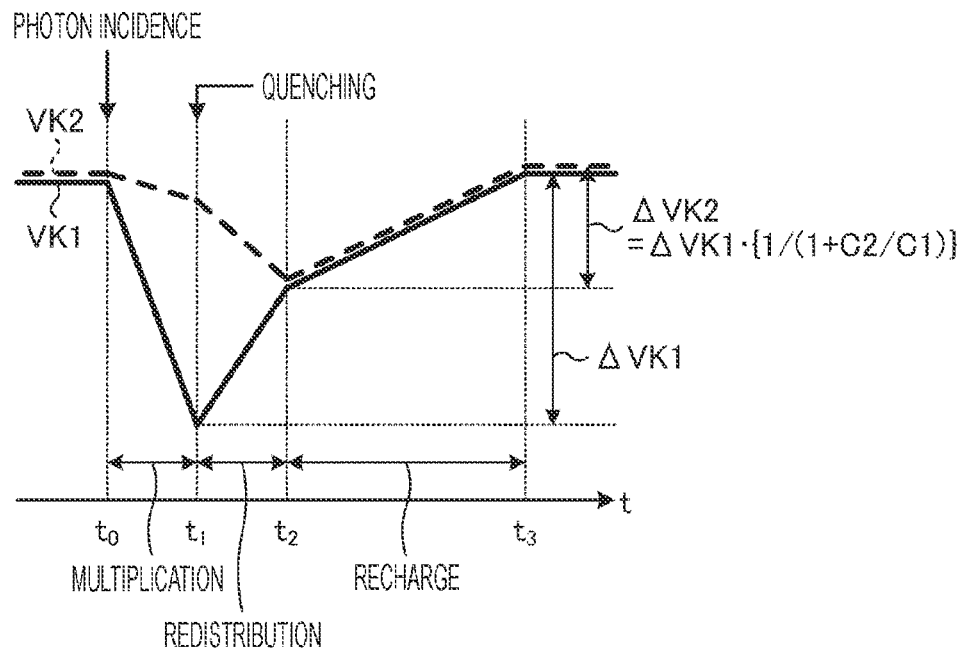
FIG. 5A is a graph schematically illustrating a change in a cathode voltage when one photon is incident on a single photon avalanche diode included in the pixel of the pixel array unit of the optical device according to the first embodiment.

During the avalanche multiplication, as illustrated in the period $t_0$ to $t_1$ in FIG. 5A, a cathode potential VK1 of the SPAD 210 decreases due to the large current generated by the avalanche multiplication. When the voltage applied across the SPAD 210 becomes lower than the breakdown voltage as the cathode potential VK1 decreases, the quenching occurs (time $t_1$ in FIG. 4C). Further, at this time, the charges accumulated in the parasitic capacitance C1 have been discharged, and the supply of the current I1 from the parasitic capacitance C1 to the SPAD 210 is also stopped as illustrated in FIG. 5C.

Note that, as illustrated in FIG. 5A, in the avalanche multiplication period ($t_0$ to $t_1$), a potential VK2 between the shield resistor part 211 and the quench resistor part 212 does not drop as much as the potential VK1. This is because the current hardly flows from the parasitic capacitance C2 as described above.

The quenching occurs and charge redistribution starts between the parasitic capacitance C1 and the parasitic capacitance C2 (time $t_1$ in FIG. 5A). That is, as illustrated in FIG. 5D, the charges remaining in the parasitic capacitance C2 move to the parasitic capacitance C1 through the shield resistor part 211. Here, since the resistance value Rq of the quench resistor part 212 is larger than the resistance value Rsh of the shield resistor part 211, a current I3 flowing through the quench resistor part 212 only slightly contributes to the redistribution of charges. Thus, the charge redistribution is mainly performed between the parasitic capacitance C2 and the parasitic capacitance C1. When the voltage between the parasitic capacitance C1 and the voltage between the parasitic capacitance C2 become equal (when the potential VK1 and the potential VK2 become equal), the redistribution ends (time $t_2$).

When the redistribution ends, the recharge is started. That is, since the current I2 from the parasitic capacitance C2 does not flow, as illustrated in FIG. 5E, the recharge of the SPAD 210 proceeds by the current I3 flowing through the quench resistor part 212. Here, there is no charge loss in redistribution of charges between the parasitic capacitance C2 and the parasitic capacitance C1, and thus the charge amount necessary for recharge is equal to C1ΔVK1 consumed by the avalanche multiplication. That is, a charge amount equal to C1ΔVK1 is supplied to the SPAD 210 by the current I3. When the recharge ends (time $t_3$), the SPAD 210 becomes capable of detecting a photon again.

[Effects of Operation of Pixel of Optical Device According to First Embodiment]

Figure 6A:
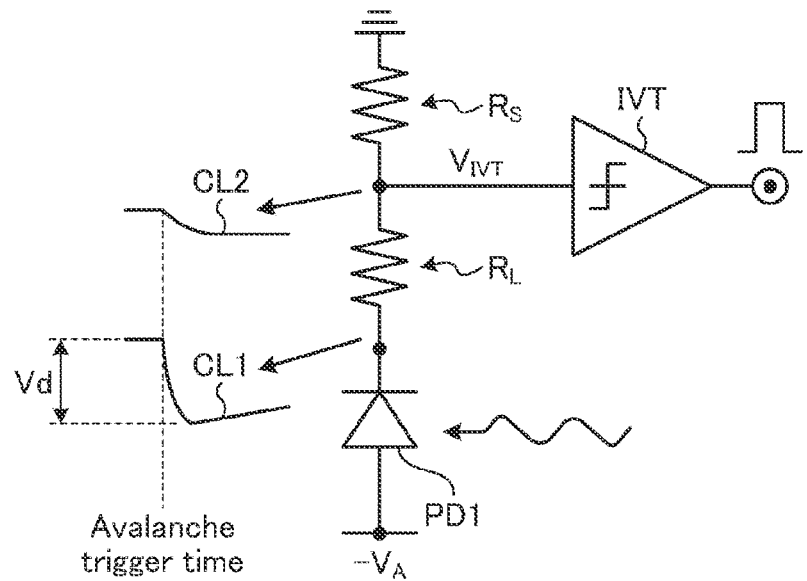
FIG. 6A is a diagram illustrating a configuration example of a pixel according to a conventional example.

Next, effects generated by the operation of the pixel 200 of the optical device according to the first embodiment will be described in comparison with a conventional example. FIG. 6A is a diagram illustrating a configuration example of a pixel according to the conventional example, and this configuration example is substantially the same as the configuration disclosed in Non-Patent Document 1. As illustrated, in the pixel of the conventional example, an avalanche photodiode PD1, a resistor $R_L$, and a resistor $R_S$ are connected in series. Further, an inverter IVT is connected to a connection point between the resistor $R_L$ and the resistor $R_S$. In this configuration, one end of the resistor $R_S$ (the end opposite to the connection point between the resistor $R_S$ and the resistor $R_L$) is grounded, and the reverse bias voltage (for example, several 10 V) is applied to the avalanche photodiode PD1. When a photon is incident on the avalanche photodiode PD1 and the avalanche multiplication occurs, a voltage drop occurs in the avalanche photodiode PD1 as indicated by a curve CL1 in FIG. 6A. On the other hand, with this voltage drop, the voltage at the connection point between the resistor $R_L$ and the resistor $R_S$, that is, a voltage $V_{IVT}$ applied to an input end of the inverter IVT also decreases (curve CL2 in FIG. 6A).

Here, when the voltage drop in the avalanche photodiode PD1 due to the avalanche multiplication is Vd, the resistance value of the resistor $R_L$ is RQ1, and the resistance value of the resistor $R_S$ is denoted by RQ2, the voltage $V_{IVT}$ is expressed by the following expression.

$$V_{IVT} = Vd \times \{1/(1+RQ1/RQ2)\}$$

That is, the voltage $V_{IVT}$ applied to the input end of the inverter IVT is reduced more than the voltage drop Vd in the avalanche photodiode PD1 by the ratio RQ1/RQ2 of the resistance value RQ1 and the resistance value RQ2. In particular, the voltage $V_{IVT}$ decreases as the ratio RQ1/RQ2 increases. In general, the voltage applied to the avalanche photodiode PD1 reaches several 10 V, and thus the voltage drop Vd during the avalanche amplification may also exceed the withstand voltage of the inverter IVT, for example. However, by appropriately adjusting the ratio between the resistance value RQ1 of the resistor $R_L$ and the resistance value RQ2 of the resistor $R_S$, the voltage $V_{IVT}$ can be made lower than the withstand voltage of the inverter IVT, and the inverter IVT can be protected.

Figure 6B:
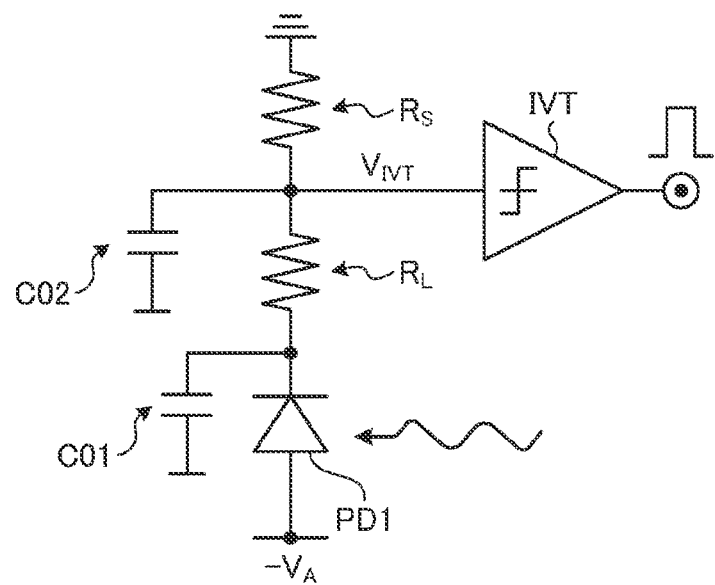
FIG. 6B is a diagram illustrating a configuration example of the pixel according to the conventional example.

However, in an actual circuit, as illustrated in FIG. 6B, a cathode parasitic capacitance C01 is generated at a cathode end of the avalanche photodiode PD1, and an input parasitic capacitance C02 is generated at an input end of the inverter IVT. Here, when the resistance value RQ1 of the resistor $R_L$ is increased in order to increase the ratio RQ1/RQ2, a time constant determined by the resistance value RQ1, the cathode parasitic capacitance C01, and the input parasitic capacitance C02 increases. Consequently, the recharge time becomes long, and the dead time becomes long.

Figure 5B:
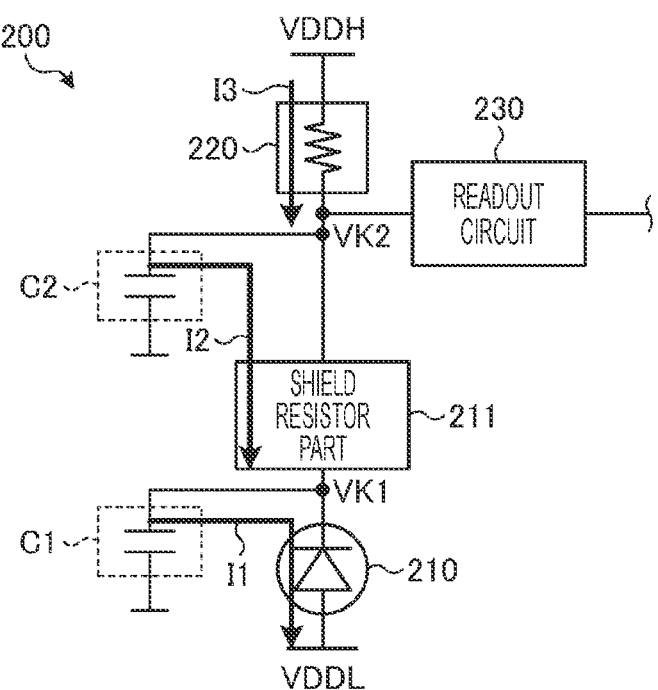
FIG. 5B is a diagram for explaining operation of the pixel of the optical device according to the first embodiment.
Figure 5C:
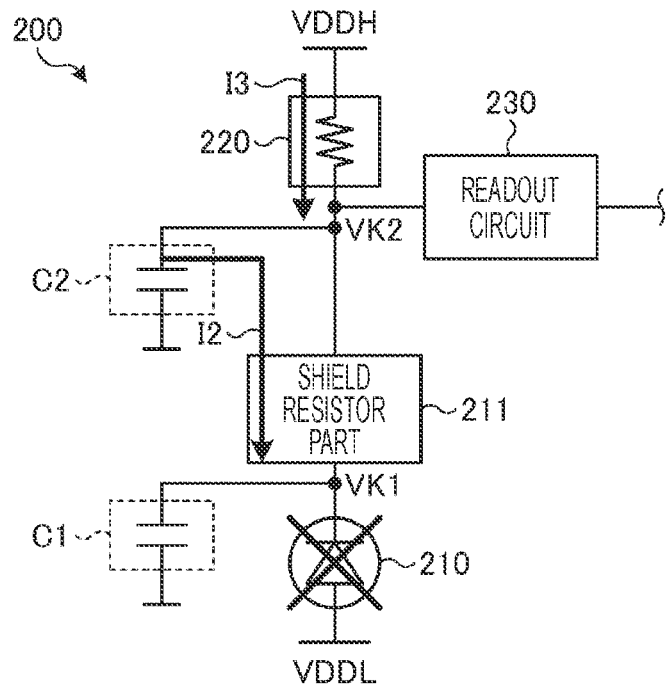
FIG. 5C is a diagram for explaining the operation of the pixel of the optical device according to the first embodiment following FIG. 5B.
Figure 5D:
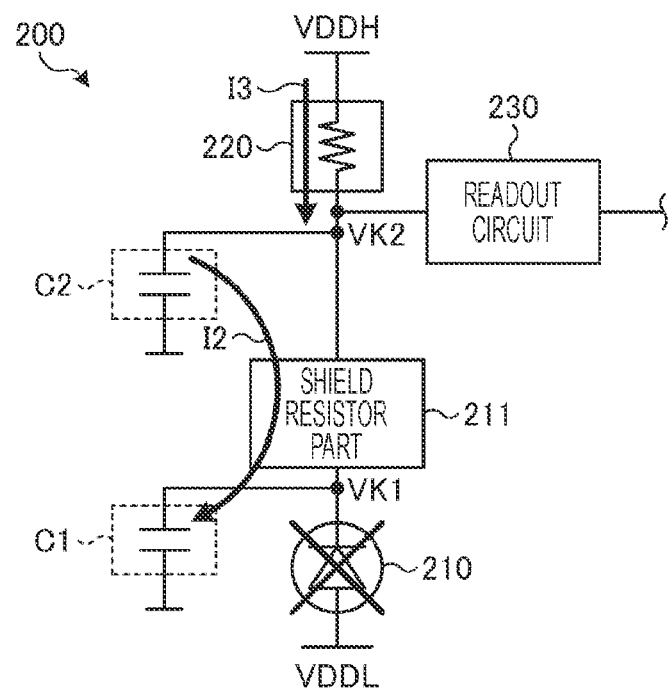
FIG. 5D is a diagram for explaining the operation of the pixel of the optical device according to the first embodiment following FIG. 5C.
Figure 5E:
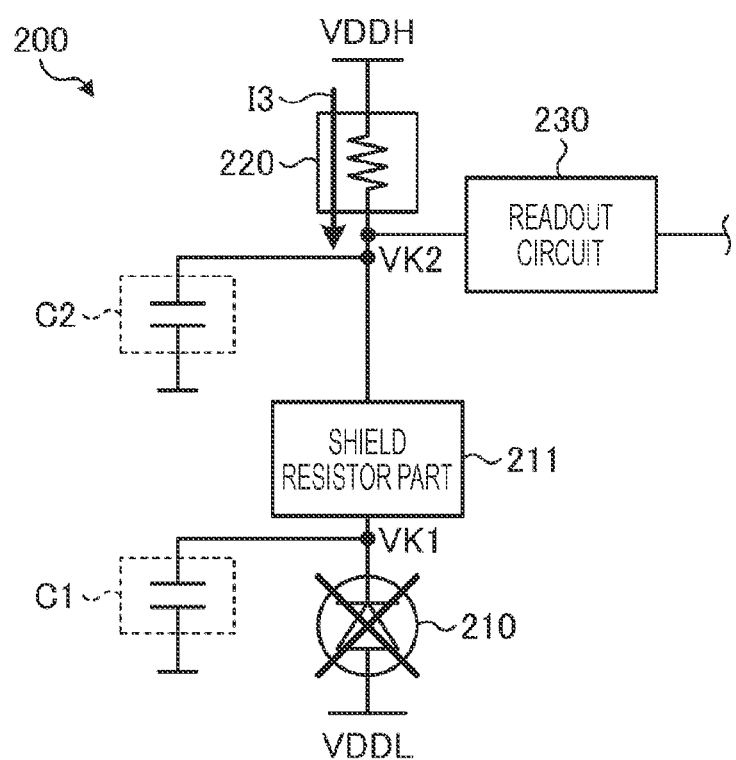
FIG. 5E is a diagram for explaining the operation of the pixel of the optical device according to the first embodiment following FIG. 5D.

On the other hand, in the first embodiment of the present disclosure, during the series of operations of the avalanche multiplication, the quenching, the redistribution, and the recharge illustrated in FIGS. 5B, 5C, and 5D, the cathode potential VK1 of the SPAD 210 decreases by ΔVK1, and the potential VK2 at the other end of the shield resistor part 211 (the end opposite to the one end connected to the SPAD 210) decreases by ΔVK2. Here, when the capacitance (value) of the parasitic capacitance C1 is CC1 and the capacitance (value) of the parasitic capacitance C2 is CC2, ΔVK2 is represented by the following expression.

$$\Delta VK2 = \Delta VK1 \times \{1/(1+CC2/CC1)\}$$

That is, the voltage ΔVK2 generated at the other end of the shield resistor part 211 during the series of operations is lower than the voltage ΔVK1 generated across the SPAD 210 by the capacitance ratio CC2/CC1. The voltage ΔVK2 at the other end of the shield resistor part 211 is an input voltage of the readout circuit 230 and is lower than the voltage ΔVK1 generated across the SPAD 210. This makes it possible to protect the readout circuit 230. That is, it can be said that the readout circuit 230 is protected by the ratio CC2/CC1 of the capacitance (value) CC2 of the parasitic capacitance C2 to the capacitance (value) CC1 of the parasitic capacitance C1.

Further, as described with reference to FIG. 5B, since the shield resistor part 211 has the resistance value Rsh larger than the resistance value $R_{ON}$ between the cathode and the anode of the SPAD 210, the current I2 only slightly flows from the parasitic capacitance C2 during the avalanche multiplication of the SPAD 210, and the current I1 mainly flows from the parasitic capacitance C1. Further, due to relationships capacitance (value) CC1 of parasitic capacitance C1<capacitance (value) CC2 of parasitic capacitance C2, and resistance value $R_{ON}$<resistance value Rsh, a time constant determined by the capacitance (value) CC1 and the resistance value $R_{ON}$ is smaller than a time constant determined by the capacitance (value) CC2 and the resistance value Rsh. Since the current I1 is supplied from the parasitic capacitance C1 to the SPAD 210 through a circuit having a small time constant, a period during which the avalanche multiplication occurs can be shortened. Therefore, it is possible to reduce the time (dead time in a broad sense) until the photon can be detected again after the photon is incident on the SPAD 210.

Further, during the avalanche amplification, the current I1 mainly flows from the parasitic capacitance C1, and the current I2 only slightly flows from the parasitic capacitance C2, so that the flowing current can be reduced. Therefore, the power consumption can be reduced as compared with a case where the current I2 also flows from the parasitic capacitance C2.

Moreover, the quenching occurs, and the redistribution of charges from the parasitic capacitance C2 to the parasitic capacitance C1 occurs, and only after the redistribution ends, the current I3 flowing through the quench resistor part 212 contributes to the recharge. Therefore, the time necessary for the recharge by the current I3 is shortened, and the dead time can be reduced. Furthermore, since the charges are redistributed from the parasitic capacitance C2 to the parasitic capacitance C1, the current I3 necessary for recharge can be reduced. That is, the power consumption can be reduced.

As described above, in the pixel 200 of the optical device according to the present embodiment, the input voltage to the readout circuit 230 can be reduced to be lower than the withstand voltage of the readout circuit 230 by the ratio CC2/CC1 of the capacitance (value) CC2 of the parasitic capacitance C2 and the capacitance (value) CC1 of the parasitic capacitance C1. Further, since the shield resistor part 211 having the resistance value Rsh larger than the resistance value $R_{ON}$ between the cathode and the anode of the SPAD 210 is provided between the cathode of the SPAD 210 and the input end of the readout circuit 230, effects such as reduction of the dead time and reduction of the power consumption are exhibited. Furthermore, since the resistance value Rq of the quench resistor part 212 is larger than the resistance value Rsh of the shield resistor part 211, the recharge by the current I3 is started after the redistribution of charges from the parasitic capacitance C2 to the parasitic capacitance C1 ends. That is, the power necessary for the recharge can also be reduced, and the power consumption can be further reduced.

Specific Example of Shield Resistor Part

Next, a specific example of the shield resistor part 211 will be described with reference to FIGS. 7A and 7B. In these drawings, the digital counter circuit 240 (or TDC circuit), the word line WL, the bit line BL, and the like illustrated in FIG. 4B are omitted.

Figure 7A:
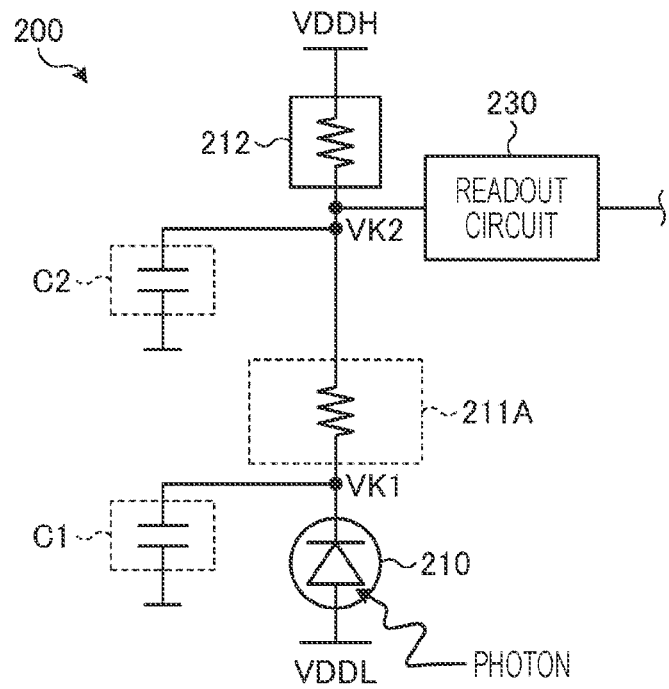
FIG. 7A is a block diagram illustrating Specific Example 1 of a shield resistor part in a pixel of the optical device according to the first embodiment.

FIG. 7A is a block diagram illustrating Specific Example 1 of the shield resistor part 211 in the pixel 200 of the optical device 100 according to the first embodiment. As illustrated, the shield resistor part 211 can be implemented by the resistance element 211A. The resistance element 211A may be formed by, for example, a high-resistance polysilicon, a metal resistor, or the like. The high-resistance polysilicon or the metal resistor is formed by a thin film forming process in a known semiconductor manufacturing process, a photolithography technique, an etching process, or the like during wiring formation.

Figure 7B:
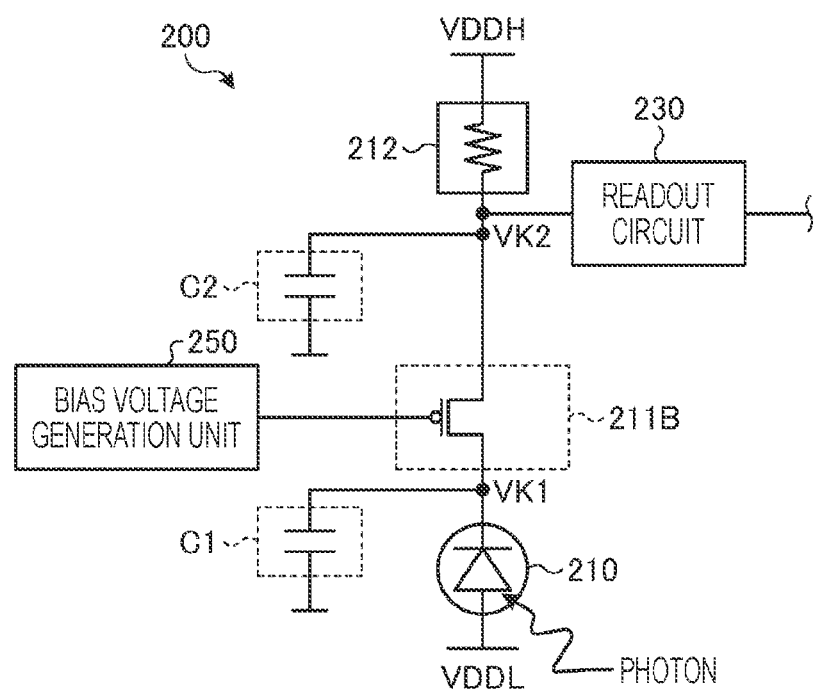
FIG. 7B is a block diagram illustrating Specific Example 2 of the shield resistor part in the pixel of the optical device according to the first embodiment.

Further, as illustrated in FIG. 7B, in Specific Example 2, the shield resistor part 211 may include, for example, a P channel metal oxide semiconductor (MOS) transistor 211B. In this case, a bias voltage generation unit 250 that applies a bias voltage to the gate of the MOS transistor 211B is provided. For example, the voltage applied from the bias voltage generation unit 250 to the gate of the MOS transistor 211B is adjusted by an instruction signal from the row scanning circuit 320 (FIG. 4A), and thus the resistance value between a source and a drain of the MOS transistor 211B, that is, the resistance value Rsh of the shield resistor part 211 can be adjusted. By this adjustment, the relationship of $R_{ON}$<Rsh between the resistance value $R_{ON}$ of the SPAD 210 and the resistance value Rsh of the shield resistor part 211 can be appropriately implemented. Thus, it is possible to reliably shorten the dead time and reduce the power consumption.

Note that, although one MOS transistor 211B is illustrated in FIG. 7B, the entire resistance value Rsh of the shield resistor part 211 may be adjusted by arranging a plurality of MOS transistors 211B in series and applying a date voltage to each of them. Further, FIGS. 7A and 7B illustrate the pixel 200 in the first embodiment, but this Specific Example 1 is also applicable to the pixel 200B in the third embodiment.

Further, during the avalanche multiplication of the SPAD 210, the resistance value between the source and the drain of the MOS transistor 211B is increased to suppress the flow of the current I2 from the parasitic capacitance C2 and reduce the power consumption, and on the other hand, the resistance value between the source and the drain of the MOS transistor 211B is reduced together with occurrence of the quenching, thereby promoting the redistribution of charges and shortening the dead time.

Specific Example of Quench Resistor Part

Figure 8A:
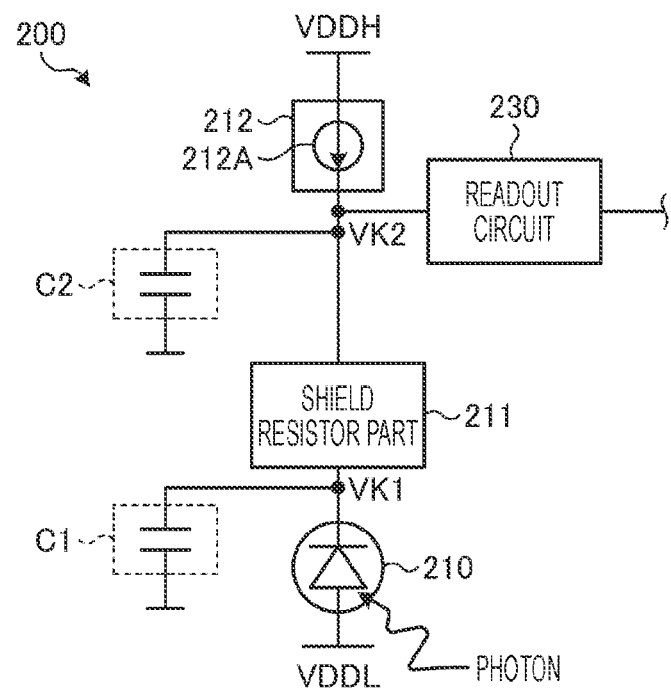
FIG. 8A is a block diagram illustrating Specific Example 1 of a quench resistor part in the pixel of the optical device according to the first embodiment.

Next, a specific example of the quench resistor part 212 will be described. FIG. 8A is a block diagram illustrating Specific Example 1 of a quench resistor part in the pixel 200 of the optical device according to the first embodiment.

As illustrated in FIG. 8A, the quench resistor part 212 can have a constant current source 212A. Since the constant current source 212A has a large internal resistance, the relationship of Rsh<Rq between the resistance value Rq of the quench resistor part 212 and the resistance value Rsh of the shield resistor part 211 is easily satisfied. Thus, it is possible to reduce the contribution of the current (corresponding to the current I3 in FIG. 5B and the like) from the quench resistor part 212 during the avalanche amplification or during the redistribution of charges between the parasitic capacitance C2 and the parasitic capacitance C1, and it is also possible to reduce power consumption. Further, the current (corresponding to the current I3) during the recharge can be maintained at a predetermined value by the constant current source 212A. Thus, the recharge can be efficiently performed by appropriately adjusting the recharge current.

Figure 8B:
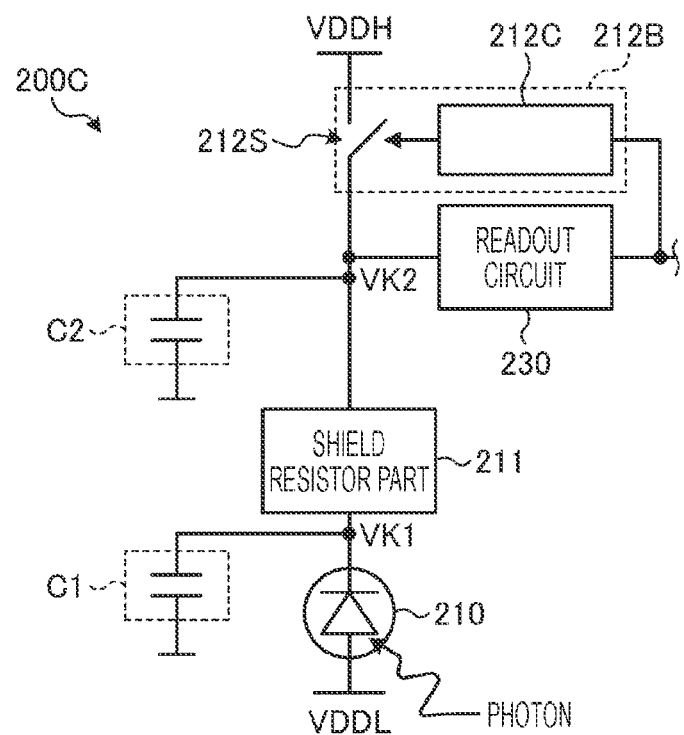
FIG. 8B is a block diagram illustrating Specific Example 2 of the quench resistor part in the pixel of the optical device according to the first embodiment.

Next, Specific Example 2 of the quench resistor part 212 will be described. In the pixel 200C in Specific Example 2, as illustrated in FIG. 8B, an active recharge circuit 212B is provided instead of the quench resistor part 212 in the pixel 200 of the first embodiment. However, the active recharge circuit 212B is also applicable to the pixels 200A and 200B.

The active recharge circuit 212B includes a switch 212S and a control unit 212C that performs ON/OFF control of the switch 212S. The switch 212S electrically connects and disconnects the predetermined power supply (VDDH) and the shield resistor part 211 under the control of the control unit 212C. The control unit 212C is connected to the output end of the readout circuit 230 at one end. Thus, the control unit 212C detects the output voltage of the readout circuit 230. Specifically, upon detecting a fall of the pulse-shaped output voltage from the readout circuit 230, the control unit 212C outputs an ON signal for turning on the switch 212S to the switch 212S after a predetermined delay time. Further, the control unit 212C outputs an OFF signal for turning off the switch 212S to the switch 212S when a predetermined period has elapsed after outputting the ON signal.

Figure 8C:
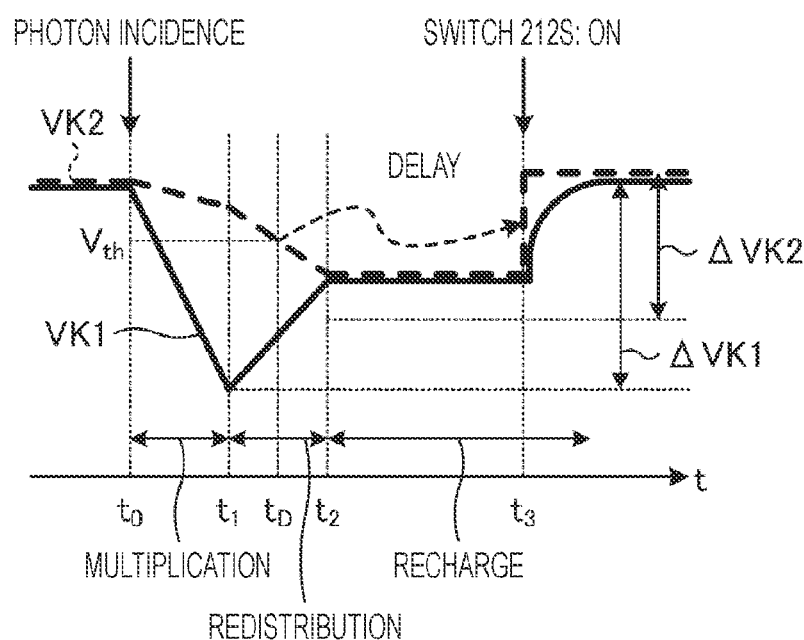
FIG. 8C is a graph for explaining operation of the pixel according to Specific Example 2 of the quench resistor part illustrated in FIG. 8B.

The active recharge circuit 212B configured as described above operates as follows. As illustrated in FIG. 8C, when the avalanche amplification occurs due to incidence of photons at time $t_0$, the cathode potential VK1 decreases. When the quenching occurs and the redistribution of charges from the parasitic capacitance C2 to the parasitic capacitance C1 is started, the cathode potential VK1 rises again. That is, the cathode potential VK1 changes in a negative pulse shape. On the other hand, the potential VK2 at a connection point between the shield resistor part 211 and the active recharge circuit 212B decreases during the avalanche amplification (period $t_0$ to $t_1$) and the redistribution (period $t_1$ to $t_2$). Such a potential change is detected by the readout circuit 230. Here, when the potential VK2 falls below a predetermined first threshold potential, the readout circuit 230 outputs the output voltage, and when the potential VK2 falls below a predetermined second threshold potential Vth, the readout circuit 230 stops outputting the output voltage. That is, the readout circuit 230 outputs a pulsed output voltage during a period in which the potential VK2 changes from the first threshold potential to the second threshold potential Vth. When detecting the fall of the output voltage of the readout circuit 230 (time $t_D$), the control unit 212C outputs an ON signal to the switch 212S after a predetermined delay time (period $t_D$ to $t_3$) has elapsed. Thus, the switch 212S is turned on (time $t_3$), and a current is supplied from the predetermined power supply to the SPAD 210 through the shield resistor part 211.

In the active recharge circuit 212B, as described above, the switch 212S is turned off until the potential VK2 becomes lower than the second threshold potential Vth (until the pulsed output signal from the readout circuit 230 falls). Thus, in a period from when photons are incident to when the pulsed output signal from the readout circuit 230 falls, the supply of the current (corresponding to the current I3 in FIG. 5B and the like) from the power supply to the shield resistor part 211 is stopped. Therefore, a current flows from the parasitic capacitance C1 during the avalanche amplification, and a current flows from the parasitic capacitance C2 to the parasitic capacitance C1 during the charge redistribution. Since the switch 212S is OFF, no current flows through the shield resistor part 211, so that the power consumption can be reliably reduced.

Further, when falling of the pulse-shaped output signal from the readout circuit 230 is detected and a predetermined delay time elapses, the switch 212S is turned on (time $t_3$). Thus, the current is supplied from the power supply to the shield resistor part 211, and the recharge is promoted. Therefore, the dead time can be reduced. Here, if the timing at which the switch 212S is turned on is matched with the time point at which the redistribution of charges from the parasitic capacitance C2 to the parasitic capacitance C1 ends, the dead time can be more appropriately reduced. Note that a constant current source may be provided instead of the power supply. Thus, it is possible to appropriately adjust the current value of the current flowing after the switch 212S is turned on, so that it is also possible to end the recharge in a short time.

Note that, at time t3, when the switch 212S is turned on and a current is supplied from the power supply to the shield resistor part 211, the potential VK2 rapidly returns to the potential before incidence of photons, while the cathode potential VK1 of the SPAD 210 returns to the potential before incidence of photons with a delay from the potential VK2, as illustrated in FIG. 8C. This is because the time constant of the potential VK1 increases by the resistance value of the shield resistor part 211.

Specific Example of Readout Circuit

Figure 9A:
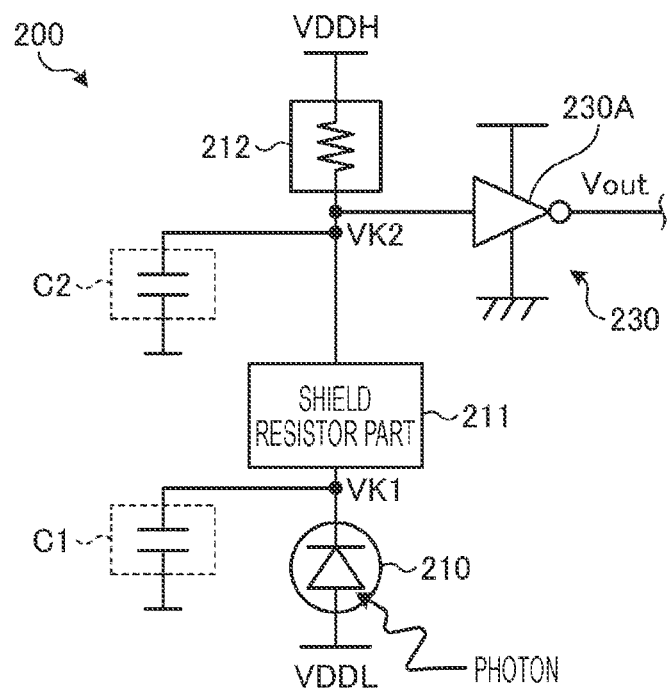
FIG. 9A is a block diagram illustrating Specific Example 1 of a readout circuit in the pixel of the optical device according to the first embodiment.

Next, a specific example of the readout circuit 230 will be described. FIG. 9A is a block diagram illustrating Specific Example 1 of the readout circuit in the pixel 200 of the optical device according to the first embodiment.

As illustrated in FIG. 9A, the readout circuit 230 can have an inverter 230A. An input end of the inverter 230A is connected to a connection point between the shield resistor part 211 and the quench resistor part 212. Further, power is supplied to the inverter 230A by a predetermined wiring.

Figure 9B:
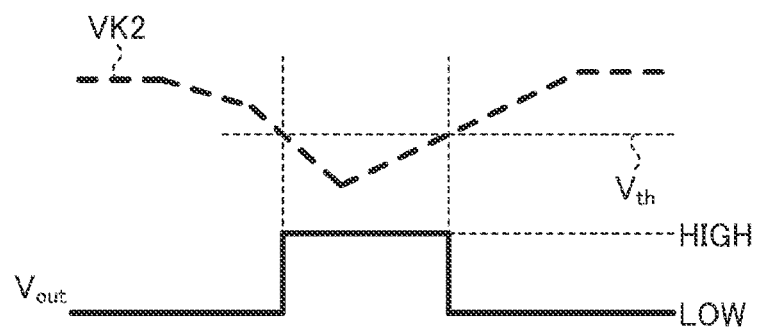
FIG. 9B is a diagram for explaining operation of the readout circuit in the pixel of the optical device according to the first embodiment.

As illustrated in FIG. 9B, the inverter 230A operates such that the output voltage Vout becomes HIGH when the potential VK2 at the connection point between the shield resistor part 211 and the quench resistor part 212 becomes lower than a predetermined threshold Vth, and the output voltage Vout becomes LOW when the potential VK2 exceeds the predetermined threshold Vth. Thus, even in a case where the potential VK2 changes in a V shape, the change can be output as a square wave-shaped pulse wave. By employing the inverter 230A as the readout circuit 230, it is possible to read out a change in the potential VK2 at the connection point between the shield resistor part 211 and the quench resistor part 212.

Figure 9C:
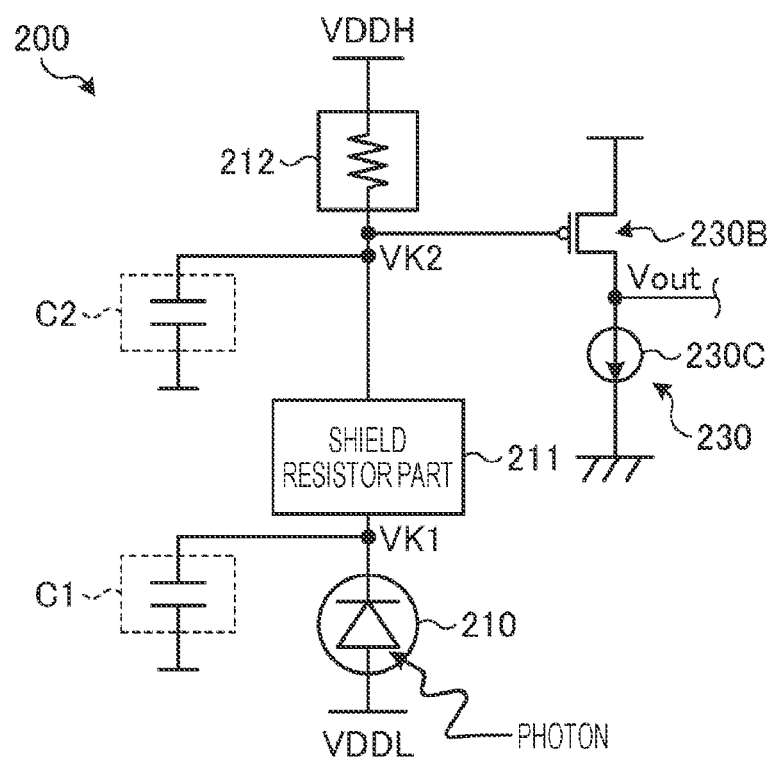
FIG. 9C is a block diagram illustrating Specific Example 2 of the readout circuit in the pixel of the optical device according to the first embodiment.

Further, in Specific Example 2 of the readout circuit, as illustrated in FIG. 9C, the readout circuit 230 includes a P-channel MOS transistor 230B and a current source 230C. Thus, during a period in which the magnitude of the potential VK2 is equal to or less than the predetermined voltage, the MOS transistor 230B is turned on, and the predetermined pulsed output voltage Vout corresponding to the period is output. Accordingly, as with the inverter 230A of FIG. 9A, a change in the potential VK2 can be read out.

Second Embodiment

Figure 10A:
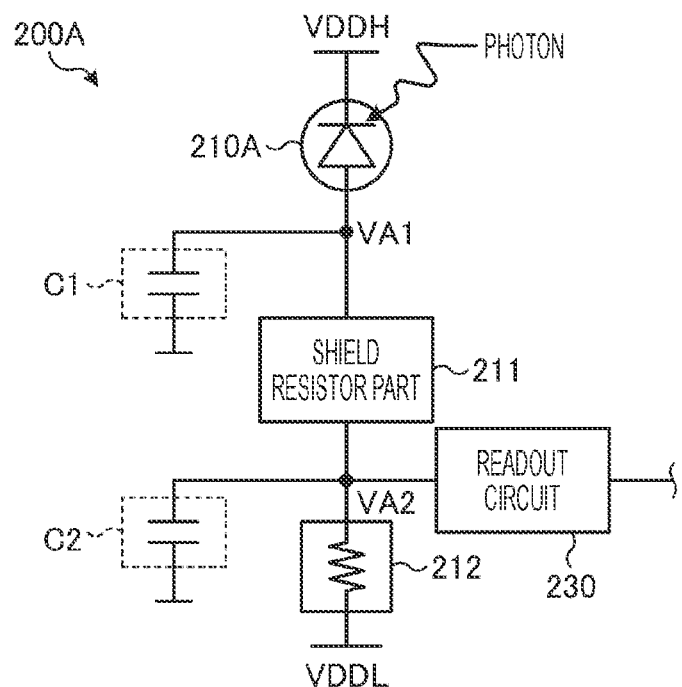
FIG. 10A is a block diagram illustrating a schematic configuration example of a pixel of an optical device according to a second embodiment.

Next, an optical device according to a second embodiment of the present disclosure will be described with reference to FIGS. 10A and 7B. FIG. 10A is a block diagram illustrating a schematic configuration example of a pixel 200A of the optical device according to the second embodiment. Although the digital counter circuit 240 (or the TDC circuit), the word line WL, the bit line BL, and the like are omitted in FIG. 10A, the pixel 200A is similar to the pixel 200 of the optical device 10 according to the first embodiment except for the configuration illustrated. Further, the optical device according to the present embodiment can have the same configuration as the optical device 100 according to the first embodiment, and can be replaced with the optical device 10 in the electronic apparatus 1 (FIG. 1) similarly to the optical device 100.

Referring to FIG. 10A, one end of the shield resistor part 211 is connected to the anode of a SPAD 210A, and one end of the quench resistor part 212 is connected to the other end of the shield resistor part 211. That is, in the pixel 200A in the present embodiment, unlike the pixel 200 in the first embodiment in which the shield resistor part 211 and the quench resistor part 212 are connected in series on the cathode side of the SPAD 210, the shield resistor part 211 and the quench resistor part 212 are connected in series on the anode side of the SPAD 210A. On the other hand, the pixel 200A is similar to the pixel 200 in that the resistance value $R_{ON}$ of the SPAD 210A and the resistance value Rsh of the shield resistor part 211 satisfy the relationship of $R_{ON}$<Rsh, and the resistance value Rsh of the shield resistor part 211 and the resistance value Rq of the quench resistor part 212 satisfy the relationship of Rsh<Rq.

As illustrated, the parasitic capacitance C1 is generated between the anode of the SPAD 210A and the shield resistor part 211. The parasitic capacitance C1 corresponds to a combined capacitance such as a capacitance of the SPAD 210A and a capacitance generated by a wiring connecting the SPAD 210A and the shield resistor part 211. Moreover, the parasitic capacitance C2 is generated between the shield resistor part 211 and the quench resistor part 212. The parasitic capacitance C2 corresponds to a combined capacitance of a capacitance generated by the shield resistor part 211, a capacitance generated by the quench resistor part 212, the capacitance generated by the wiring connecting the shield resistor part 211 and the quench resistor part 212, the capacitance of the element such as the inverter included in the readout circuit 230, and the like. Further, an input end of the readout circuit 230 is connected to a connection point between the shield resistor part 211 and the quench resistor part 212.

The cathode of the SPAD 210A is connected to a high potential terminal of the predetermined power supply, and the other end of the quench resistor part 212 (the end opposite to the connection point between the quench resistor part 212 and the shield resistor part 211) is connected to a low potential terminal of the predetermined power supply. During operation, a predetermined reverse bias voltage (potential VDDH−potential VDDL) corresponding to the Geiger region is applied across the SPAD 210A by the predetermined power supply.

Figure 10B:
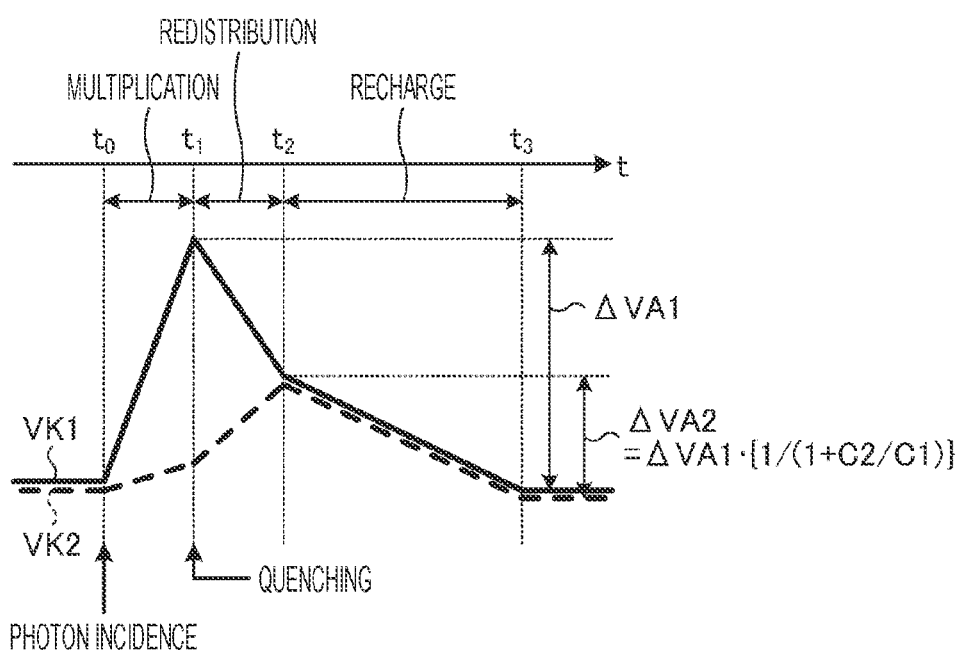
FIG. 10B is a graph for explaining operation of the pixel of the optical device according to the second embodiment.

Next, the operation of the SPAD 210A in the present embodiment will be described. FIG. 10B is a graph schematically illustrating a change between an anode potential VA1 of the SPAD 210A and a potential VA2 of the connection point (input end of the readout circuit 230) between the shield resistor part 211 and the quench resistor part 212 when one photon is incident on the SPAD 210A of the pixel 200A.

In a case where the predetermined voltage corresponding to the Geiger region is applied to the SPAD 210A from the predetermined power supply, when one photon is incident on the SPAD 210A (time $t_0$), the avalanche multiplication occurs in the SPAD 210A, and a large current flows from the cathode to the anode. Thus, as illustrated in FIG. 10B, in the period $t_0$ to $t_1$, the anode potential VA1 of the SPAD 210A rises (with respect to the potential VDDL).

At this time, since the resistance value Rsh of the shield resistor part 211 is larger than the resistance value $R_{ON}$ of the SPAD 210A, the current I1 mainly flows from the parasitic capacitance C1 to the SPAD 210A. Since the current I2 only slightly flows from the parasitic capacitance C2, the current flowing to the SPAD 210A during the avalanche amplification can be reduced. Thus, the power consumption can be reduced.

Further, since the capacitance (value) CC1 of the parasitic capacitance C1 is smaller than the capacitance (value) CC2 of the parasitic capacitance C2, and the resistance value $R_{ON}$ between the cathode and the anode of the SPAD 210 is smaller than the resistance value Rsh of the shield resistor part 211, a time constant determined by the capacitance (value) CC1 and the resistance value $R_{ON}$ is smaller than a time constant determined by the capacitance (value) CC2 and the resistance value Rsh. Since the current I1 from the parasitic capacitance C1 is supplied to the SPAD 210 through a circuit having a small time constant, a period during which the avalanche multiplication occurs can be shortened. Therefore, it is possible to reduce the time (dead time in a broad sense) until the photon can be detected again after the photon is incident on the SPAD 210.

Further, as the anode potential VA1 of the SPAD 210A increases during the avalanche amplification, the potential VA2 at the connection point between the shield resistor part 211 and the quench resistor part 212 also increases. Here, when an increase in the potential VA1 is denoted by ΔVA1, an increase in the potential VA2 is denoted by ΔVA2, a capacitance (value) of the parasitic capacitance C1 is denoted by CC1, and a capacitance (value) of the parasitic capacitance C2 is denoted by CC2, it is represented as follows:

$$\Delta VA2 = \Delta VA1 \times \{1/(1+CC2/CC1)\}$$

That is, the voltage (ΔVA2) applied to the input end of the readout circuit 230 is lower than ΔVA1. Thus, the input voltage (ΔVA2) can be maintained lower than the withstand voltage of the readout circuit 230, and the readout circuit 230 can be protected.

When (the absolute value of) the voltage applied to the SPAD 210A becomes smaller than (the absolute value of) the breakdown voltage along with the increase in the anode potential VA1, quenching occurs (time $t_1$). The quenching occurs, and the charge redistribution is started between the parasitic capacitance C2 and the parasitic capacitance C1 (time $t_1$). That is, the charges remaining in the parasitic capacitance C2 move to the parasitic capacitance C1 through the shield resistor part 211. Here, since the resistance value Rq of the quench resistor part 212 is larger than the resistance value Rsh of the shield resistor part 211, the current I3 flowing through the quench resistor part 212 only slightly contributes to the redistribution of charges. Thus, the redistribution of charges mainly occurs between the parasitic capacitance C1 and the parasitic capacitance C2. When the voltage across the parasitic capacitance C1 and the voltage across the parasitic capacitance C2 become equal, the redistribution ends (time $t_2$).

When the redistribution ends, the recharge is started. That is, when the redistribution of charges ends, the current does not flow from the parasitic capacitance C2, and thus the SPAD 210 is recharged by the current I3 flowing through the quench resistor part 212. When the recharge ends (time $t_3$), the SPAD 210 becomes capable of detecting a photon again.

As described above, with the pixel 200A of the optical device according to the second embodiment, even in a case where the shield resistor part 211 and the quench resistor part 212 are arranged on the anode side of the SPAD 210A, the resistance value $R_{ON}$ between the cathode and the anode of the SPAD 210 and the resistance value Rsh of the shield resistor part 211 satisfy the relationship of $R_{ON}$<Rsh, the resistance value Rsh of the shield resistor part 211 and the resistance value Rq of the quench resistor part 212 satisfy the relationship of Rsh<Rq, and furthermore, the capacitance (value) CC1 of the parasitic capacitance C1 and the capacitance (value) CC2 of the parasitic capacitance C2 satisfy a relationship of CC1<CC2, so that similar effects to those of the pixel 200 of the optical device according to the first embodiment are exhibited.

Figure 10C:
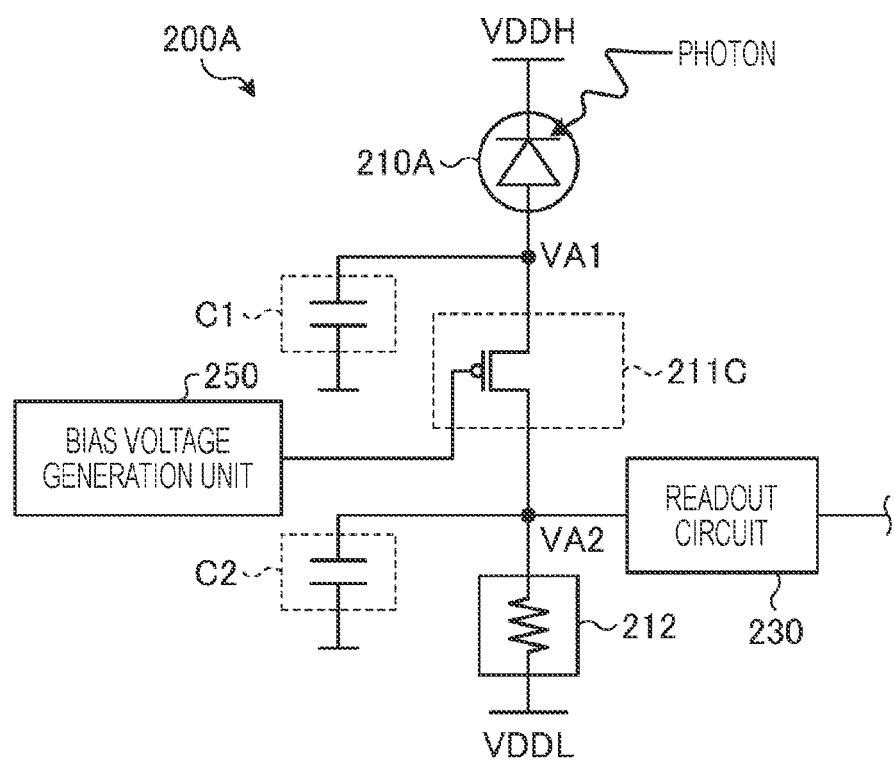
FIG. 10C is a block diagram illustrating Specific Example 3 of the shield resistor part in the pixel of the optical device according to the second embodiment.

Further, as illustrated in FIG. 10C, in the pixel 200A of the optical device according to the second embodiment, the shield resistor part 211 can include, for example, an N-channel MOS transistor 211C. In this case, a bias voltage generation unit 250 that applies a bias voltage to the gate of the MOS transistor 211C is provided. Even in a case where the MOS transistor 211C is used as the shield resistor part 211 in the pixel 200A, a similar effect to that in a case where the P-channel MOS transistor 211B (FIG. 7B) is used in the pixel 200 of the optical device according to the first embodiment is exhibited. Moreover, also in this case, a plurality of MOS transistors 211C may be used.

Note that the specific examples of the quench resistor part described with reference to FIGS. 8A, 8B, and 8C and the specific examples of the readout circuit described with reference to FIGS. 9A, 9B, and 9C are also appropriately applicable to the second embodiment.

Third Embodiment

Figure 11:
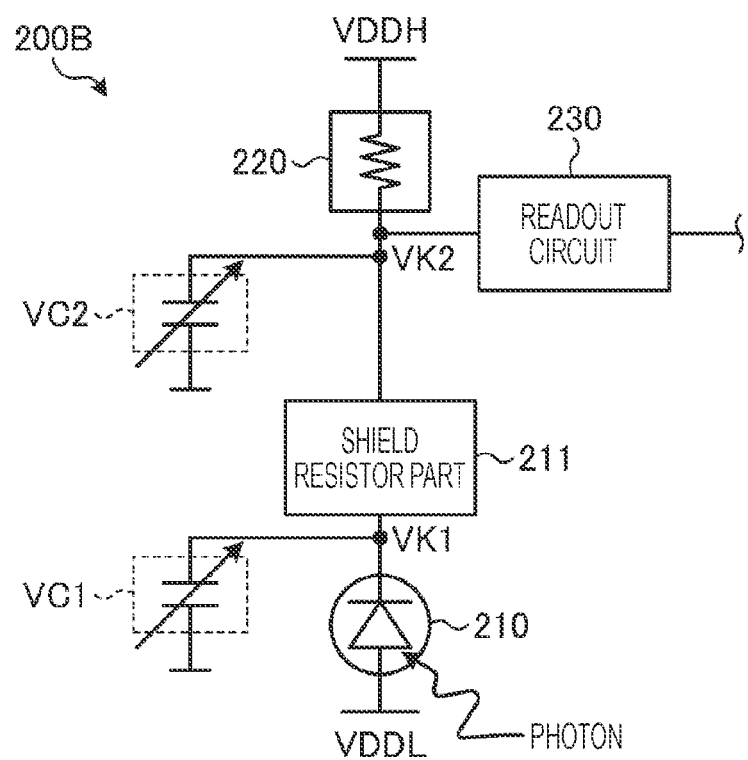
FIG. 11 is a block diagram illustrating a schematic configuration example of a pixel of an optical device according to a third embodiment.

Next, an optical device according to a third embodiment of the present disclosure will be described with reference to FIG. 11. As illustrated, in a pixel 200B of the optical device according to the present embodiment, the SPAD 210, the shield resistor part 211, the quench resistor part 212, and the readout circuit 230 are arranged as in the pixel 200 (FIG. 4B) of the optical device according to the first embodiment. The pixel 200B is similar to the pixel 200 in that there is a relationship of $R_{ON}$<Rsh between the resistance value $R_{ON}$ of the SPAD 210 and the resistance value Rsh of the shield resistor part 211, and there is a relationship of Rsh<Rq between the resistance value Rsh of the shield resistor part 211 and the resistance value Rq of the quench resistor part 212. Note that, although the digital counter circuit 240 (or the TDC circuit), the word line WL, the bit line BL, and the like illustrated in FIG. 4B are omitted in FIG. 11, the pixel 200B may be configured similarly to the pixels 200 and 200A described above. Further, the optical device according to the present embodiment can have the same configuration as the optical device 100 according to the first embodiment, and can be replaced with the optical device 10 in the electronic apparatus 1 (FIG. 1) similarly to the optical device 100.

On the other hand, the pixel 200B in the present embodiment is provided with variable capacitance elements VC1 and VC2. Specifically, the variable capacitance element VC1 is provided such that one end thereof is grounded and the other end thereof is connected to the cathode of the SPAD 210. Further, the variable capacitance element VC2 is provided such that one end thereof is grounded and the other end thereof is connected to a wiring connecting the shield resistor part 211 and the quench resistor part 212. That is, the variable capacitance element VC1 is provided instead of the parasitic capacitance C1 in the pixel 200 of the optical device according to the first embodiment, and the variable capacitance element VC2 is provided instead of the parasitic capacitance C2.

Each of the variable capacitance elements VC1 and VC2 can be formed by, for example, one MOS transistor. In this case, a bias voltage generation unit that applies a gate voltage to the gate of the MOS transistor is provided. For example, the capacitance of the variable capacitance elements VC1 and VC2 can be adjusted by adjusting the gate voltage applied from the bias voltage generation unit to the gate electrode of the MOS transistor under the control of the row scanning circuit 320.

Further, each of the variable capacitance elements VC1 and VC2 may be formed by a plurality of MOS transistors. In this case, a bias voltage generation unit that applies a date voltage to the gate of each MOS transistor is provided. With such a configuration, for example, the capacitance of the variable capacitance elements VC1 and VC2 can be adjusted by adjusting the number of MOS transistors to which the gate voltage is applied under the control of the row scanning circuit 320. Note that the variable capacitance elements VC1 and VC2 may be formed by complementary metal-oxide semiconductor (CMOS) transistors.

Also in the pixel 200B of the optical device according to the present embodiment, as in the pixel 200 of the optical device according to the first embodiment, there is a relationship of $R_{ON}$<Rsh between the resistance value $R_{ON}$ of the SPAD 210 and the resistance value Rsh of the shield resistor part 211, and there is a relationship of Rsh<Rq between the resistance value Rsh of the shield resistor part 211 and the resistance value Rq of the quench resistor part 212. Thus, if the capacitance of the variable capacitance element VC1 and the variable capacitance element VC2 is adjusted so that the capacitance of the latter becomes large, the same effects as the effects exhibited by the pixel 200 are also exhibited by the pixel 200B.

Further, in the pixel 200B of the optical device according to the present embodiment, the variable capacitance elements VC1 and VC2 are provided, and the respective capacitances can be adjusted. Thus, the charge amounts of the charges accumulated in the variable capacitance elements VC1 and VC2 can also be adjusted. Therefore, it is possible to adjust the current amount of the current flowing from the variable capacitance element VC1 to the SPAD 210 during the avalanche multiplication and the charge amount of the charge moving from the variable capacitance element VC2 to the variable capacitance element VC1 during the redistribution of charges after the quenching. Consequently, it is possible to reliably shorten the dead time and reduce the power consumption.

Note that the specific examples of the shield resistor part described with reference to FIGS. 7A and 7B, the specific examples of the quench resistor part described with reference to FIGS. 8A, 8B, and 8C, and the specific examples of the readout circuit described with reference to FIGS. 9A, 9B, and 9C can also be appropriately applied to the third embodiment.

Fourth Embodiment

Figure 12:
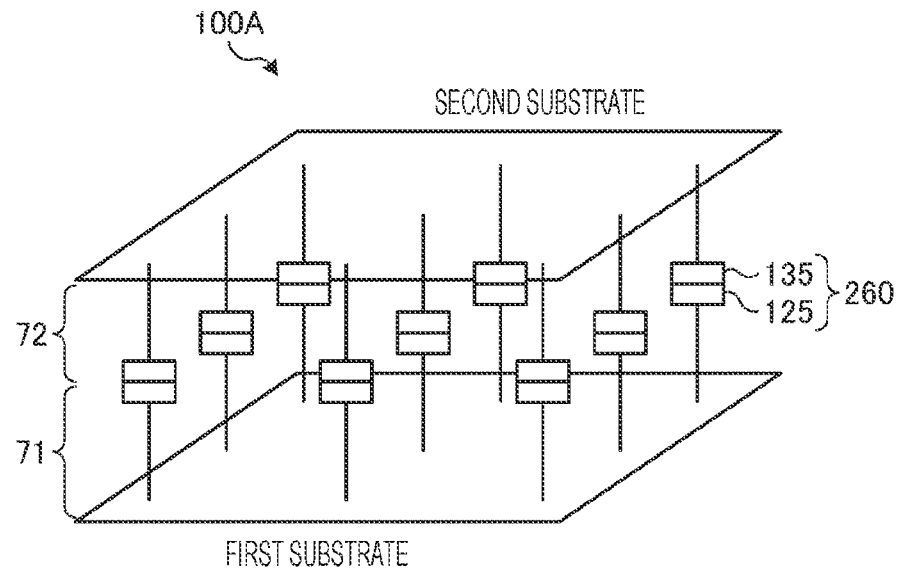
FIG. 12 is a block diagram illustrating a stacked structure example of an optical device according to a fourth embodiment.

Next, an optical device according to a fourth embodiment of the present disclosure will be described with reference to FIGS. 12 to 16. FIG. 12 is a diagram schematically illustrating a stacked structure example of the optical device according to the fourth embodiment. As illustrated in FIG. 12, the optical device 100 includes a first substrate 71 and a second substrate 72 bonded onto the first substrate 71.

Figure 13:
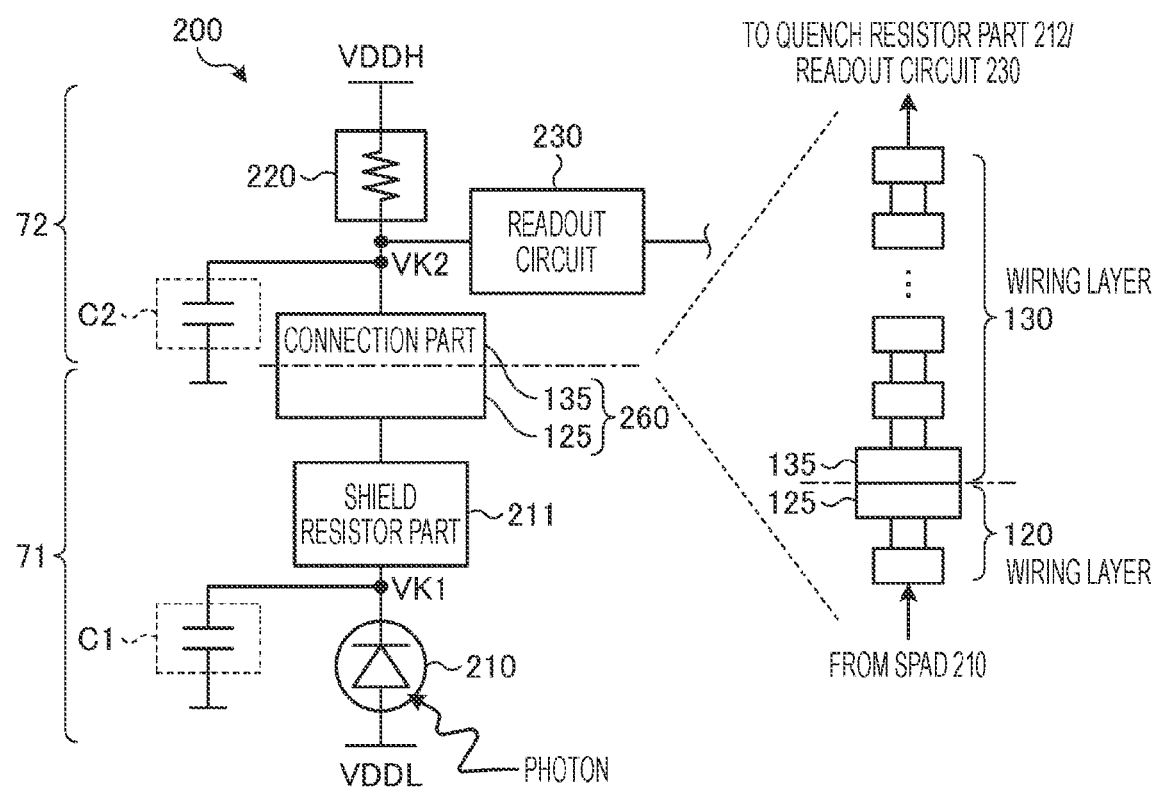
FIG. 13 is a block diagram illustrating a schematic configuration example of a pixel of an optical device according to a fourth embodiment.

The first substrate 71 includes, for example, a pixel array unit PAR (see FIG. 4A) in which the pixels 200 are arranged in a matrix. As illustrated in FIG. 13, a SPAD 210, a wiring layer 120, and a connection pad 125 are formed for every pixel on the first substrate 71. As described later, the wiring layer 120 includes the shield resistor part 211. One end of the shield resistor part 211 is connected to the cathode of the SPAD 210. The other end of the shield resistor part 211 is connected to the connection pad 125 by a predetermined wiring. Before the first substrate 71 and the second substrate 72 are bonded, the connection pad 125 is exposed on one surface (upper surface in the vertical direction in FIG. 12) of the first substrate 71. The connection pad 125 is formed by, for example, copper (Cu).

Note that the SPAD 210 is provided on a lower surface side of the first substrate 71. That is, the lower surface of the first substrate 71 in FIG. 12 is a light incident surface, and photons are incident on the SPAD 210 from the lower side in the drawing.

As illustrated in FIG. 13, the second substrate 72 includes the readout circuit 230, the quench resistor part 212, and the wiring layer 130 for every pixel. The readout circuit 230 and the quench resistor part 212 are connected to a connection pad 135 through the wiring layer 130. The connection pad 135 is exposed on one surface (lower surface in FIG. 12) of the second substrate 72 before the first substrate 71 and the second substrate 72 are bonded. The connection pad 135 is formed by Cu, for example. Note that the digital counter circuit 240 (or TDC circuit) illustrated in FIG. 4B, the column circuit 310, the row scanning circuit 320, and the interface circuit 330 (FIG. 4A) may be disposed on the second substrate 72.

Here, as illustrated on the right side of FIG. 13, the number of layers of the wiring layers 130 formed in the second substrate 72 tends to be larger than the number of layers of the wiring layers 120 formed in the first substrate 71. This is because, since the readout circuit 230, the digital counter circuit 240 (or TDC circuit), the word lines WL, the bit lines BL, and the like are formed in the second substrate 72, the number of circuit elements and wirings to be formed is larger in the second substrate 72 than in the first substrate 71. Thus, the parasitic capacitance C2 generated between the connection pad 135 of the second substrate 72 and the quench resistor part 212 is larger than the parasitic capacitance C1 on the cathode side of the SPAD 210 of the first substrate 71. Further, a parasitic capacitance is also generated by a bonding part 260, that is, the bonding between the connection pad 125 and the connection pad 135, but this parasitic capacitance is included in the parasitic capacitance C2 since the coupling with the parasitic capacitance C1 is prevented by the shield resistor part 211. Therefore, the ratio CC2/CC1 of the capacitance (value) CC1 of the parasitic capacitance C1 to the capacitance (value) CC2 of the parasitic capacitance C2 increases, and the input voltage to the readout circuit 230 can be further reduced.

Figure 14:
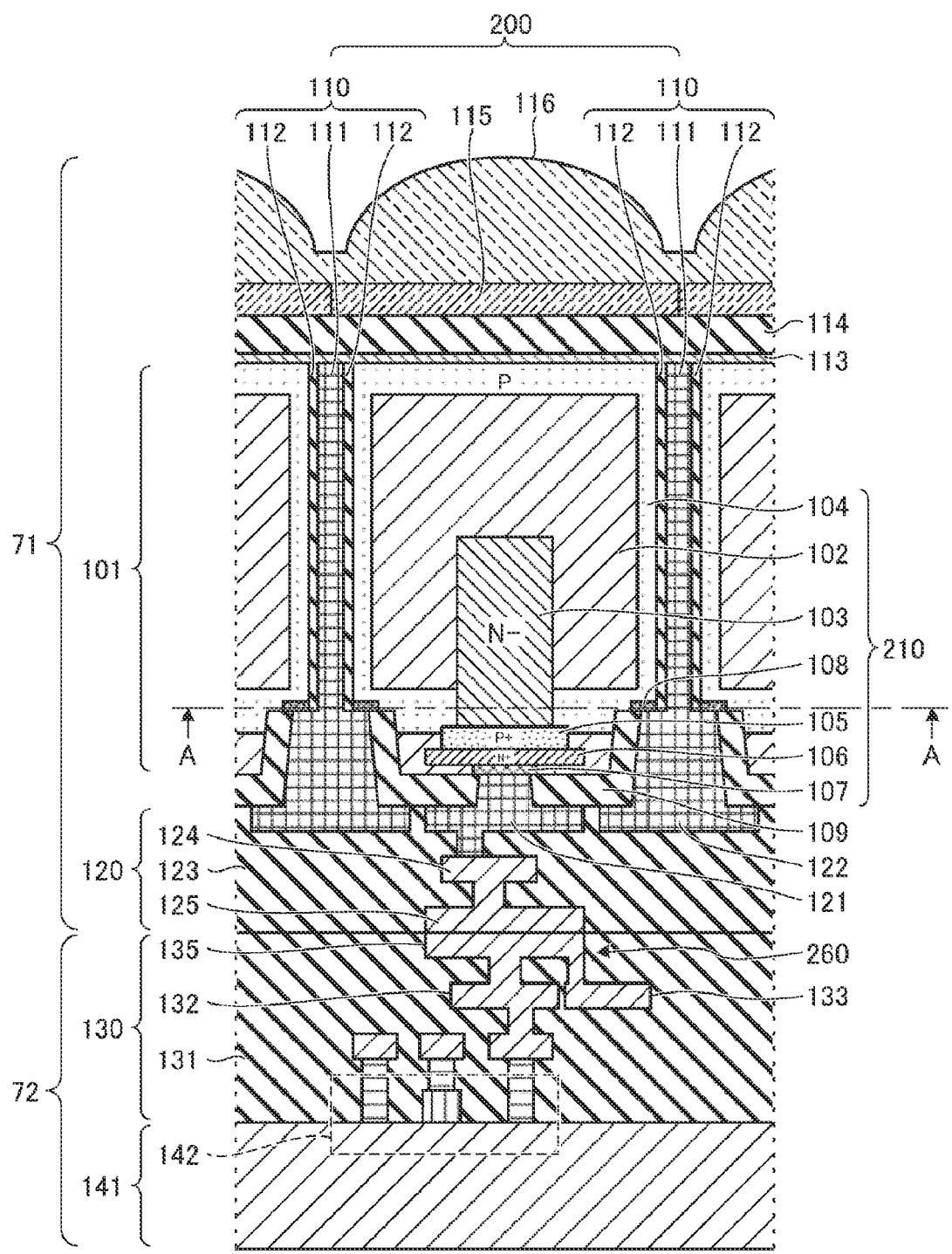
FIG. 14 is a vertical cross-sectional view illustrating a cross-sectional structure example of a surface perpendicular to a light incident surface of an optical device according to a fourth embodiment.

Referring to FIGS. 12 to 14, the bonding part 260 is formed in which the connection pad 125 of the first substrate 71 and the connection pad 135 of the second substrate 72 are bonded (what is called Cu—Cu bonding). Thus, the SPAD 210 formed in the first substrate 71 and the readout circuit 230 formed in the second substrate 72 are electrically connected. Further, the first substrate 71 and the second substrate 72 are mechanically bonded by the bonding part 260.

However, the first substrate 71 and the second substrate 72 may be electrically connected and mechanically bonded by bonding the connection pads 125 and 135 with metal bumps (what is called bump bonding). Further, for bonding the first substrate 71 and the second substrate 72, for example, what is called direct bonding can be used in which bonding surfaces of the substrates are flattened and the substrates are bonded to each other by interelectronic force.

Further, the first substrate 71 and the second substrate 72 may be electrically connected via, for example, a bonding part such as a through-silicon via (TSV) penetrating the semiconductor substrate. For the connection using the TSV, for example, what is called a twin TSV system in which two TSVs of a TSV provided on the first substrate 71 and a TSV provided from the first substrate 71 to the second substrate 72 are connected on the outer surface of the chip, what is called a shared TSV system in which two TSVs are connected by a TSV penetrating from the first substrate 71 to the second substrate 72, or the like can be employed.

Figure 15:
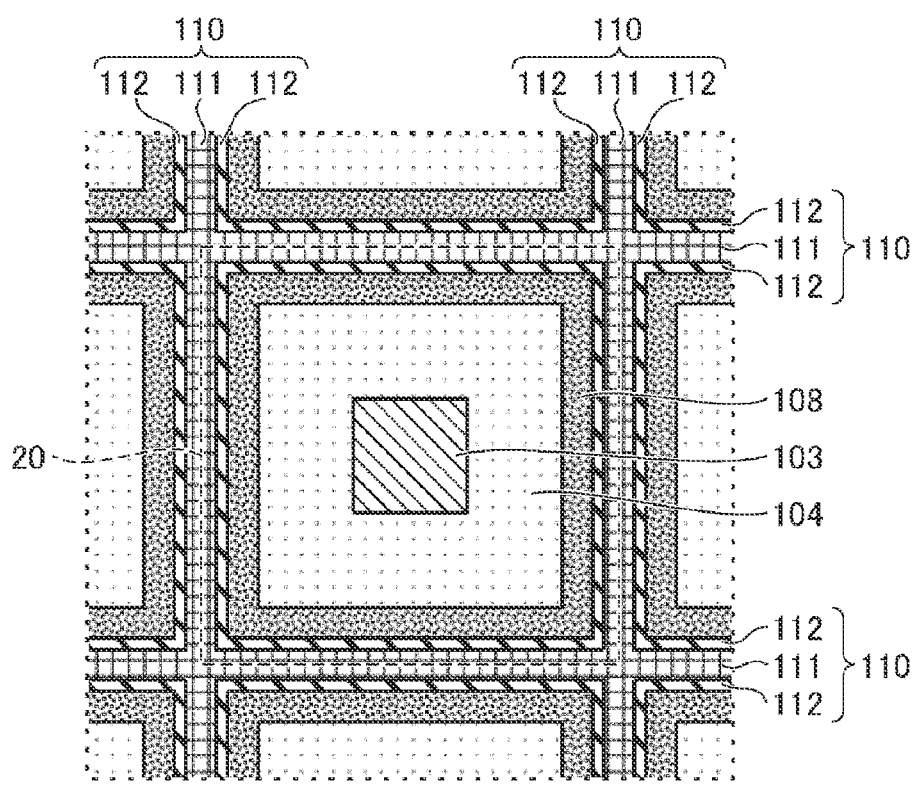
FIG. 15 is a horizontal cross-sectional view illustrating a cross-sectional structure example of an A-A plane in FIG. 14.

Next, a specific structure of the optical device according to the fourth embodiment will be described. FIG. 14 is a vertical cross-sectional view illustrating a cross-sectional structure example of a plane perpendicular to the light incident surface of the optical device according to the fourth embodiment. FIG. 15 is a horizontal cross-sectional view illustrating a cross-sectional structure example of an A-A plane in FIG. 14. Note that FIG. 14 focuses on the cross-sectional structure of the SPAD 210.

As illustrated in FIG. 14, the SPAD 210 of the pixel 200 is provided, for example, on a semiconductor substrate 101 constituting the first substrate 71. In the semiconductor substrate 101, for example, when viewed from the light incident surface (lower surface in FIG. 12), it is partitioned into a plurality of element regions by an element isolation portion 110 (see, for example, FIG. 15). The SPAD 210 is provided in each element region defined by the element isolation portion 110. Note that the element isolation portion 110 may include an anode electrode 122 and an insulating film 109 in a first trench described later.

Each SPAD 210 includes a photoelectric conversion region 102, a P type semiconductor region 104, an N− type semiconductor region 103, a P+ type semiconductor region 105, an N+ type semiconductor region 106, a cathode contact 107, and an anode contact 108.

The photoelectric conversion region 102 is, for example, an N type well region or a region containing a low concentration of donor, and photoelectrically converts incident light to generate an electron-hole pair (hereinafter referred to as a charge).

The P type semiconductor region 104 is, for example, a region including a P type acceptor, and is provided in a region surrounding the photoelectric conversion region 102 as illustrated in FIGS. 14 and 15. The P type semiconductor region 104 forms an electric field for guiding charges generated in the photoelectric conversion region 102 to the N− type semiconductor region 103 by applying the reverse bias voltage to an anode contact 108 described later.

The N− type semiconductor region 103 is, for example, a region including a donor having a concentration higher than that of the photoelectric conversion region 102. As illustrated in FIGS. 14 and 15, the N− type semiconductor region 103 is arranged in a central portion of the photoelectric conversion region 102, takes in charges generated in the photoelectric conversion region 102, and guides the charges to the P+ type semiconductor region 105. Note that the N− type semiconductor region 103 is not a necessary component and may be omitted.

The P+ type semiconductor region 105 is, for example, a region including an acceptor having a concentration higher than that of the P type semiconductor region 104, and a part thereof is in contact with the P type semiconductor region 104. Further, the N+ type semiconductor region 106 is, for example, a region including a donor having a concentration higher than that of the N− type semiconductor region 103, and is in contact with the P+ type semiconductor region 105.

The P+ type semiconductor region 105 and the N+ type semiconductor region 106 form a PN junction, and function as an amplification region that accelerates charges flowed in to generate an avalanche current.

The cathode contact 107 is, for example, a region including a donor having a concentration higher than that of the N+ type semiconductor region 106, and is provided in a region in contact with the N+ type semiconductor region 106.

The anode contact 108 is, for example, a region including an acceptor having a concentration higher than that of the P+ type semiconductor region 105. The anode contact 108 is provided in a region in contact with an outer periphery of the P type semiconductor region 104. A width of the anode contact 108 may be, for example, about 40 nm (nanometer). Thus, by bringing the anode contact 108 into contact with the entire outer periphery of the P type semiconductor region 104, a uniform electric field can be formed in the photoelectric conversion region 102.

Further, as illustrated in FIGS. 14 and 15, the anode contact 108 is provided on a bottom surface of a trench (which is hereinafter referred to as a first trench) provided in a matrix along the element isolation portion 110 on a front surface (in the drawings, a lower surface) side of the semiconductor substrate 101. With such a structure, as described later, the formation position of the anode contact 108 is shifted in a height direction with respect to the formation position of the cathode contact 107 and the N+ type semiconductor region 106.

The front surface (in the drawings, the lower surface) side of the semiconductor substrate 101 is covered with the insulating film 109. A film thickness (thickness in a substrate width direction) of the insulating film 109 in the first trench depends on a voltage value of the reverse bias voltage applied between the anode and the cathode, but may be, for example, about 150 nm.

The insulating film 109 is provided with an opening for exposing the cathode contact 107 and the anode contact 108 on the surface of the semiconductor substrate 101, and a cathode electrode 121 in contact with the cathode contact 107 and the anode electrode 122 in contact with the anode contact 108 are provided in each opening.

The element isolation portion 110 defining each SPAD 210 is provided in a trench (which is hereinafter referred to as a second trench) penetrating the semiconductor substrate 101 from the front surface to a back surface. The second trench is connected to the first trench on the front surface side of the semiconductor substrate 101. An inner diameter of the second trench is narrower than an inner diameter of the first trench, and the anode contact 108 is formed in a step portion formed by the second trench.

Each element isolation portion 110 includes an insulating film 112 covering an inside surface of the second trench and a light shielding film 111 filling an inside of the second trench. The film thickness (thickness in the substrate width direction) of the insulating film 112 depends on the voltage value of the reverse bias voltage applied between the anode and the cathode, but may be, for example, about 10 nm to 20 nm. Further, the film thickness (thickness in the substrate width direction) of the light shielding film 111 depends on the material or the like used for the light shielding film 111, but may be, for example, about 150 nm.

Here, by using a conductive material having a light shielding property for the light shielding film 111 and the anode electrode 122, the light shielding film 111 and the anode electrode 122 can be formed in the same process.

Moreover, by using the same conductive material as the light shielding film 111 and the anode electrode 122 for the cathode electrode 121, the light shielding film 111, the anode electrode 122, and the cathode electrode 121 can be formed in the same process.

As the conductive material having such a light-shielding property, for example, tungsten (W) or the like can be used. However, the material is not limited to tungsten (W), and may be variously changed as long as it is a conductive material having a property of reflecting or absorbing visible light or light necessary for each element, such as aluminum (Al), an aluminum alloy, or copper (Cu).

However, the light shielding film 111 in the second trench is not limited to the conductive material, and for example, a high refractive index material having a refractive index higher than that of the semiconductor substrate 101, a low refractive index material having a refractive index lower than that of the semiconductor substrate 101, or the like can be used.

Further, since the material used for the cathode electrode 121 is not required to have a light shielding property, a conductive material such as copper (Cu) may be used instead of the conductive material having a light shielding property.

Note that, in the present embodiment, what is called a front full trench isolation (FFTI) type element isolation portion 110 in which the second trench penetrates the semiconductor substrate 101 from the front surface side is exemplified, but it is not limited thereto, and it is also possible to employ a full trench isolation (FTI) type element isolation in which the second trench penetrates the semiconductor substrate 101 from the back surface and/or the front surface side, or a deep trench isolation (DTI) type or reverse deep trench isolation (RDTI) type element isolation portion in which the second trench is formed from the front surface or the back surface to the middle of the semiconductor substrate 101.

In a case where the second trench is of the FTI type penetrating the semiconductor substrate 101 from the back surface side, the material of the light shielding film 111 may be embedded in the second trench from the back surface side of the semiconductor substrate 101.

Upper portions of the cathode electrode 121 and the anode electrode 122 protrude on a surface (in the drawings, the lower surface) of the insulating film 109. For example, the wiring layer 120 is provided on the surface (in the drawings, the lower surface) of the insulating film 109.

The wiring layer 120 includes an interlayer insulating film 123 and a wiring 124 provided in the interlayer insulating film 123. The wiring 124 is in contact with, for example, the cathode electrode 121 protruding on the surface (in the drawings, the lower surface) of the insulating film 109. Further, the wiring 124 is in contact with the connection pad 125 via a predetermined via or the like. Here, the wiring 124 can include the shield resistor part 211 (FIG. 13). Specifically, a part or all of the wiring 124 may be formed by a high-resistance polysilicon, a metal resistor, or the like. In this case, the wiring 124 is formed such that the resistance value Rsh as the shield resistor part 211 is larger than the resistance value $R_{ON}$ of the SPAD 210.

Note that, although omitted in FIG. 14, wiring in contact with the anode electrode 122 is also provided in the wiring layer 120. This wiring is connected to a predetermined wiring layer (not illustrated), and this wiring layer is connected to a connection pad (not illustrated) provided in a peripheral edge portion of the optical device 100 (FIG. 4A). By connecting this connection pad and a low potential terminal of the predetermined power supply, the anode electrode 122 can be maintained at a negative potential during the operation of the optical device 100.

The wiring layer 130 of the second substrate 72 is bonded to a lower surface of the wiring layer 120. As described above, this bonding is implemented by, for example, Cu—Cu bonding between the connection pad 125 and the connection pad 135. The wiring layer 130 includes an interlayer insulating film 131 and a wiring 132 provided in the interlayer insulating film 131. The wiring 132 is electrically connected to a circuit element 142 formed on a semiconductor substrate 141. The circuit element 142 includes the readout circuit 230. Therefore, the cathode electrode 121 of the semiconductor substrate 101 is connected to the readout circuit 230 illustrated in FIGS. 3A, 3B, 3C, and 3D via the wiring 124, the connection pad 125, the connection pad 135, and the wiring 132.

Further, a wiring 133 is also connected to the connection pad 135. The wiring 133 can include the quench resistor part 212 (FIG. 13). Specifically, a part or all of the wiring 133 is formed by a high-resistance polysilicon, a metal resistor, or the like, thereby forming the quench resistor part 212. In this case, the wiring 133 is formed such that the resistance value Rq as the quench resistor part 212 is larger than the resistance value Rsh of the shield resistor part 211. Further, the wiring 133 is connected to a predetermined wiring layer (not illustrated), and this wiring layer is connected to a connection pad (not illustrated) provided at the peripheral edge portion of the optical device 100. This connection pad is connected to the high potential terminal of the power supply described above. Thus, during the operation of the optical device 100, the (reverse bias) voltage corresponding to the Geiger region can be applied to the quench resistor part 212, the shield resistor part 211, and the SPAD 210.

Further, a pinning layer 113 and a planarization film 114 are provided on the back surface (in the drawings, the upper surface) of the semiconductor substrate 101. Moreover, a color filter 115 and an on-chip lens 116 for each pixel 200 are provided on the planarization film 114. Note that, although the color filter 115 and the on-chip lens 116 are provided in the present embodiment, a configuration in which the color filter and/or the on-chip lens are not provided is also possible according to the use application and purpose of the optical device 100.

The pinning layer 113 is, for example, a fixed charge film including a hafnium oxide ($HfO_2$) film or an aluminum oxide ($Al_2O_3$) film containing a predetermined concentration of an acceptor. The planarization film 114 is, for example, an insulating film formed by an insulating material such as silicon oxide ($SiO_2$) or silicon nitride (SiN), and is a film for planarizing a surface on which the color filter 115 and the on-chip lens 116 on the upper layer are formed.

In the structure as described above, when the (reverse bias) voltage corresponding to the Geiger region is applied between the cathode contact 107 and the anode contact 108, an electric field for guiding the charge generated in the photoelectric conversion region 102 to the N− type semiconductor region 103 is formed by a potential difference between the P type semiconductor region 104 and the N+ type semiconductor region 106. In addition, in the PN junction region between the P+ type semiconductor region 105 and the N+ type semiconductor region 106, a strong electric field that generates the avalanche current by accelerating the entered charges is formed. The operation of the SPAD 210 as the avalanche photodiode is thereby permitted.

Figure 16:
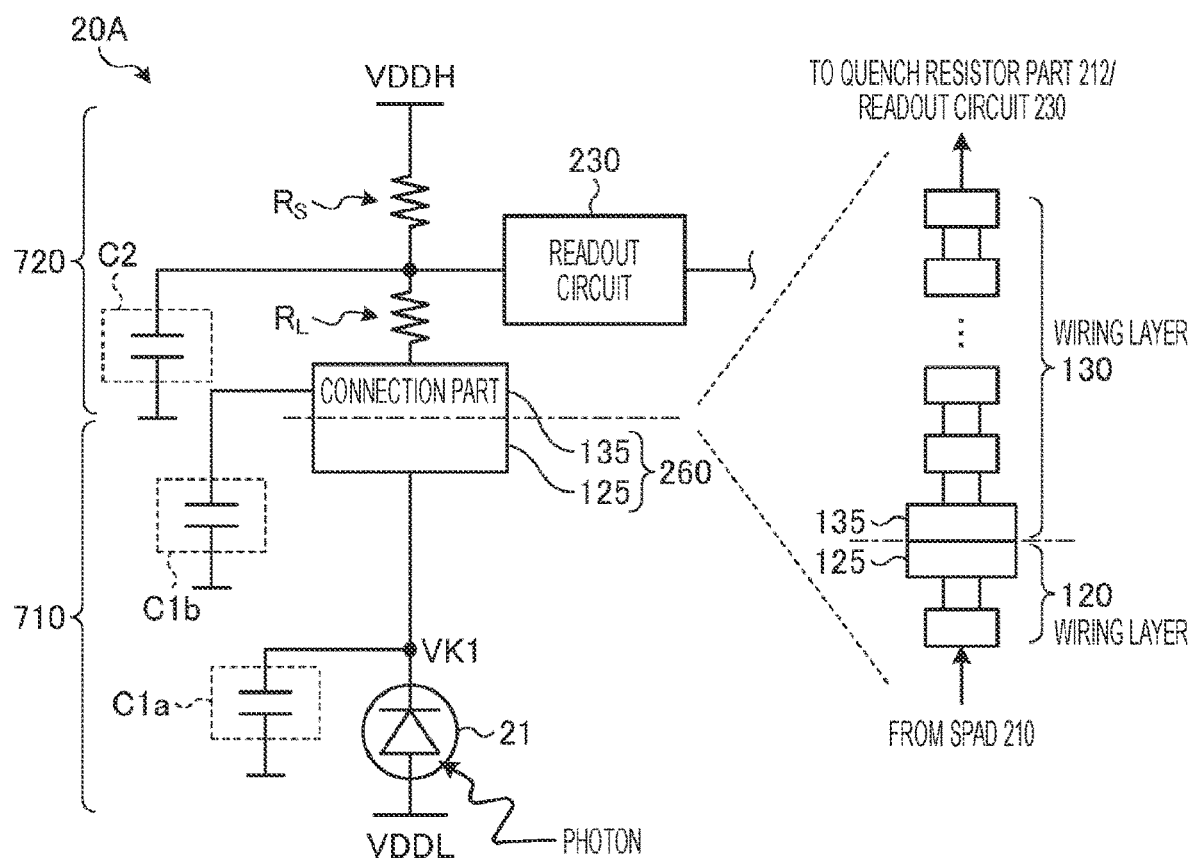
FIG. 16 is a schematic diagram illustrating a pixel included in an optical device according to a comparative example.

Next, effects of the optical device according to the present embodiment will be described in comparison with the com-parative example. FIG. 16 is a schematic diagram illustrating a configuration of a pixel included in an optical device according to a comparative example. Referring to FIG. 16, in the pixel 20A of the optical device according to the comparative example, the SPAD 21 is connected to the resistor $R_L$ and the resistor $R_S$ connected in series with each other via a bonding part 260. The bonding part 260 is formed by the connection pad 125 and the connection pad 135, similarly to the bonding part 260 in the fourth embodiment of the present disclosure. Further, the readout circuit 230 is connected to a connection point between the resistor $R_L$ and the resistor $R_S$. Here, the SPAD 21 and the connection pad 135 are formed in the first substrate 710, and the connection pad 125, the resistor $R_L$, and the resistor $R_S$ are formed in the second substrate 720.

In the bonding part 260, the two connection pads 135 and 125 are bonded by, for example, Cu—Cu bonding, and the parasitic capacitance C1b is generated by such bonding. Thus, when the reverse bias voltage corresponding to the Geiger region is applied to the SPAD 21, if photons are incident on the SPAD 21 and the avalanche amplification occurs, a current flows from both of a parasitic capacitance C1a and a parasitic capacitance C1b to the SPAD 21.

On the other hand, in the pixel 200 of the optical device according to the fourth embodiment, as illustrated in FIG. 13, the shield resistor part 211 is provided between the SPAD 210 and the connection pad 135. Since the shield resistor part 211 has the resistance value Rsh larger than the resistance value $R_{ON}$ of the SPAD 210, the current from the parasitic capacitance (in FIG. 13, it is included in the parasitic capacitance C2) generated by the bonding part 260 is hindered, and the current mainly flows from the parasitic capacitance C1 to the SPAD 210. As compared with the case where the current flows from both the parasitic capacitance C1a and the parasitic capacitance C1b to the SPAD 21 in the above-described comparative example, in a case where the current flows from the parasitic capacitance C1 to the SPAD 210, the amount of current can be small, and thus the power consumption can be reduced. Further, since the time constant determined by the resistance value $R_{ON}$ of the SPAD 210 and the parasitic capacitance C1 is smaller than the time constant determined by the resistance value Rsh of the shield resistor part 211 and the parasitic capacitance C2, in a case where there is no contribution of the current from the parasitic capacitance C2, the period during which the avalanche amplification occurs can be shortened.

Further, in the optical device according to the fourth embodiment, the SPAD 210 and the readout circuit 230 are arranged vertically. Thus, the pixel area viewed from the light incident direction can be reduced as compared with a case where the SPAD 210 and the readout circuit 230 are juxtaposed. Therefore, the density of pixels can be increased.

[Modification example of fourth embodiment] Hereinafter, modification examples of the fourth embodiment will be described with reference to FIGS. 17A, 17B, 17C, 17D, and 17E. These modification examples are common to the fourth embodiment in that the first substrate 71 and the second substrate 72 are bonded by the bonding part 260, and are different from the fourth embodiment in that a plurality of SPADs 210 is electrically connected to one readout circuit 230.

Modification Example 1

Figure 17A:
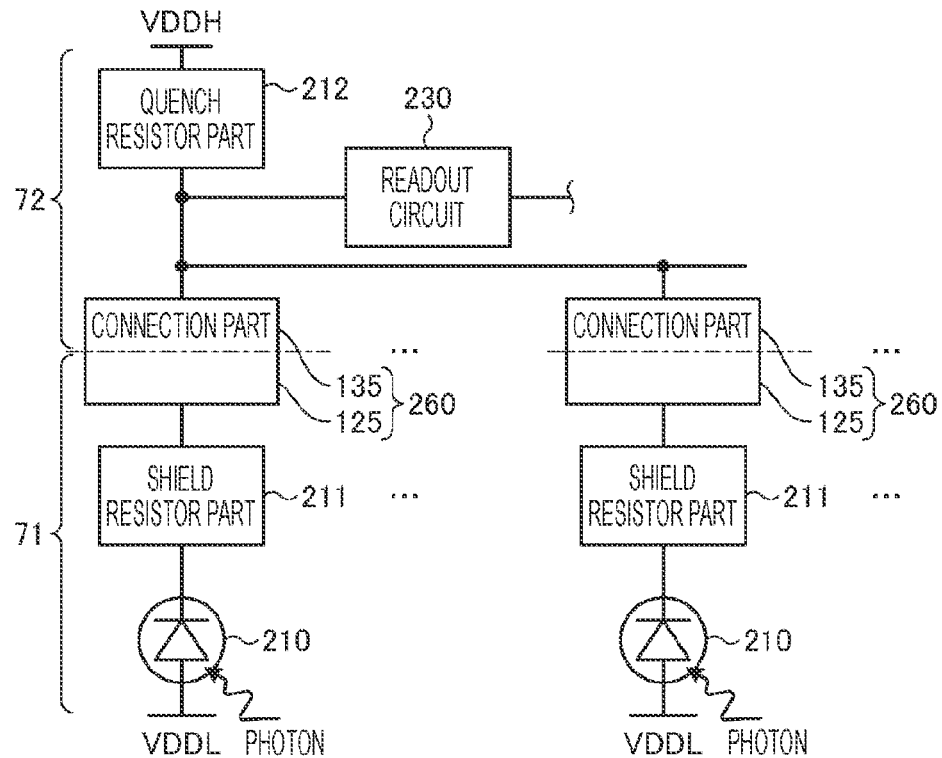
FIG. 17A is a block diagram illustrating Modification Example 1 of the pixel of the optical device according to the fourth embodiment.

FIG. 17A is a block diagram illustrating Modification Example 1 of the pixel of the optical device according to the fourth embodiment. Referring to FIG. 17A, the first substrate 71 is provided with a plurality of connection pads 125. Upper surfaces of the plurality of connection pads 125 are flush with the upper surface of the first substrate 71. Further, the SPAD 210 and the shield resistor part 211 are connected in series to each of the plurality of connection pads 125 inside the first substrate 71. Here, as in the embodiments described so far, the resistance value $R_{ON}$ of the SPAD 210 and the resistance value Rsh of the shield resistor part 211 have a relationship of $R_{ON}$<Rsh.

On the other hand, the second substrate 72 is provided with a plurality of connection pads 135. Lower surfaces of the plurality of connection pads 135 are flush with a lower surface of the second substrate 72. Further, the plurality of connection pads 135 is connected in parallel to each other, and the plurality of connection pads 135 connected in parallel is connected to the quench resistor part 212 and the readout circuit 230. Here, the resistance value Rq of the quench resistor part 212 and the resistance value Rsh of the shield resistor part 211 of the first substrate 71 have a relationship of Rsh<Rq.

Moreover, the plurality of connection pads 135 of the second substrate 72 is Cu—Cu bonded to the corresponding connection pads 125 of the first substrate 71. Thus, the SPAD 210 and the readout circuit 230 are electrically connected, and the first substrate 71 and the second substrate 72 are mechanically connected.

With such a configuration, a change in the cathode potential of each SPAD 210 is detected by one readout circuit 230 via the shield resistor part 211 and the bonding part 260 provided for each SPAD 210. In other words, one readout circuit 230 is shared by a plurality of SPADs 210. Further, since one readout circuit 230 is formed in one pixel, in this modification example, it can be said that the plurality of SPADs 210 is provided in one pixel. By providing the plurality of SPADs 210 per pixel, photon detection for every pixel can be reliably performed.

Further, as in the above-described embodiments (including the specific examples and modification examples), there is a relationship of $R_{ON}$<Rsh between the resistance value $R_{ON}$ of the SPAD 210 and the resistance value Rsh of the shield resistor part 211, and there is a relationship of Rsh<Rq between the resistance value Rq of the quench resistor part 212 and the resistance value Rsh of the shield resistor part 211 of the first substrate 71. Therefore, this modification example also exhibits effects such as reduction in the dead time and reduction in the power consumption.

Modification Example 2

Figure 17B:
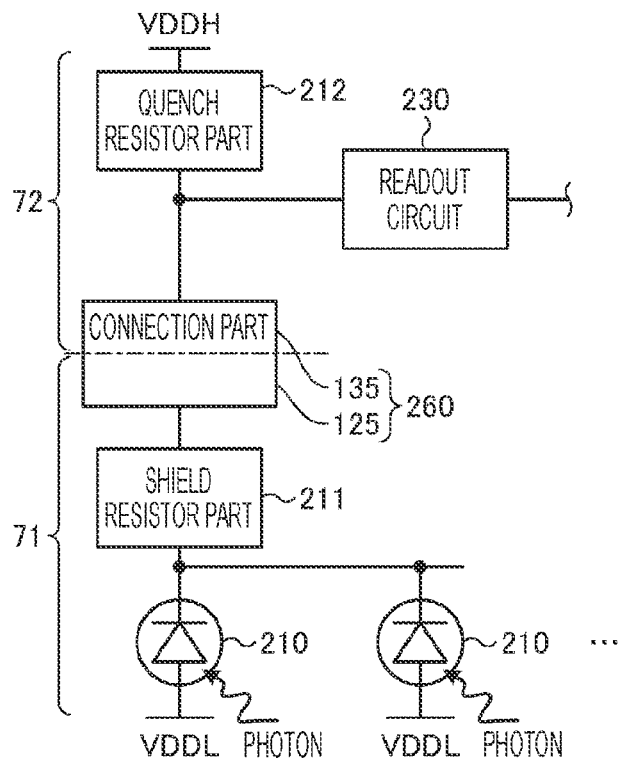
FIG. 17B is a block diagram illustrating Modification Example 2 of the pixel of the optical device according to the fourth embodiment.

FIG. 17B is a block diagram illustrating Modification Example 2 of the pixel of the optical device according to the fourth embodiment. Referring to FIG. 17B, a plurality of SPADs 210 is connected in parallel on the first substrate 71, and the plurality of SPADs 210 connected in parallel is connected to one shield resistor part 211. That is, the plurality of SPADs 210 is connected in parallel to the shield resistor part 211. Further, the shield resistor part 211 is connected to the connection pad 125. An upper surface of the connection pad 125 is flush with the upper surface of the first substrate 71. Here, the resistance value $R_{ON}$ of each SPAD 210 and the resistance value Rsh of the shield resistor part 211 have a relationship of $R_{ON}$<Rsh.

On the other hand, a connection pad 135 is provided in the second substrate 72. The lower surface of the connection pad 135 is flush with the lower surface of the second substrate 72. Further, the quench resistor part 212 and the readout circuit 230 are connected to the connection pad 135. The resistance value Rq of the quench resistor part 212 and the resistance value Rsh of the shield resistor part 211 of the first substrate 71 have a relationship of Rsh<Rq.

Moreover, the connection pad 135 is Cu—Cu bonded to the connection pad 125 of the first substrate 71. Thus, the SPAD 210 and the readout circuit 230 are electrically connected, and the first substrate 71 and the second substrate 72 are mechanically connected.

With such a configuration, a change in the cathode potential of each SPAD 210 is detected by one readout circuit 230 via a set of the shield resistor part 211 and the bonding part 260. Modification Example 2 is the same as Modification Example 1 described above in that one readout circuit 230 is shared by the plurality of SPADs 210. Further, since one readout circuit 230 is formed in one pixel, in this modification example, it can be said that the plurality of SPADs 210 can be provided in one pixel. By providing the plurality of SPADs 210 per pixel, photon detection for every pixel can be reliably performed.

Further, as in the above-described embodiments (including the specific examples and the modification examples), there is a relationship of $R_{ON}$<Rsh between the resistance value $R_{ON}$ of each SPAD 210 and the resistance value Rsh of the shield resistor part 211, and there is a relationship of Rsh<Rq between the resistance value Rq of the quench resistor part 212 and the resistance value Rsh of the shield resistor part 211 of the first substrate 71. Therefore, this modification example also exhibits effects such as reduction in the dead time and reduction in the power consumption.

Modification Example 3

Figure 17C:
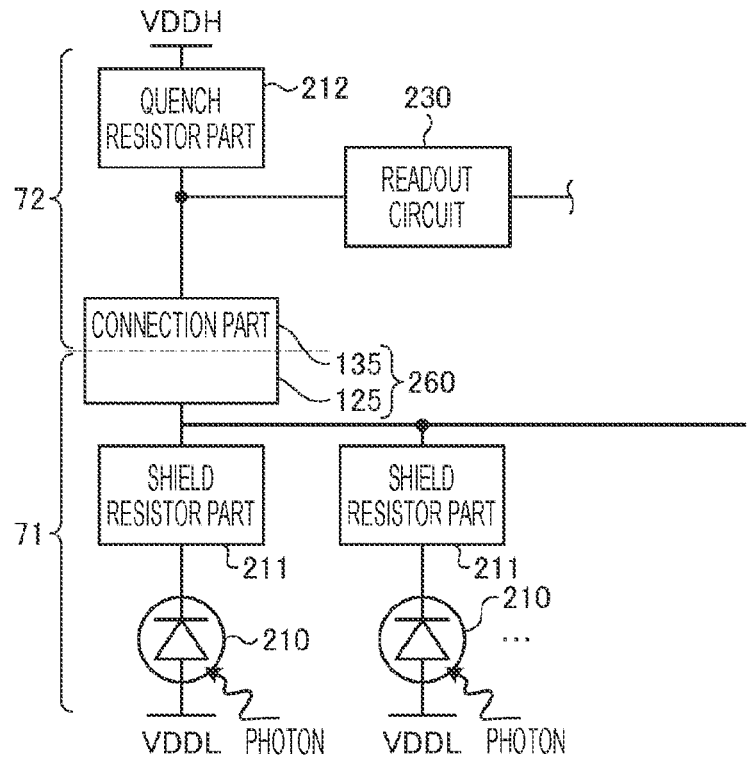
FIG. 17C is a block diagram illustrating Modification Example 3 of the pixel of the optical device according to the fourth embodiment.

FIG. 17C is a block diagram illustrating Modification Example 3 of the pixel of the optical device according to the fourth embodiment. Referring to FIG. 17C, in the first substrate 71, a plurality of pairs of the SPAD 210 and the shield resistor part 211 connected in series to each other is connected in parallel to the connection pad 125. The connection pad 125 is formed such that the upper surface thereof is flush with the upper surface of the first substrate 71. Here, the resistance value $R_{ON}$ of the SPAD 210 and the resistance value Rsh of the shield resistor part 211 connected in series with the SPAD 210 have a relationship of $R_{ON}$<Rsh.

One connection pad 135 is formed in the second substrate 72 such that the lower surface thereof is flush with the lower surface of the second substrate 72. Further, the quench resistor part 212 and the readout circuit 230 are connected to the connection pad 135. The resistance value Rq of the quench resistor part 212 and the resistance value Rsh of the shield resistor part 211 of the first substrate 71 have a relationship of Rsh<Rq.

The connection pad 135 is Cu—Cu bonded to the connection pad 125 of the first substrate 71. Thus, the SPAD 210 and the readout circuit 230 are electrically connected, and the first substrate 71 and the second substrate 72 are mechanically connected.

In Modification Example 3, a change in the cathode potential of each SPAD 210 is detected by one readout circuit 230 via a set of the shield resistor part 211 and the bonding part 260. Modification Example 3 is the same as Modification Example 1 described above in that one readout circuit 230 is shared by the plurality of SPADs 210. Further, since one readout circuit 230 is formed in one pixel, in this modification example, it can be said that the plurality of SPADs 210 can be provided in one pixel. By providing the plurality of SPADs 210 per pixel, photon detection for every pixel can be reliably performed.

Further, as in the above-described embodiments (including the specific examples and the modification examples), there is a relationship of $R_{ON}$<Rsh between the resistance value $R_{ON}$ of each SPAD 210 and the resistance value Rsh of the shield resistor part 211, and there is a relationship of Rsh<Rq between the resistance value Rq of the quench resistor part 212 and the resistance value Rsh of the shield resistor part 211 of the first substrate 71. Therefore, this modification example also exhibits effects such as reduction in the dead time and reduction in the power consumption.

Modification Example 4

Figure 17D:
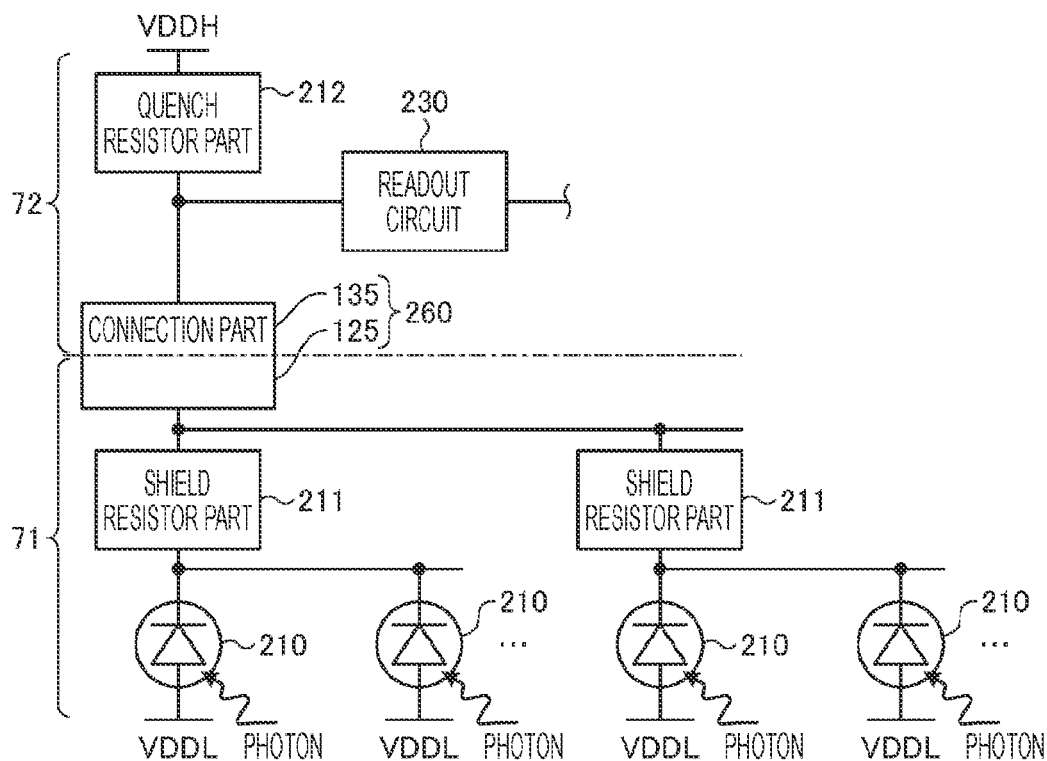
FIG. 17D is a block diagram illustrating Modification Example 4 of the pixel of the optical device according to the fourth embodiment.

FIG. 17D is a block diagram illustrating Modification Example 4 of the pixel of the optical device according to the fourth embodiment. Referring to FIG. 17D, as in Modification Example 2 illustrated in FIG. 17B, a plurality of SPADs 210 is connected in parallel on the first substrate 71, and the plurality of SPADs 210 connected in parallel is connected to one shield resistor part 211. However, in Modification Example 4, in a case where the plurality of SPADs 210 and the shield resistor part 211 connected in this manner are assumed as one group, a plurality of groups of the plurality of SPADs 210 and the shield resistor part 211 is provided. The shield resistor part 211 of each group is connected to the connection pad 125 at an end opposite to a connection part with the SPAD 210. The connection pad 125 is formed such that the upper surface thereof is flush with the upper surface of the first substrate 71. Also in Modification Example 4, the resistance value $R_{ON}$ of the SPAD 210 and the resistance value Rsh of the shield resistor part 211 to which the SPAD 210 is connected in series have a relationship of $R_{ON}$<Rsh.

One connection pad 135 is formed in the second substrate 72 such that the lower surface thereof is flush with the lower surface of the second substrate 72. Further, the quench resistor part 212 and the readout circuit 230 are connected to the connection pad 135. The resistance value Rq of the quench resistor part 212 and the resistance value Rsh of each shield resistor part 211 of the first substrate 71 have a relationship of Rsh<Rq.

The connection pad 135 is Cu—Cu bonded to the connection pad 125 of the first substrate 71. Thus, the SPAD 210 and the readout circuit 230 are electrically connected, and the first substrate 71 and the second substrate 72 are mechanically connected.

Also in Modification Example 4, a change in the cathode potential of each SPAD 210 is detected by one readout circuit 230. Modification Example 4 is the same as Modification Example 1 described above in that one readout circuit 230 is shared by the plurality of SPADs 210. Further, since one readout circuit 230 is formed in one pixel, also in this modification example, the plurality of SPADs 210 is provided in one pixel. By providing the plurality of SPADs 210 per pixel, photon detection for every pixel can be reliably performed.

Further, similarly to the above-described embodiments (including the specific examples and the modification examples), there is a relationship of $R_{ON}$<Rsh between the resistance value $R_{ON}$ of the SPAD 210 and the resistance value Rsh of the shield resistor part 211 to which the SPAD 210 is connected, and there is a relationship of Rsh<Rq between the resistance value Rq of the quench resistor part 212 and the resistance value Rsh of each shield resistor part 211 of the first substrate 71. Therefore, this modification example also exhibits effects such as reduction in the dead time and reduction in the power consumption.

Modification Example 5

Figure 17E:
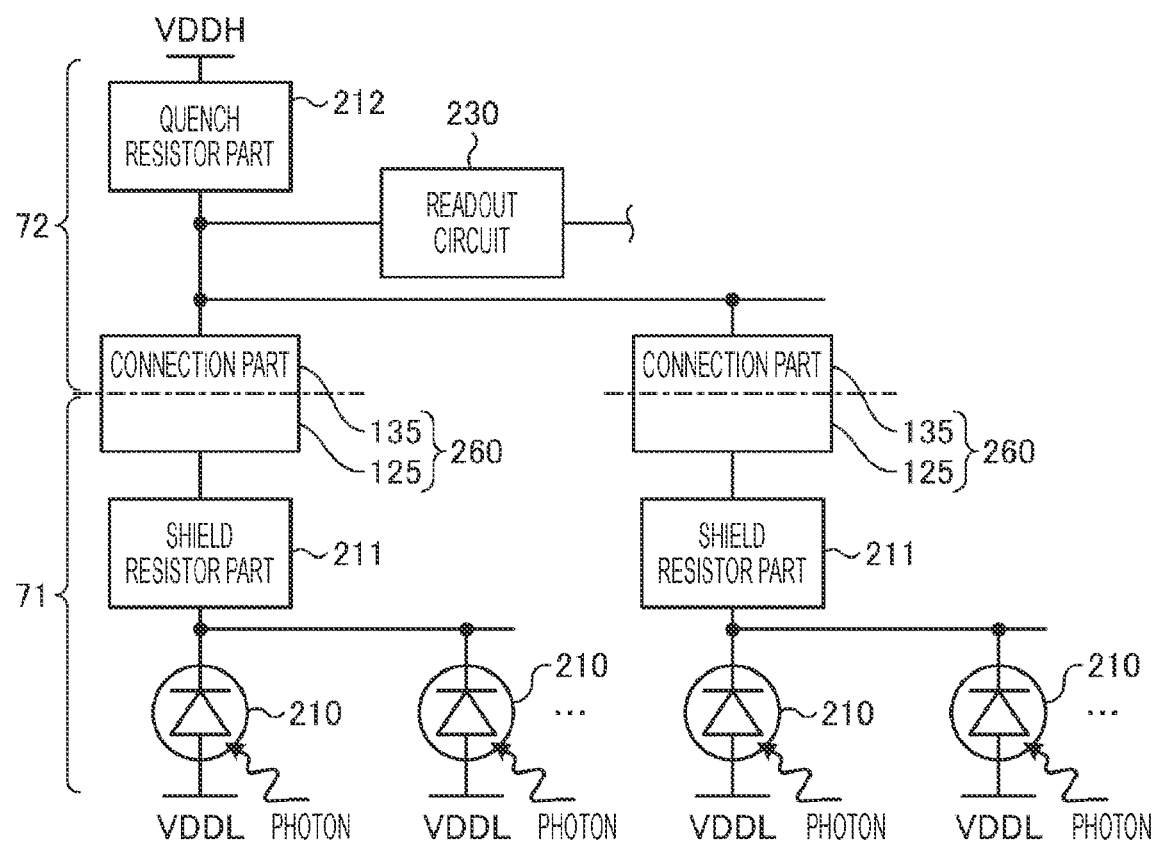
FIG. 17E is a block diagram illustrating Modification Example 5 of the pixel of the optical device according to the fourth embodiment.

FIG. 17E is a block diagram illustrating Modification Example 5 of the pixel of the optical device according to the fourth embodiment. Referring to FIG. 17E, as in Modification Example 4 illustrated in FIG. 17D, in the first substrate 71, a plurality of SPADs 210 is connected in parallel, and the plurality of SPADs 210 connected in parallel is connected to one shield resistor part 211. Further, in a case where the plurality of SPADs 210 and the shield resistor part 211 connected in this manner are assumed as one group, it is also similar to Modification Example 4 in that a plurality of groups is provided. However, in Modification Example 5, a plurality of connection pads 125 is provided, and the shield resistor parts 211 of respective groups are connected to the corresponding connection pads 125. The connection pads 125 are formed such that the upper surfaces thereof are flush with the upper surface of the first substrate 71. Further, also in Modification Example 5, there is a relationship of $R_{ON}$<Rsh between the resistance value $R_{ON}$ of the SPAD 210 and the resistance value Rsh of the shield resistor part 211 to which the SPAD 210 is connected.

The connection pad 135 is Cu—Cu bonded to the connection pad 125 of the first substrate 71. Thus, the SPADs 210 and the readout circuit 230 are electrically connected, and the first substrate 71 and the second substrate 72 are mechanically connected.

Also in Modification Example 5, a change in the cathode potential of each SPAD 210 is detected by one readout circuit 230. Modification Example 5 is the same as Modification Example 1 described above in that one readout circuit 230 is shared by the plurality of SPADs 210. Further, since one readout circuit 230 is formed in one pixel, also in this modification example, the plurality of SPADs 210 is provided in one pixel. By providing the plurality of SPADs 210 per pixel, photon detection for every pixel can be reliably performed.

Further, similarly to the above-described embodiments (including the specific examples and the modification examples), there is a relationship of $R_{ON}$<Rsh between the resistance value $R_{ON}$ of the SPAD 210 and the resistance value Rsh of the shield resistor part 211 to which the SPAD 210 is connected, and there is a relationship of Rsh<Rq between the resistance value Rq of the quench resistor part 212 and the resistance value Rsh of each shield resistor part 211 of the first substrate 71. Therefore, this modification example also exhibits effects such as reduction in the dead time and reduction in the power consumption.

Modification Example 6

Figure 18A:
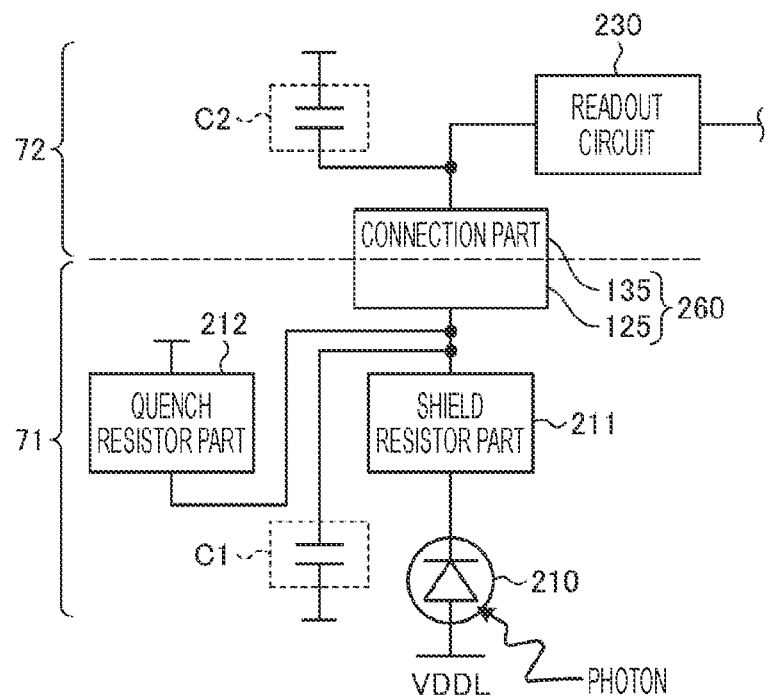
FIG. 18A is a block diagram illustrating Modification Example 6 of the pixel of the optical device according to the fourth embodiment.

Next, Modification Example 6 and Modification Example 7 of the fourth embodiment will be described with reference to FIGS. 18A and 18B. FIG. 18A is a block diagram illustrating Modification Example 6 of the pixel of the optical device according to the fourth embodiment. Referring to FIG. 18A, in the first substrate 71, the cathode of the SPAD 210 is connected to one end of the shield resistor part 211, and the other end of the shield resistor part 211 is connected to the connection pad 125. Also in Modification Example 6, there is a relationship of $R_{ON}$<Rsh between the resistance value $R_{ON}$ of the SPAD 210 and the resistance value Rsh of the shield resistor part 211 to which the SPAD 210 is connected.

Further, in Modification Example 6, unlike the fourth embodiment (and Modification Examples 1 to 5 thereof), the quench resistor part 212 is formed in the first substrate 71 instead of the second substrate 72. Such a quench resistor part 212 can be formed, for example, by providing a predetermined wiring in a region between the wiring 124 and the connection pad 125 in the first substrate 71 in FIG. 14. This wiring can include a polysilicon resistor or a metal resistor in part or in whole. Further, this wiring is electrically connected at one end to the wiring 124 (for example, a predetermined via or the like) provided with the shield resistor part 211, and is electrically connected at the other end to a predetermined pad of the peripheral edge portion of the first substrate 71. By electrically connecting this pad to the high potential terminal of the predetermined power supply, the reverse bias voltage can be applied across the quench resistor part 212 and the anode of the SPAD 210. Further, even in a case where the quench resistor part 212 is formed in the first substrate 71, the quench resistor part 212 is formed so that the relationship of Rsh<Rq is satisfied between the resistance value Rq of the quench resistor part 212 and the resistance value Rsh of the shield resistor part 211.

Even in the case configured as described above, during the avalanche amplification, the current from the parasitic capacitance C2 is hindered by the shield resistor part 221 and only slightly flows. Further, the current flowing through the quench resistor part 212 to the SPAD 210 is also only slight because it is hindered by the quench resistor part 212 and the shield resistor part 211. That is, during the avalanche amplification, the current mainly flows from the parasitic capacitance C1 to the SPAD 210. Further, after the quenching occurs, charges move from the parasitic capacitance C2 to the parasitic capacitance C1, and after the voltage across the parasitic capacitance C1 and the voltage across the parasitic capacitance C2 become equal, the current is supplied through the quench resistor part 212, and the recharge proceeds. That is, also in Modification Example 6, operations similar to the series of operations such as the avalanche amplification, the quenching, the charge redistribution, and the recharge in the first to fourth embodiments (including the modification examples) are performed. Therefore, Modification Example 6 also exhibits effects such as reduction in the dead time and reduction in the power consumption.

Modification Example 7

Figure 18B:
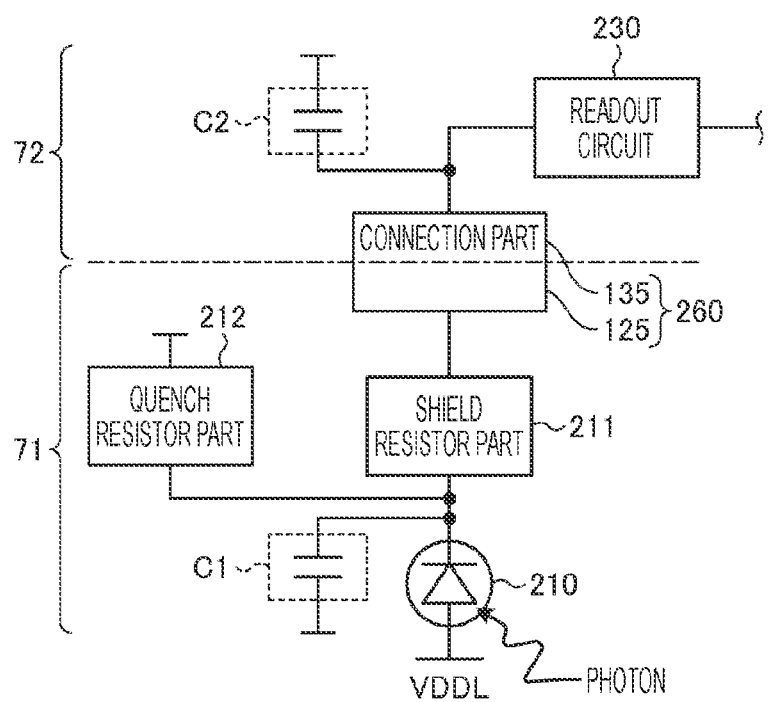
FIG. 18B is a block diagram illustrating Modification Example 7 of the pixel of the optical device according to the fourth embodiment.

FIG. 18B is a block diagram illustrating Modification Example 7 of the pixel of the optical device according to the fourth embodiment. Referring to FIG. 18B, also in Modification Example 7, similarly to Modification Example 6, the quench resistor part 212 is provided in the first substrate 71. However, in Modification Example 7, one end of the quench resistor part 212 is connected to a connection point between the cathode of the SPAD 210 and the shield resistor part 211.

Such a quench resistor part 212 can be formed by, for example, providing a predetermined wiring in a region between the wiring 124 and the cathode electrode 121 in the first substrate 71 in FIG. 14. This wiring can include a polysilicon resistor or a metal resistor in part or in whole. Further, this wiring is electrically connected to the cathode electrode 121 at one end, and is electrically connected to a predetermined pad on the peripheral edge portion of the first substrate 71 at the other end. By electrically connecting the pad and the high potential terminal of the predetermined power supply and electrically connecting the anode of the SPAD 210 to the low potential terminal, the reverse bias voltage can be applied across the quench resistor part 212 and the anode of the SPAD 210. Further, even in a case where the quench resistor part 212 is formed in the first substrate 71, the quench resistor part 212 is formed so that the relationship of Rsh<Rq is satisfied between the resistance value Rq of the quench resistor part 212 and the resistance value Rsh of the shield resistor part 211.

Further, there is a relationship of $R_{ON}$<Rsh between the resistance value $R_{ON}$ of the SPAD 210 and the resistance value Rsh of the shield resistor part 211 to which the SPAD 210 is connected.

Even in the case configured as described above, the current mainly flows from the parasitic capacitance C1 to the SPAD 210 during the avalanche amplification, and the current from the parasitic capacitance C2 is hindered by the shield resistor part 221 and the quench resistor part 212 and only slightly flows. Further, after the quenching occurs, charges move from the parasitic capacitance C2 to the parasitic capacitance C1, and after the voltage across the parasitic capacitance C1 and the voltage across the parasitic capacitance C2 become equal, the current is supplied through the quench resistor part 212, and the recharge proceeds. That is, also in Modification Example 7, operations similar to the series of operations such as the avalanche amplification, the quenching, the charge redistribution, and the recharge in the first to fourth embodiments (including the modification examples) are performed. Therefore, Modification Example 7 also exhibits effects such as reduction in the dead time and reduction in the power consumption.

Even in the case configured as described above, during the avalanche amplification, the current from the parasitic capacitance C2 is hindered by the shield resistor part 221 and only slightly flows. Further, the current flowing through the quench resistor part 212 to the SPAD 210 is also very small because it is hindered by the quench resistor part 212. That is, during the avalanche amplification, the current mainly flows from the parasitic capacitance C1 to the SPAD 210. Further, after the quenching occurs, charges move from the parasitic capacitance C2 to the parasitic capacitance C1, and after the voltage across the parasitic capacitance C1 and the voltage across the parasitic capacitance C2 become equal, the current is supplied through the quench resistor part 212, and the recharge proceeds. That is, also in Modification Example 7, operations similar to the series of operations such as the avalanche amplification, the quenching, the charge redistribution, and the recharge in the first to fourth embodiments (including the modification examples) are performed. Therefore, Modification Example 7 also exhibits effects such as reduction in the dead time and reduction in the power consumption.

Figure 19A:
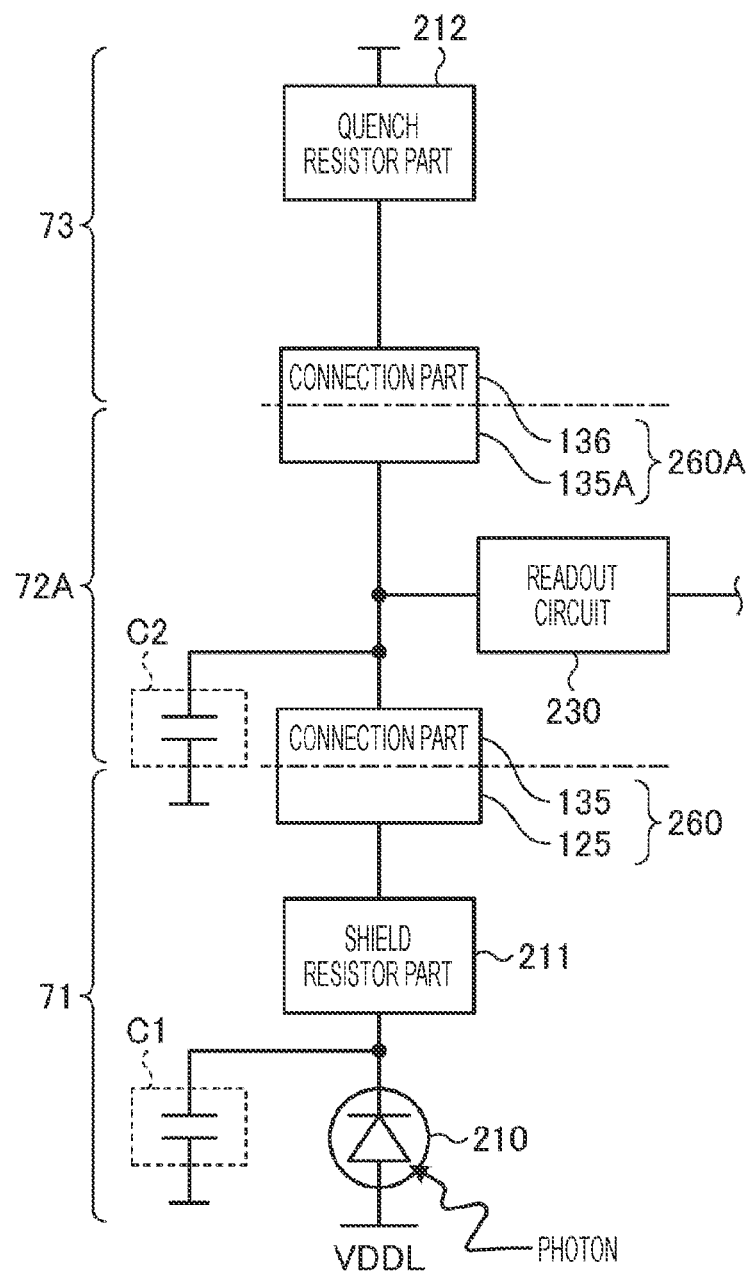
FIG. 19A is a block diagram illustrating Modification Example 8 of the pixel of the optical device according to the fourth embodiment.

[Modification Example 8] Next, other Modification Examples 8 and 9 of the fourth embodiment will be described with reference to FIGS. 19A, 19B, and 19C. As illustrated in FIG. 19A, the pixel in Modification Example 8 includes a first substrate 71, a second substrate 72A, and a third substrate 73. The first substrate 71 includes the SPAD 210 and the shield resistor part 211 connected in series thereto, similarly to the first substrate 71 in the fourth embodiment. The readout circuit 230 is provided in the second substrate 72A. The quench resistor part 212 is provided in the third substrate 73.

The second substrate 72A further includes the connection pad 135 in a lower surface in FIG. 19A. In the present modification example, the lower surface of the connection pad 135 is flush with the lower surface of the second substrate 72A. Further, the second substrate 72A includes a connection pad 135A in a surface (upper surface in FIG.

19A) opposite to the lower surface. In the present modification example, an upper surface of the connection pad 135A is flush with the upper surface of the second substrate 72A. The connection pad 135 and the connection pad 135A are connected by a predetermined wiring, and this wiring is also connected to the readout circuit 230. The second substrate 72A may be, for example, a silicon substrate, and the readout circuit 230 may include a transistor, a wiring, other circuit elements, and the like formed on the silicon substrate. Further, the connection pad 135 and the connection pad 135A can be connected by, for example, a via, a wiring, or the like.

The third substrate 73 includes a connection pad 136 in a lower surface in FIG. 19A. In the present modification example, the lower surface of the connection pad 136 is flush with the lower surface of the third substrate 73. The connection pad 136 is connected to the quench resistor part 212 by, for example, a via, a wiring, or the like.

Here, the connection pad 125 of the first substrate 71 is bonded to the connection pad 135 of the second substrate 72A by, for example, Cu—Cu bonding, thereby forming the bonding part 260. Then, the shield resistor part 211 of the first substrate 71 and the readout circuit 230 of the second substrate 72A are electrically connected via the bonding part 260. Further, the first substrate 71 and the second substrate 72A are mechanically bonded by the bonding part 260.

The connection pad 135A of the second substrate 72A is bonded to the connection pad 136 of the third substrate 73 by, for example, Cu—Cu bonding, thereby forming a bonding part 260A. Then, the readout circuit 230 of the second substrate 72A and the quench resistor part 212 of the third substrate 73 are electrically connected via the bonding part 260A. Further, the second substrate 72A and the third substrate 73 are mechanically bonded by the bonding part 260A. Moreover, the quench resistor part 212 is electrically connected to the shield resistor part 211 of the first substrate 71 via the bonding parts 260 and 260A.

Modification Example 8 having the above configuration is different from the fourth embodiment in that the quench resistor part 212 and the readout circuit 230 are formed in the separate substrates and connected by the bonding part 260A. However, the present embodiment is similar to the fourth embodiment in that the shield resistor part 211 has the resistance value Rsh larger than the resistance value $R_{ON}$ of the SPAD 210, and the quench resistor part 212 has the resistance value Rq larger than the resistance value Rsh of the shield resistor part 211.

Further, the parasitic capacitance C2 is generated between the connection pad 135 and the readout circuit 230, and the parasitic capacitance C1 is generated at the cathode of the SPAD 210. The parasitic capacitance C2 is a combined capacitance of a capacitance by the bonding part 260, a capacitance by the wiring connecting the connection pad 135 and the connection pad 135A, and a capacitance by the readout circuit 230. Since many connection pads, wirings, and circuit elements are formed on the second substrate 72A, the capacitance of the parasitic capacitance C2 tends to be larger than the capacitance of the parasitic capacitance C1.

Therefore, also in Modification Example 8, similarly to the fourth embodiment, the dead time can be shortened and the power consumption can be reduced while reducing the input voltage to the readout circuit 230.

Modification Example 9

Figure 19B:
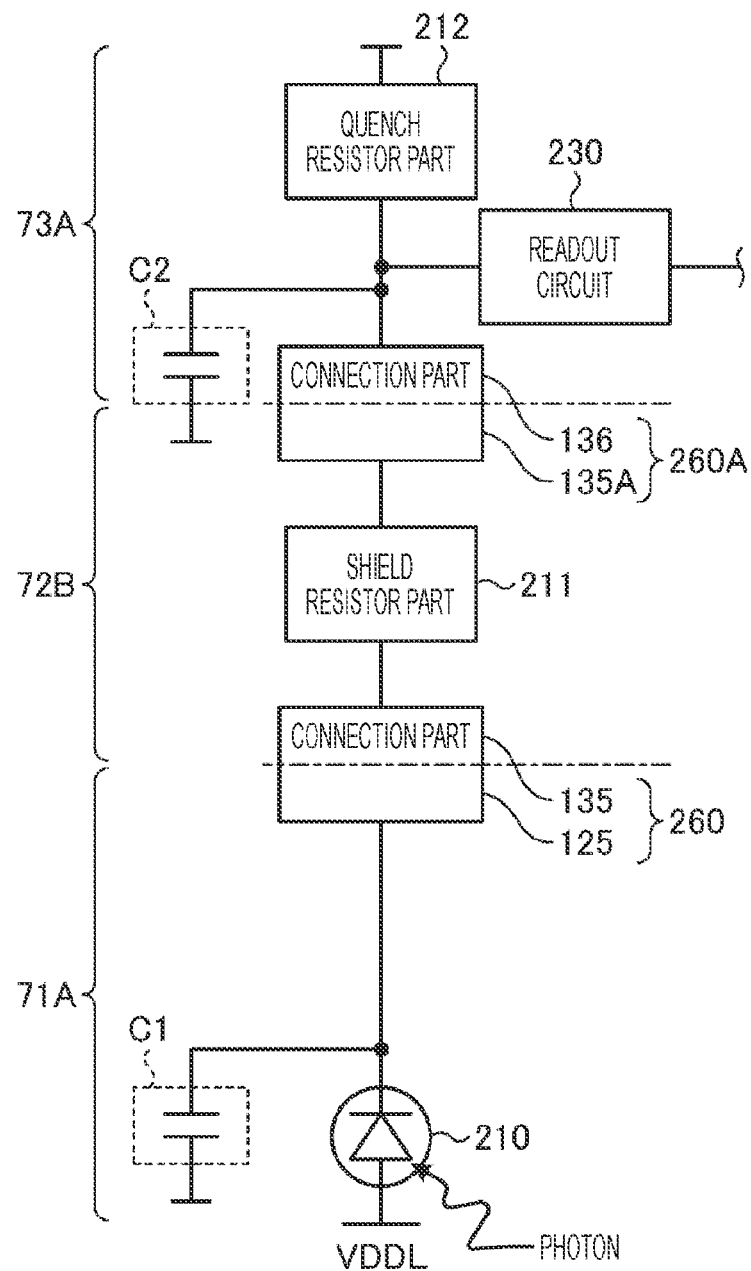
FIG. 19B is a block diagram illustrating Modification Example 9 of the pixel of the optical device according to the fourth embodiment.

FIG. 19B is a block diagram illustrating Modification Example 9 of the pixel of the optical device according to the fourth embodiment. As illustrated, the pixel in Modification Example 9 includes a first substrate 71A, a second substrate 72B, and a third substrate 73A. The SPAD 210 is provided in the first substrate 71, the shield resistor part 211 is provided in the second substrate 72A, and the quench resistor part 212 and the readout circuit 230 are provided in the third substrate 73A.

The first substrate 71A further includes the connection pad 125 on an upper surface in FIG. 19B. In the present modification example, the upper surface of the connection pad 125 is flush with the upper surface of the first substrate 71A. The connection pad 125 is connected to the cathode of the SPAD 210.

The second substrate 72B includes the connection pad 135 in a lower surface in FIG. 19B. In the present modification example, the lower surface of the connection pad 135 is flush with the lower surface of the second substrate 72B. The connection pad 135 is connected to the shield resistor part 211 by, for example, a via, a wiring, or the like. Further, the second substrate 72B includes the connection pad 135A on an upper surface (surface opposite to the lower surface). In the present modification example, the upper surface of the connection pad 135A is flush with the upper surface of the second substrate 72B.

The third substrate 73A includes the connection pad 136 in a lower surface in FIG. 19B. In the present modification example, the lower surface of the connection pad 136 is flush with the lower surface of the third substrate 73A. The connection pad 136 is connected to the quench resistor part 212 and the readout circuit 230 by, for example, a via, a wiring, or the like.

Here, the connection pad 125 of the first substrate 71A is bonded to the connection pad 135 of the second substrate 72B by, for example, Cu—Cu bonding, thereby forming the bonding part 260. Then, the SPAD 210 of the first substrate 71A and the shield resistor part 211 of the second substrate 72B are electrically connected via the bonding part 260. Further, the first substrate 71A and the second substrate 72B are mechanically bonded by the bonding part 260.

The connection pad 135A of the second substrate 72B is bonded to the connection pad 136 of the third substrate 73A by, for example, Cu—Cu bonding, thereby forming the bonding part 260A. Then, the shield resistor part 211 of the second substrate 72B and the quench resistor part 212 and the readout circuit 230 of the third substrate 73A are electrically connected via the bonding part 260A. Further, the second substrate 72B and the third substrate 73A are mechanically bonded by the bonding part 260A.

In Modification Example 9 having the above configuration, the SPAD 210, the quench resistor part 212, and the readout circuit 230 are formed in the separate substrates, the SPAD 210 and the quench resistor part 212 are electrically connected via the bonding part 260, and the shield resistor part 211 and the quench resistor part 212 and the readout circuit 230 are electrically connected via the bonding part 260A. Here, the present embodiment is similar to the fourth embodiment in that the shield resistor part 211 has the resistance value Rsh larger than the resistance value $R_{ON}$ of the SPAD 210, and the quench resistor part 212 has the resistance value Rq larger than the resistance value Rsh of the shield resistor part 211.

Further, when the parasitic capacitance C1 generated on the side of an end electrically connected to the SPAD 210 out of both ends of the shield resistor part 211 is compared with the parasitic capacitance C2 generated on the side of the opposite end, the capacitance of the parasitic capacitance C2 becomes larger than the capacitance of the parasitic capacitance C1. This is because while the parasitic capacitance C2 includes a capacitance by the shield resistor part 211, a capacitance by the wiring connecting the shield resistor part 211 and the connection pad 135A, a capacitance by the bonding part 260A, and a capacitance by the wiring connecting the connection pad 136, the quench resistor part 212, and the readout circuit 230, the parasitic capacitance C1 merely includes a capacitance by the SPAD 210, a capacitance by the wiring connecting the SPAD 210 and the connection pad 125, and a capacitance by the bonding part 260.

Therefore, since relationships of the capacitance of the parasitic capacitance C1<the capacitance of the parasitic capacitance C2, the resistance value $R_{ON}$<the resistance value Rsh, and the resistance value Rsh<the resistance value Rq are satisfied, the same effects as the effects exhibited by the embodiments described above (including the modification examples) are also exhibited in Modification Example 9.

Modification Example 10

Figure 19C:
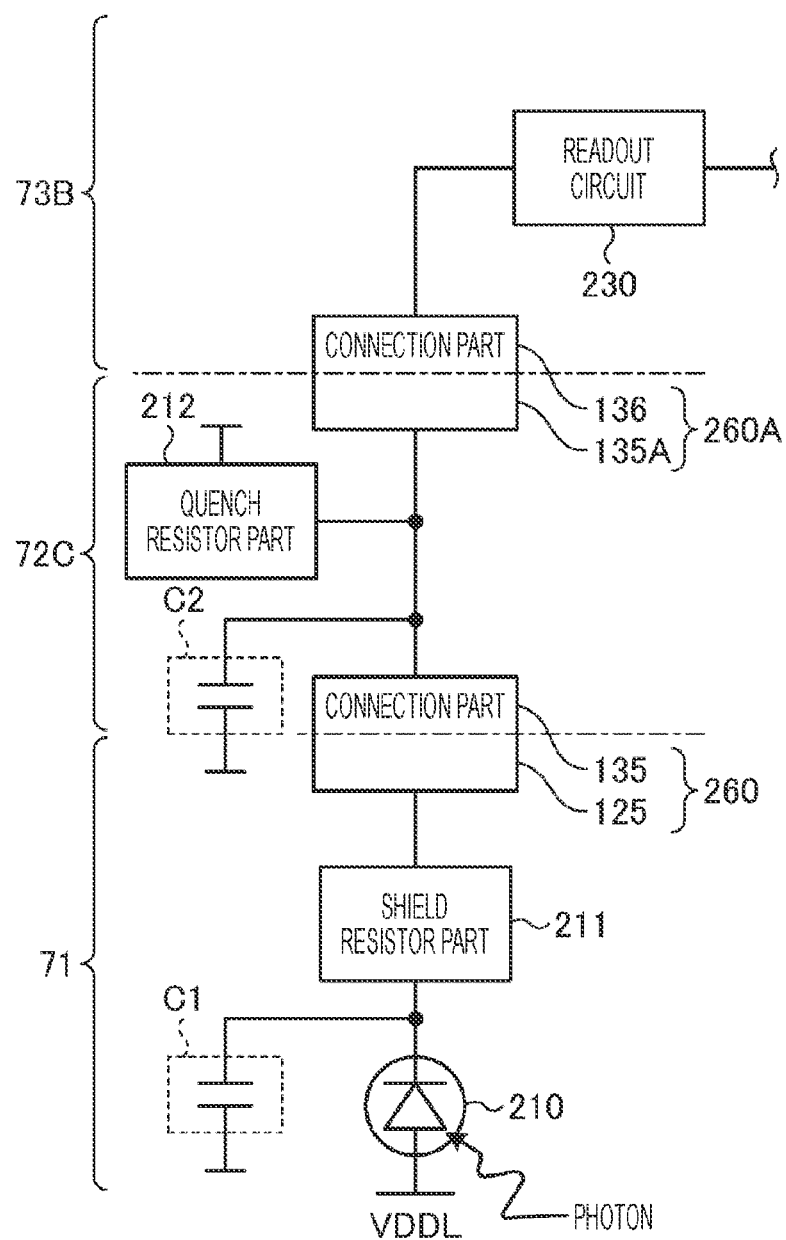
FIG. 19C is a block diagram illustrating Modification Example 10 of the pixel of the optical device according to the fourth embodiment.

FIG. 19C is a block diagram illustrating Modification Example 10 of the pixel of the optical device according to the fourth embodiment. As illustrated, the pixel in Modification Example 9 includes the first substrate 71, a second substrate 72C, and a third substrate 73B. The SPAD 210 and the shield resistor part 211 are provided in the first substrate 71, the quench resistor part 212 is provided in the second substrate 72C, and the readout circuit 230 is provided in the third substrate 73B. The first substrate 71 in the present modification example has the same configuration as the first substrate 71 in the fourth embodiment and Modification Example 8 thereof.

The second substrate 72C includes the connection pad 135 in a lower surface in FIG. 19C. In the present modification example, the lower surface of the connection pad 135 is flush with the lower surface of the second substrate 72C. Further, the second substrate 72C includes the connection pad 135A on an upper surface (surface opposite to the lower surface described above). In the present modification example, the upper surface of the connection pad 135A is flush with the upper surface of the second substrate 72C. The connection pad 135 and the connection pad 135A are connected to each other by, for example, a via, a wiring, or the like. Further, the connection pad 135 and the connection pad 135A are electrically connected to the quench resistor part 212.

The third substrate 73B includes the connection pad 136 in a lower surface in FIG. 19C. In the present modification example, the lower surface of the connection pad 136 is flush with the lower surface of the third substrate 73B. The connection pad 136 is connected to the readout circuit 230 by, for example, a via, a wiring, or the like.

Here, the connection pad 125 of the first substrate 71A is bonded to the connection pad 135 of the second substrate 72C by, for example, Cu—Cu bonding, thereby forming the bonding part 260. Then, the shield resistor part 211 of the first substrate 71A and the quench resistor part 212 of the second substrate 72C are electrically connected via the bonding part 260. Further, the first substrate 71A and the second substrate 72C are mechanically bonded by the bonding part 260.

The connection pad 135A of the second substrate 72C is bonded to the connection pad 136 of the third substrate 73B by, for example, Cu—Cu bonding, thereby forming the bonding part 260A. Then, the quench resistor part 212 of the second substrate 72C and the readout circuit 230 of the third substrate 73B are electrically connected via the bonding part 260A. Further, the second substrate 72C and the third substrate 73B are mechanically bonded by the bonding part 260A.

In Modification Example 10 having the above configuration, the SPAD 210, the quench resistor part 212, and the readout circuit 230 are formed in the separate substrates, the shield resistor part 211 and the quench resistor part 212 are electrically connected via the bonding part 260, and the quench resistor part 212 and the readout circuit 230 are electrically connected via the bonding part 260A. Here, the present embodiment is similar to the fourth embodiment in that the shield resistor part 211 has the resistance value Rsh larger than the resistance value $R_{ON}$ of the SPAD 210, and the quench resistor part 212 has the resistance value Rq larger than the resistance value Rsh of the shield resistor part 211.

Further, the parasitic capacitance C2 is generated between the connection pad 135 and the readout circuit 230, and the parasitic capacitance C1 is generated at the cathode of the SPAD 210. The parasitic capacitance C2 can include not only the capacitance by the bonding part 260, the capacitance by the wiring connecting the connection pad 135 and the connection pad 135A, and a capacitance by the quench resistor part 212 but also the capacitance by the bonding part 260A and the capacitance by the readout circuit 230. On the other hand, the parasitic capacitance C1 merely includes the capacitance by the SPAD 210, a capacitance by a wiring connecting the SPAD 210 and the shield resistor part 211, and the like. Thus, the parasitic capacitance C2 is larger than the parasitic capacitance C1.

Therefore, also in Modification Example 10, similarly to the fourth embodiment, the dead time can be shortened and the power consumption can be reduced while reducing the input voltage to the readout circuit 230.

Note that, in Modification Examples 8 to 10 of the fourth embodiment, the bonding of the connection pads by Cu—Cu bonding has been exemplified, but the connection pads may be connected to each other by metal pads. Further, the specific examples of the shield resistor part described with reference to FIGS. 7A and 7B, the specific examples of the quench resistor part described with reference to FIGS. 8A, 8B, and 8C, and the specific examples of the readout circuit described with reference to FIGS. 9A, 9B, and 9C can also be appropriately applied to the fourth embodiment (including the modification examples).

Application Example 1

The optical device according to the embodiments of the present disclosure described above can be applied to, for example, various electronic apparatuses such as an imaging apparatus such as a digital still camera or a digital video camera, a mobile phone having an imaging function, or another device having an imaging function.

Figure 20:
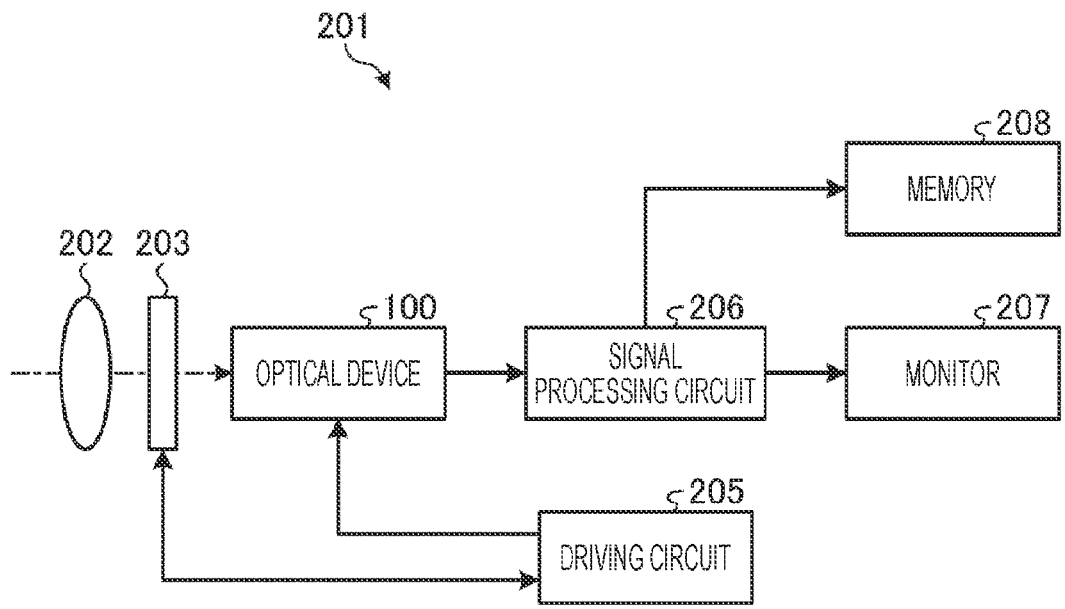
FIG. 20 is a schematic diagram illustrating an imaging apparatus as an electronic apparatus to which an optical device according to an embodiment of the present disclosure is applicable.

FIG. 20 is a block diagram illustrating a configuration example of an imaging apparatus as an electronic apparatus to which the present technology is applied. An imaging apparatus 201 illustrated in FIG. 20 includes an optical system 202, a shutter device 203, an optical device 100, a driving circuit 205, a signal processing circuit 206, a monitor 207, and a memory 208, and can capture a still image and a moving image.

The optical system 202 includes one or a plurality of lenses, guides light (incident light) from a subject to the optical device 100, and forms an image on a light receiving surface of the optical device 100.

The shutter device 203 is arranged between the optical system 202 and the optical device 100, and controls a light irradiation period and a light shielding period with respect to the optical device 100 according to the control of the driving circuit 205.

The driving circuit 205 outputs a driving signal for controlling the transfer operation of the optical device 100 and the shutter operation of the shutter device 203 to drive the optical device 100 and the shutter device 203.

The optical device 100 includes a light receiving element (pixel) according to each of the above-described embodiments (including the modification examples). For application to the imaging apparatus, the optical device 100 includes a digital counter circuit 240 (FIG. 4B) at the output end of the readout circuit 230. Under the control of the driving circuit 205, the optical device 100 counts the number of photons for every pixel by the digital counter circuit 240 depending on light formed on the light receiving surface through the optical system 202 and the shutter device 203 during a predetermined exposure period. The count number is converted into a luminance signal and transferred to the column circuit 310 through the bit line BL according to the selection signal supplied from the row scanning circuit 320 (FIG. 4A) to the word line WL of each pixel under the control of the driving circuit 205. The column circuit 310 converts the luminance signal from each pixel into a digital signal, and the converted digital signal is output to the signal processing circuit 206 through the interface circuit 330.

The signal processing circuit 206 performs various signal processing on the digital signal output from the optical device 100. An image (image data) obtained by performing the signal processing by the signal processing circuit 206 is supplied to and displayed on the monitor 207, or supplied to and stored (recorded) in the memory 208.

In the imaging apparatus 201 configured as described above, since the optical device 100 includes the light receiving element according to each of the above-described embodiments (including the modification examples), the imaging apparatus 201 can also exhibit the effects of reducing the dead time and reducing the power consumption. Note that a color filter may be provided on the light receiving surface of the optical device 100. In the color filter, a red filter that transmits red wavelength region light, a green filter that transmits green wavelength region light, and a blue filter that transmits blue wavelength light are formed corresponding to the light receiving elements (pixels) of the optical device 100. For example, a Bayer filter is exemplified as the color filter. By using such a color filter, the imaging apparatus 201 can be configured as an imaging apparatus capable of acquiring a color image.

Application Example 2

Figure 21:
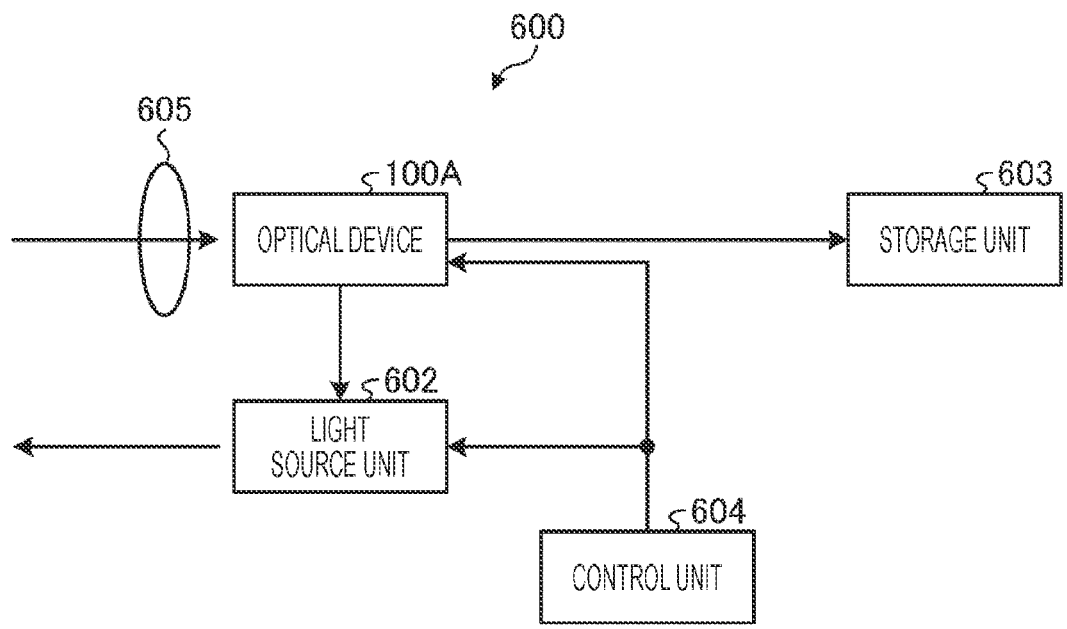
FIG. 21 is a block diagram illustrating a configuration example of a distance measurement apparatus as an electronic apparatus to which the optical device according to the embodiment of the present disclosure is applicable.

Next, as the electronic apparatus to which the present technology is applied, a distance measurement apparatus that performs distance measurement by the direct ToF method will be described. FIG. 21 is a block diagram illustrating a configuration example of a distance measurement apparatus 600 as the electronic apparatus to which the present technology is applied. As illustrated, the distance measurement apparatus 600 includes an optical device 100A, a light source unit 602, a storage unit 603, a control unit 604, and an optical system 605.

The light source unit 602 may be, for example, a vertical cavity surface emitting laser (VCSEL) array that emits laser light as a surface light source. However, the present invention is not limited thereto, and the light source unit 602 may be a laser diode array in which laser diodes are arranged on a line. In this case, the laser diode array is supported by a predetermined driving unit (not illustrated), and is scanned in a direction perpendicular to the arrangement direction of the laser diodes. Further, the light source unit 602 may be a single laser diode. In this case, the single laser diode is supported by a predetermined driving unit (not illustrated), and is scanned horizontally and vertically.

Figure 22:
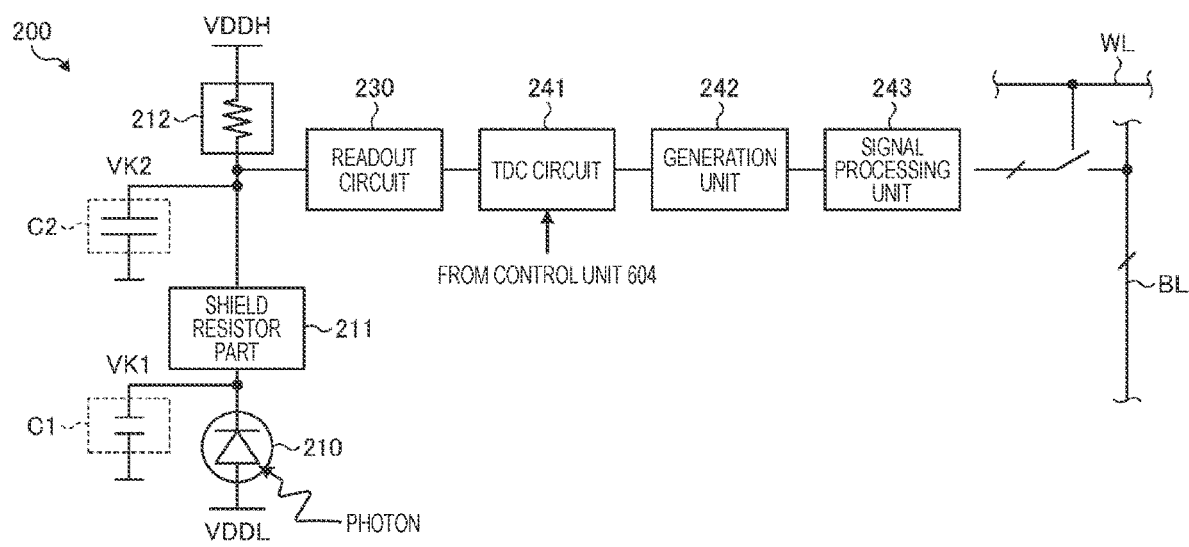
FIG. 22 is a block diagram illustrating a schematic configuration example of a pixel in a pixel array unit of an optical device of a distance measurement apparatus as an electronic apparatus to which the present technology is applied.

In the example of FIG. 22, the optical device 100A includes the pixel (light receiving element) 200 in the first embodiment. However, the optical device 100A may include pixels (light receiving elements) according to other embodiments (including modification examples). In the case of application to the distance measurement apparatus, the optical device 100A includes a TDC circuit 241, a generation unit 242, and a signal processing unit 243 sequentially connected in series to the output end of the readout circuit 230, as illustrated in FIG. 22, instead of the digital counter circuit 240 (FIG. 4B) described above. The functions of the TDC circuit 241, the generation unit 242, and the signal processing unit 243 will be described later.

The signal processing unit 243 performs predetermined calculation processing on the basis of data of a histogram (described later) generated by the generation unit 242, and calculates, for example, distance information. For example, the signal processing unit 243 creates curve approximation of the histogram on the basis of the data of the histogram generated by the generation unit 242. The signal processing unit 243 can detect a peak of a curve approximated by the histogram and obtain a distance D on the basis of the detected peak.

The storage unit 603 (FIG. 21) includes, for example, a flash memory, a DRAM, an SRAM, or the like, and stores data or the like input from the optical device 10.

The control unit 604 controls the entire operation of the distance measurement apparatus 600. For example, the control unit 604 supplies a predetermined reference signal having a predetermined frequency to the optical device 100 and the light source unit 602. The light source unit 602 emits pulsed light on the basis of a reference signal supplied from the control unit 604, for example. For example, the optical device 100 obtains the time difference between a light emission timing and a light reception timing on the basis of the reference signal described above and the output signal output from the readout circuit 230. Further, the control unit 604 sets a pattern at the time of distance measurement for the optical device 100 in response to an instruction from the outside, for example.

The optical system 605 guides light incident from the outside to the light receiving surface of the optical device 100.

Figure 23:
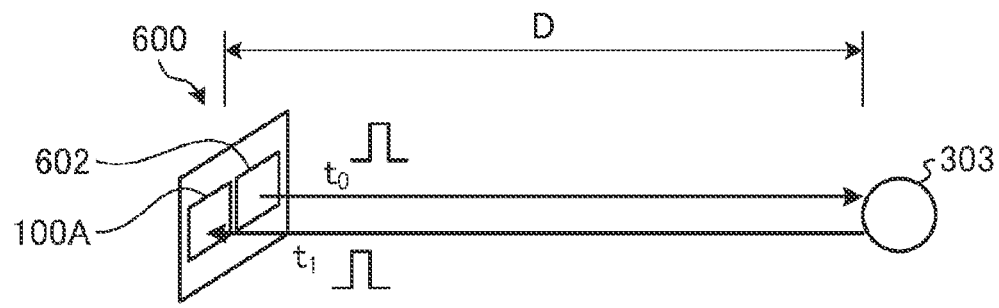
FIG. 23 is a diagram schematically illustrating distance measurement by a direct time of flight (ToF) method in the distance measurement apparatus as the electronic apparatus to which the present technology is applied.

Next, with reference to FIG. 23, as an example of distance measurement by the distance measurement apparatus 600, distance measurement by the direct ToF method will be described using a case where the distance measurement apparatus 600 measures the distance D from the distance measurement apparatus 600 to a measurement object 303 as an example. A time at which the light source unit 602 emits light is defined as a light emission timing to, and a time at which the optical device 100 receives reflected light obtained by reflecting the light emitted from the light source unit 602 by the measurement object 303 is defined as a light reception timing $t_1$. At this time, the distance D between the distance measurement apparatus 600 and the measurement object 303 can be calculated by the following Expression (1).

$$D = (c/2) \times (t_1 - t_0) \quad (1)$$

Here, the constant c is a light velocity ($2.9979 \times 10^8$ [m/sec]).

Incidentally, in the optical device 100A, when light (photon) is incident on the pixel 200, even if the light is light other than the reflected light (for example, ambient light) from the measurement object 303, an output signal is output from the readout circuit 230, and light reception timing is calculated by the TDC circuit 241 as described later. That is, the light reception timing $t_1$ calculated on the basis of the reflected light from the measurement object 303 and the light reception timing calculated on the basis of the light other than the reflected light cannot be distinguished.

Figure 24:
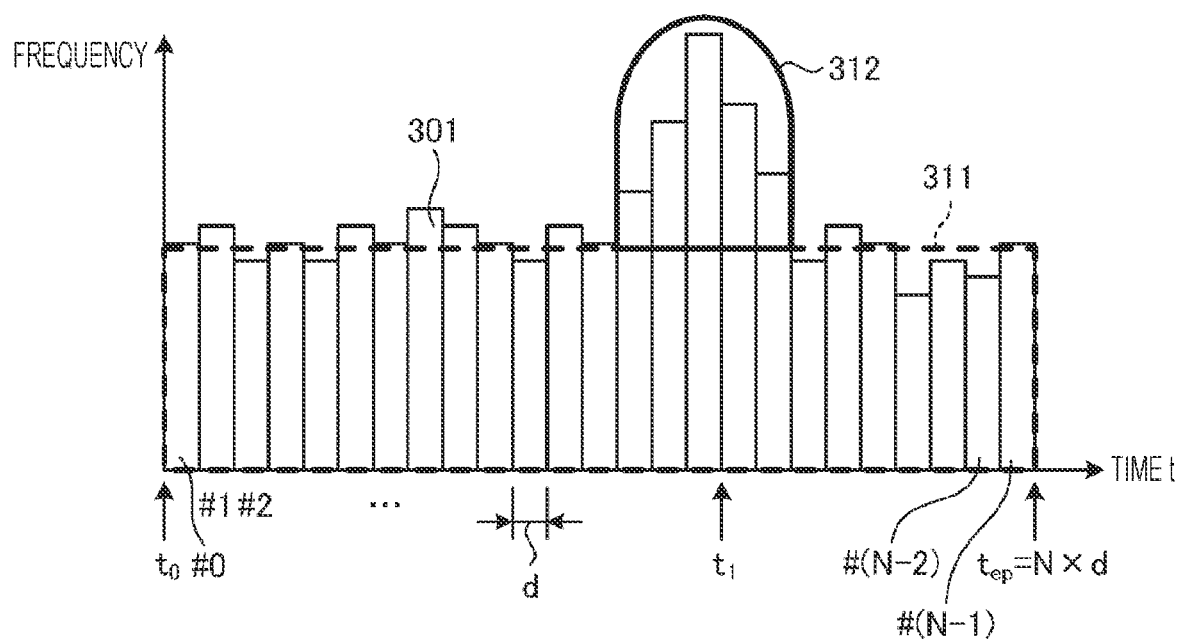
FIG. 24 is a diagram illustrating an example of a histogram based on light reception time generated in the distance measurement apparatus as the electronic apparatus to which the present technology is applied.

Accordingly, in the distance measurement apparatus 600, light is repeatedly emitted from the light source unit 602 (for example, several 100 to several tens of thousands of times), and a histogram relating to a difference between the light emission timing and the light reception timing is created. FIG. 24 is a diagram illustrating an example of the histogram created in this manner. As illustrated, the number of times (frequency) 301 of the light reception timing is illustrated for each of the sections #0, #1, #2, . . . , #(N−2), and #(N−1) having a predetermined unit time d. Here, the section #0 is a range of the time d from the light emission timing to, and the section #1 is a range of the time d from a time point when the time d has elapsed from the light emission timing to. Note that, in the drawing, a period from the light emission timing $t_0$ to $t_{ep}$ corresponds to the exposure time of the optical device 100.

Referring to FIG. 24, there is a section (hereinafter referred to as a section 312 for convenience) in which the number of light reception timings protrudes as compared with the adjacent section, as indicated by a curve 312, as compared with a range 311 indicated by a broken line. While the ambient light and the like are received randomly, the light emitted from the light source unit 602 and reflected by the measurement object 303 is received after the light is propagated by the distance of 2×D, and thus may occur when a certain range of time has elapsed although an error is included. Thus, the light reception timing $t_1$ corresponding to the reflected light from the measurement object 303 is considered to be included in the section 312. Accordingly, for example, as illustrated in the drawing, the end point of the section in which the maximum number of light reception timings in the section 312 is recorded can be set as the light reception timing $t_1$ based on the reflected light from the measurement object 303. The present invention is not limited to this, and the start time point or the center time point of the section in which the maximum number of light reception timings is recorded may be set as the light reception timing $t_1$. Further, in the section 312, an approximate curve of the number of light emission timings may be obtained, and the light emission timing $t_1$ may be obtained on the basis of a peak value thereof.

As described above, the light reception timing $t_1$ of the reflected light from the measurement object 303 can be obtained, and the distance D to the measurement object 303 can be calculated by Expression (1).

In a case where the above-described distance measurement by the direct ToF method is performed in the optical device 100A, the light reception timing is obtained by the TDC circuit 241. That is, the TDC circuit 241 generates a time difference signal indicating a time difference between the reference signal input from the control unit 604 and the output signal from the readout circuit 230. The reference signal from the control unit 604 is also input to the light source unit 602, and the light source unit 602 emits pulsed light on the basis of the reference signal. Thus, from the time difference signal generated in the TDC circuit 241, it is possible to obtain the light reception timing with reference to the light emission timing to at which the light source unit 602 emits the pulsed light.

The light emission based on the reference signal by the light source unit 602 and the light reception by the SPAD 210 are repeated, and a histogram relating to a difference between the light emission timing and the light reception timing obtained by the TDC circuit 241 is generated by the generation unit 242 every time. On the basis of the histogram created by the generation unit 242, the signal processing unit 243 determines the light reception timing $t_1$ and calculates the distance D.

Also in the distance measurement apparatus 600 configured as described above, since the optical device 100A includes the light receiving element according to each of the above-described embodiments (including the modification examples), the distance measurement apparatus 600 can also exhibit the effects of shortening the dead time and reducing the power consumption.

Application Example 3

The technology according to the present disclosure (the present technology) can be applied to various products. For example, the technology according to the present disclosure may be applied to an endoscopic surgery system.

Figure 25:
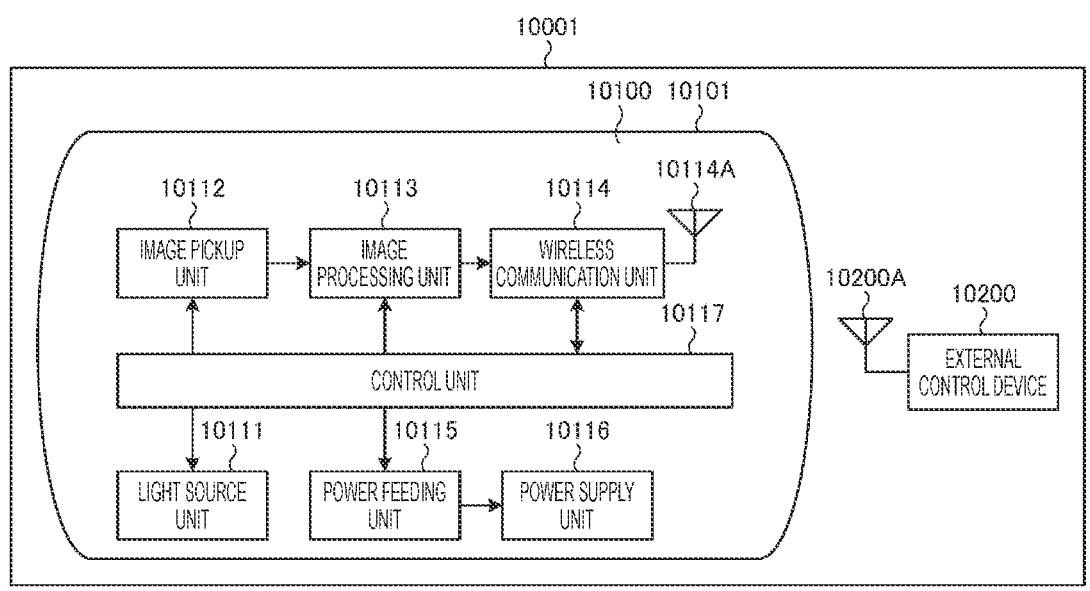
FIG. 25 is a block diagram illustrating an example of a schematic configuration of an in-vivo information acquisition system.

FIG. 25 is a block diagram illustrating an example of a schematic configuration of a patient in-vivo information acquisition system using a capsule type endoscope to which the technology according to the present disclosure (present technology) can be applied.

The in-vivo information acquisition system 10001 includes a capsule type endoscope 10100 and an external control device 10200.

The capsule type endoscope 10100 is swallowed by a patient at the time of examination. The capsule type endoscope 10100 has an imaging function and a wireless communication function and, while moving inside an organ such as a stomach and an intestine by peristaltic movement or the like until it is naturally excreted from the patient, sequentially captures images inside the organ (hereinafter also referred to as in-vivo images) at predetermined intervals, and sequentially transmits information regarding the in-vivo images wirelessly to the external control device 10200 outside the body.

The external control device 10200 integrally controls the operation of the in-vivo information acquisition system 10001. Further, the external control device 10200 receives information regarding the in-vivo images transmitted from the capsule type endoscope 10100, and generates image data for displaying the in-vivo images on a display apparatus (not illustrated) on the basis of the received information regarding the in-vivo images.

In the in-vivo information acquisition system 10001, in this manner, it is possible to obtain an in-vivo image obtained by imaging an in-vivo state of the body of the patient at any time from the time when the capsule type endoscope 10100 is swallowed until it is discharged.

Configurations and functions of the capsule type endoscope 10100 and the external control device 10200 will be described in more detail.

The capsule type endoscope 10100 includes a capsule type housing 10101, and a light source unit 10111, an image pickup unit 10112, an image processing unit 10113, a wireless communication unit 10114, a power feeding unit 10115, a power supply unit 10116, and a control unit 10117 are housed in the housing 10101.

The light source unit 10111 includes a light source such as a light emitting diode (LED), for example, and irradiates an imaging field of view of the image pickup unit 10112 with light.

The image pickup unit 10112 includes an image pickup element and an optical system including a plurality of lenses provided in front of the image pickup element. Reflected light (hereinafter referred to as observation light) of light emitted to a body tissue that is an observation target is condensed by the optical system and is incident on the image pickup element. In the image pickup unit 10112, the observation light incident on the image pickup element is photoelectrically converted, and an image signal corresponding to the observation light is generated. The image signal generated by the image pickup unit 10112 is provided to the image processing unit 10113.

The image processing unit 10113 includes a processor such as a central processing unit (CPU) or a graphics processing unit (GPU), and performs various signal processing on the image signal generated by the image pickup unit 10112. The image processing unit 10113 provides the image signal subjected to the signal processing to the wireless communication unit 10114 as RAW data.

The wireless communication unit 10114 performs predetermined processing such as modulation processing on the image signal that has been subjected to the signal processing by the image processing unit 10113, and transmits the image signal to the external control device 10200 via the antenna 10114A. Further, the wireless communication unit 10114 receives a control signal related to drive control of the capsule type endoscope 10100 from the external control device 10200 via the antenna 10114A. The wireless communication unit 10114 provides the control unit 10117 with the control signal received from the external control device 10200.

The power feeding unit 10115 includes a power receiving antenna coil, a power regeneration circuit that regenerates power from a current generated in the antenna coil, a booster circuit, and the like. In the power feeding unit 10115, power is generated using what is called non-contact charging principle.

The power supply unit 10116 includes a secondary battery, and stores the power generated by the power feeding unit 10115. In FIG. 25, in order to avoid complication of the drawing, illustration of an arrow or the like indicating a supply destination of power from the power supply unit 10116 is omitted, but the power stored in the power supply unit 10116 is supplied to the light source unit 10111, the image pickup unit 10112, the image processing unit 10113, the wireless communication unit 10114, and the control unit 10117, and can be used for driving these units.

The control unit 10117 includes a processor such as a CPU, and appropriately controls driving of the light source unit 10111, the image pickup unit 10112, the image processing unit 10113, the wireless communication unit 10114, and the power feeding unit 10115 according to the control signal transmitted from the external control device 10200.

The external control device 10200 includes a processor such as a CPU or GPU, or a microcomputer or a control board or the like on which a processor and a storage element such as a memory are mounted in a mixed manner. The external control device 10200 controls the operation of the capsule type endoscope 10100 by transmitting the control signal to the control unit 10117 of the capsule type endoscope 10100 via the antenna 10200A. In the capsule type endoscope 10100, for example, the control signal from the external control device 10200 can change irradiation conditions of light with respect to the observation target in the light source unit 10111. Further, imaging conditions (for example, a frame rate, an exposure value, and the like in the image pickup unit 10112) can be changed by the control signal from the external control device 10200. Further, the contents of processing in the image processing unit 10113 and conditions for transmitting the image signal by the wireless communication unit 10114 (for example, transmission interval, number of transmitted images, and the like) may be changed by the control signal from the external control device 10200.

Further, the external control device 10200 performs various image processing on the image signal transmitted from the capsule type endoscope 10100, and generates image data for displaying the captured in-vivo image on the display apparatus. As the image processing, for example, various signal processing such as development processing (demosaic processing), image quality enhancement processing (band enhancement processing, super-resolution processing, noise reduction (NR) processing, and/or camera shake correction processing, and the like), and/or enlargement processing (electronic zoom processing) and the like can be performed. The external control device 10200 controls driving of the display apparatus to display the in-vivo image captured on the basis of the generated image data. Alternatively, the external control device 10200 may have the generated image data recorded in a recording device (not illustrated) or printed out by a printing device (not illustrated).

The example of the in-vivo information acquisition system to which the technology according to the present disclosure can be applied has been described above. The technology according to the present disclosure can be applied to the image pickup unit 10112 among the configurations described above. Specifically, the optical device according to each of the above-described embodiments can be used as the image pickup unit 10112. According to the above-described optical device, it is possible to reduce the dead time of the SPAD 210 (or 210A). Therefore, if an optical device is used as the image pickup unit 10112, the imaging interval by the capsule type endoscope 10100 can be appropriately set. That is, it is possible to reduce the possibility that the SPAD 210 (or 210A) is in the dead time at the time of imaging by the capsule type endoscope 10100. Further, since the power consumption of the SPAD 210 can be reduced, the optical device 100 and the like can be reliably operated until the capsule type endoscope 10100 is naturally discharged after being swallowed by the patient.

Note that although the patient in-vivo information acquisition system using the capsule type endoscope has been described here, the technology according to the present disclosure may be applied to, for example, an endoscopic surgery system. Hereinafter, a case where the technology of the present disclosure is applied to an endoscopic surgery system will be described.

Application Example 4

Figure 26:
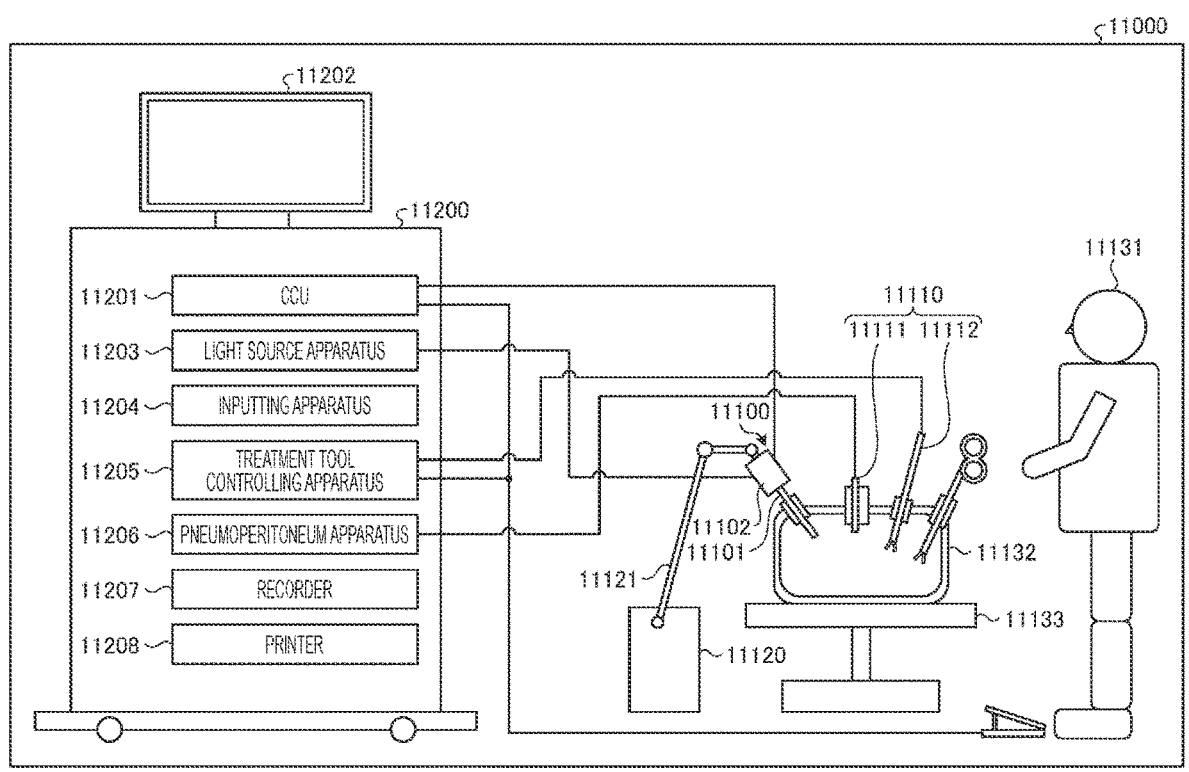
FIG. 26 is a diagram illustrating an example of a schematic configuration of an endoscopic surgery system.

FIG. 26 is a diagram illustrating an example of a schematic configuration of an endoscopic surgery system to which the technology according to the present disclosure (present technology) can be applied.

In FIG. 26, a state is illustrated in which a surgeon (medical doctor) 11131 is using an endoscopic surgery system 11000 to perform surgery for a patient 11132 on a patient bed 11133. As illustrated, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example illustrated, the endoscope 11100 is illustrated which includes as a rigid endoscope having the lens barrel 11101 of the hard type. However, the endoscope 11100 may otherwise be included as a flexible endoscope having the lens barrel of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel by a light guide extending in the inside of the lens barrel 11101 and is emitted toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a camera control unit (CCU) 11201.

The CCU 11201 includes a central processing unit (CPU), a graphics processing unit (GPU), or the like and integrally controls operation of the endoscope 11100 and a display apparatus 11202. Moreover, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are emitted time-divisionally on an observation target and driving of the image pickup elements of the camera head 11102 are controlled in synchronism with the emission timings. Then images individually corresponding to the R, G, and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to emit light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation with excitation light may be performed. In fluorescent observation, it is possible to perform observation of fluorescent light from a body tissue by emitting excitation light on the body tissue (autofluorescence observation) or to obtain a fluorescent light image by locally injecting a reagent such as indocyanine green (ICG) into a body tissue and emitting excitation light corresponding to a fluorescent light wavelength of the reagent upon the body tissue. The light source apparatus 11203 can be configured to supply such narrow-band light and/or excitation light suitable for special light observation as described above.

Figure 27:
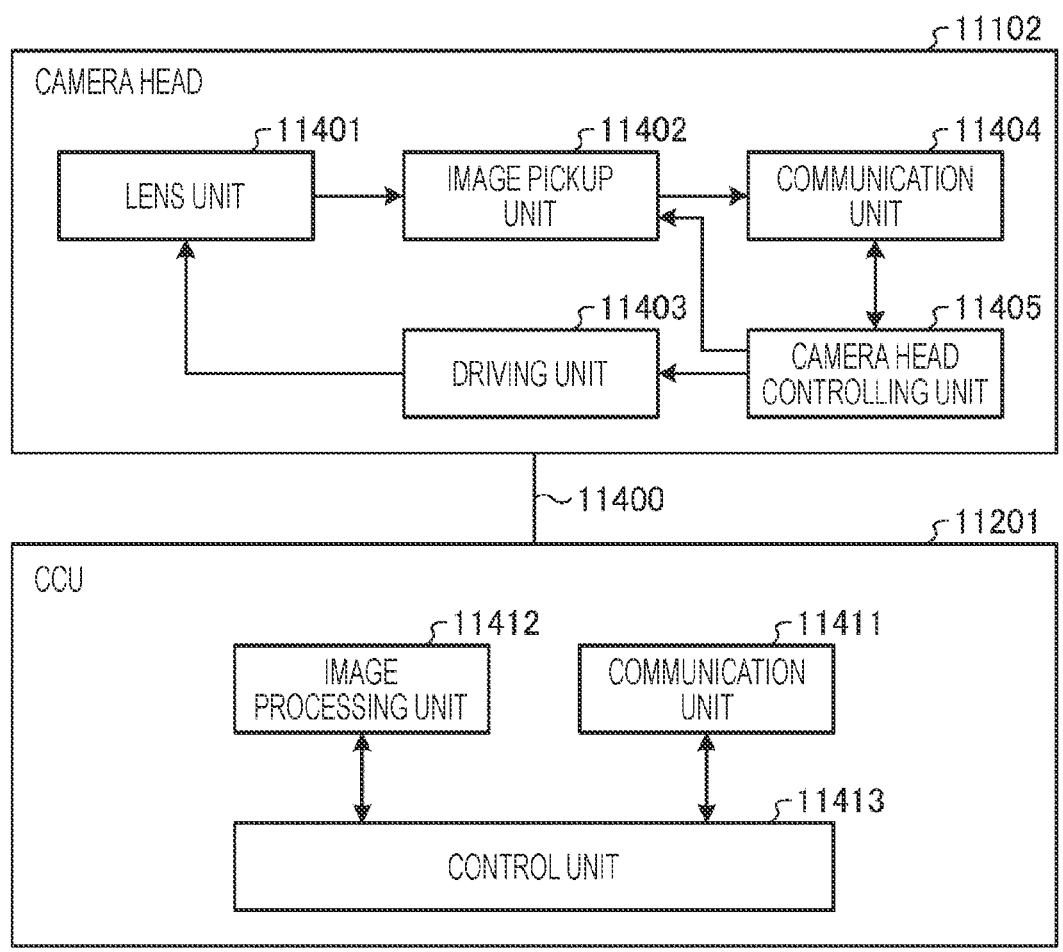
FIG. 27 is a block diagram illustrating an example of a functional configuration of a camera head and a CCU.

FIG. 27 is a block diagram illustrating an example of a functional configuration of the camera head 11102 and the CCU 11201 illustrated in FIG. 26.

The camera head 11102 includes a lens unit 11401, an image pickup unit 11402, a driving unit 11403, a communication unit 11404, and a camera head controlling unit 11405. The CCU 11201 includes a communication unit 11411, an image processing unit 11412, and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The image pickup unit 11402 includes an image pickup element. The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G, and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, in a case where the image pickup unit 11402 is configured as that of stereoscopic type, a plurality of systems of lens units 11401 is provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated, and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication, or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 causes, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy device 11112 is used, and so forth by detecting the shape, color, and so forth of edges of objects included in a picked up image. The control unit 11413 may cause, when it causes the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication, or a composite cable ready for both of electrical and optical communications.

Here, while, in the example illustrated, communication is performed by wired communication using the transmission cable 11400, the communication between the camera head 11102 and the CCU 11201 may be performed by wireless communication.

The example of the endoscopic surgery system to which the technology according to the present disclosure can be applied has been described above. The technology according to the present disclosure can be applied to the image pickup unit 11402 of the camera head 11102 among the above-described configurations. Specifically, the optical device according to each of the above-described embodiments can be used as the image pickup unit 11402. According to the above-described optical device, it is possible to reduce the dead time and save power. Thus, similar effects are exhibited by the endoscopic surgery system to which the optical device is applied.

Application Example 5

The technology according to the present disclosure (the present technology) can be applied to various products. For example, the technology according to the present disclosure may be achieved as a device (or a system) mounted on any type of mobile object such as an automobile, an electric vehicle, a hybrid electric vehicle, a motorcycle, a bicycle, a personal mobility, an airplane, a drone, a ship, a robot, and the like.

Figure 28:
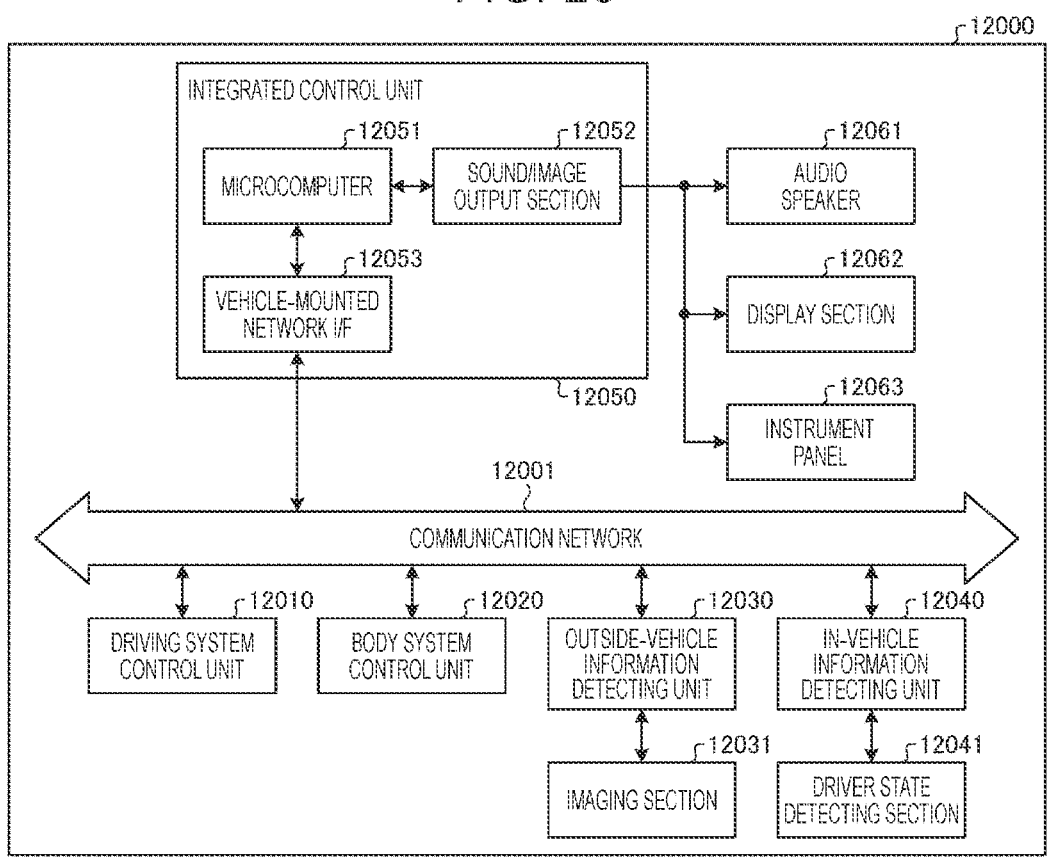
FIG. 28 is a block diagram illustrating an example of schematic configuration of a vehicle control system.

FIG. 28 is a block diagram illustrating a schematic configuration example of a vehicle control system which is an example of a moving body control system to which the technology according to the present disclosure can be applied.

The vehicle control system 12000 includes a plurality of electronic control units connected to each other via a communication network 12001. In the example illustrated in FIG. 28, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying an occupant of the vehicle or the outside of the vehicle of information. In the example of FIG. 28, an audio speaker 12061, a display section 12062, and an instrument panel 12063 are illustrated as the output device. The display section 12062 may, for example, include at least one of an on-board display or a head-up display.

Figure 29:
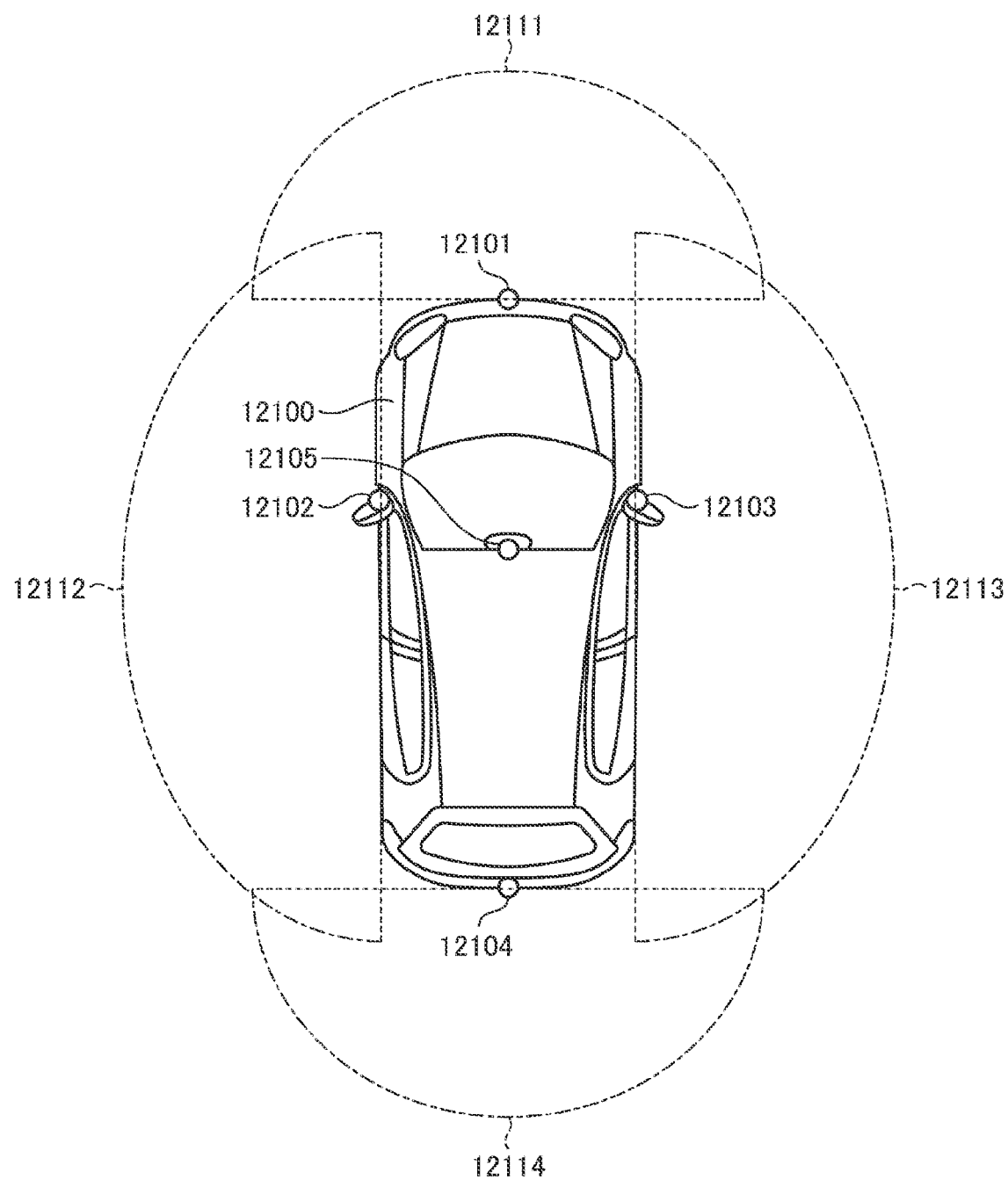
FIG. 29 is a diagram of assistance in explaining an example of installation positions of an outside-vehicle information detecting section and an imaging section.

FIG. 29 is a diagram illustrating an example of the installation position of the imaging section 12031.

In FIG. 29, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 29 illustrates an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Moreover, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, and other three-dimensional objects such as a utility pole on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. In addition, the sound/image output section 12052 may also control the display section 12062 so that an icon or the like representing the pedestrian is displayed at a desired position.

The example of the vehicle control system to which the technology according to the present disclosure can be applied has been described above. The technology according to the present disclosure can be applied to the imaging sections 12101 to 12104 among the above-described configurations. Specifically, the imaging element according to each of the above-described embodiments (including the modification examples) can be applied to the imaging sections 12101 to 12104. By applying the technology according to the present disclosure to the imaging sections 12101 to 12104, for example, a pedestrian can be recognized from slight light from the pedestrian even at night or in a dark place. Further, the effect that the power consumption can be reduced by the technology according to the present disclosure is particularly useful in a vehicle including a driving motor as a driving force generation device for generating a driving force of the vehicle.

Note that, in the above description, various effects exhibited by the light receiving element according to the embodiment of the present disclosure, the optical device including the light receiving element, and the electronic apparatus including the optical device are described, but such effects do not limit the present disclosure. Further, it is not necessary to exhibit all of the various effects. Further, additional effects not described herein may be exhibited by the light receiving element, the optical device, and the electronic apparatus of the present disclosure.

Note that the present technology can have configurations as follows.

(1)
A light receiving element including:
a photon response multiplication part that includes a charge multiplication region capable of multiplying a charge generated in response to incidence of a photon;
a first resistor part that is connected at one end to one end of the photon response multiplication part and has a resistance value larger than a resistance value of the photon response multiplication part;
a second resistor part that is connected at one end to the other end of the first resistor part; and
a connection point to which the other end of the first resistor part, the one end of the second resistor part, and a readout unit that reads an output from the photon response multiplication part are connected.

(2)
The light receiving element according to (1), in which the second resistor part has a resistance value larger than a resistance value of the first resistor part.

(3)
The light receiving element according to (1) or (2), in which
there is a first capacitance at the one end of the photon response multiplication part, and
there is a second capacitance at the other end of the first resistor part.

(4)
The light receiving element according to (3), in which each of the first capacitance and the second capacitance is configured by a variable capacitance element.

(5)
The light receiving element according to (4), in which the variable capacitance element includes one or a plurality of transistors.

(6)
The light receiving element according to (4), in which the one or plurality of transistors is metal oxide semiconductor transistors.

(7)
The light receiving element according to any one of (1) to (6), in which
the second resistor part includes
a switch provided between the readout unit and a power supply electrically connected to the other end of the second resistor part, and
a control unit that detects an output of the readout unit and controls the switch on the basis of a detection result.

(8)
The light receiving element according to any one of (1) to (6), in which the second resistor part is a constant current source.

(9)
The light receiving element according to any one of (1) to (8), in which the photon response multiplication part includes a single photon avalanche diode.

(10)
The light receiving element according to (9), in which the one end of the photon response multiplication part is a cathode or an anode of the single photon avalanche diode.

(11)
The light receiving element according to any one of (1) to (8), in which the photon response multiplication part includes a silicon photomultiplier tube.

(12)
The light receiving element according to any one of (1) to (11), in which the first resistor part is a polysilicon resistor part or a metal resistor part.

(13)
The light receiving element according to any one of (1) to (12), in which the first resistor part is formed by one or a plurality of transistors.

(14)
The light receiving element according to (13), in which the one or plurality of transistors is metal oxide semiconductor transistors.

(15)
The light receiving element according to (14), further including a voltage generation unit that applies a voltage for applying a gate voltage to a gate of the metal oxide semiconductor transistor.

(16)
The light receiving element according to any one of (1) to (15), further including:
a first substrate that includes a first connection part on one surface; and
a second substrate that includes a second connection part corresponding to the first connection part on one surface and is electrically and mechanically bonded to the first substrate by bonding of the first connection part and the second connection part, in which
the photon response multiplication part is provided in the first substrate, and
the readout unit is provided in the second substrate.

(17)
The light receiving element according to (16), in which
the first connection part and the second connection part include copper, and
the first connection part and the second connection part are bonded by a close contact of surfaces of the first connection part and the second connection part formed using copper with each other.

(18)
The light receiving element according to (16), in which the first connection part and the second connection part are bonded with metal bumps.

(19)
The light receiving element according to any one of (1) to (15), further including:
a first substrate that includes a first connection part on one surface;
a second substrate that includes a second connection part corresponding to the first connection part on one surface and a third connection part on a surface opposite to the one surface, and is electrically and mechanically bonded to the first substrate by bonding of the first connection part and the second connection part; and
a third substrate that includes a third connection part corresponding to the second connection part on one surface and is electrically and mechanically bonded to the second substrate by bonding of the second connection part and the third connection part, in which
the photon response multiplication part is provided in the first substrate.

(20)
The light receiving element according to (16) or (19), in which
the first substrate is provided with a plurality of the photon response multiplication parts, and
the plurality of the photon response multiplication parts is electrically connected to one of the readout circuits.

(21)

The light receiving element according to any one of (1) to (20), in which a counting unit that counts the number of outputs of a signal from the readout unit is connected to an output end of the readout unit.

(22)

The light receiving element according to any one of (1) to (20), in which a time-to-digital converter that generates a digital signal indicating a time difference between a reference signal having a predetermined frequency and another signal generated on the basis of the reference signal is connected to an output end of the readout unit.

(23)

An optical device including a plurality of light receiving elements that is arranged in a matrix, in which each of the plurality of light receiving elements includes:
  a photon response multiplication part that includes a charge multiplication region capable of multiplying a charge generated in response to incidence of a photon;
  a first resistor part that is connected at one end to one end of the photon response multiplication part and has a resistance value larger than a resistance value of the photon response multiplication part;
  a second resistor part that is connected at one end to the other end of the first resistor part; and
  a connection point to which the other end of the first resistor part, the one end of the second resistor part, and a readout unit that reads an output from the photon response multiplication part are connected.

(24)

An electronic apparatus including:
  an optical system; and
  an optical device in which a plurality of light receiving elements is arranged in a matrix, in which each of the plurality of light receiving elements includes
  a photon response multiplication part that includes a charge multiplication region capable of multiplying a charge generated in response to incidence of a photon that has transmitted through the optical system,
  a first resistor part that is connected at one end to one end of the photon response multiplication part and has a resistance value larger than a resistance value of the photon response multiplication part,
  a second resistor part that is connected at one end to the other end of the first resistor part, and
  a connection point to which the other end of the first resistor part, the one end of the second resistor part, and a readout unit that reads an output from the photon response multiplication part are connected.

(25)

An electronic apparatus including:
  an optical system;
  a light emitting unit configured to emit light on the basis of a reference signal having a predetermined frequency; and
  an optical device in which a plurality of light receiving elements is arranged in a matrix, in which each of the plurality of light receiving elements includes
  a photon response multiplication part that includes a charge multiplication region capable of multiplying a charge generated in response to incidence of a photon that has transmitted through the optical system,
  a first resistor part that is connected at one end to one end of the photon response multiplication part and has a resistance value larger than a resistance value of the photon response multiplication part,
  a second resistor part that is connected at one end to the other end of the first resistor part,
  a connection point to which the other end of the first resistor part, the one end of the second resistor part, and a readout unit that reads an output from the photon response multiplication part are connected, and
  a time-to-digital converter that generates a digital signal indicating a time difference between the reference signal and the output read by the readout unit from the photon response multiplication part via the first resistor part.

REFERENCE SIGNS LIST

1 Electronic apparatus
10 Optical device
11 Pixel array unit
12 Driving circuit
13 Output circuit
15 Timing control circuit
20, 200, 200A, 200B Pixel
21 Photodiode (SPAD)
22 Quench resistor
23 Readout circuit
30 Imaging lens
40, 603 Storage unit
50 Processor
71 First substrate
72 Second substrate
LS Output signal line
LD Pixel driving line
100 Optical device
101 Semiconductor substrate
102 Photoelectric conversion region
103 N− type semiconductor region
104 P type semiconductor region
105 P+ type semiconductor region
106 N+ type semiconductor region
107 Cathode contact
108 Anode contact
109 Insulating film
110 Element isolation portion
111 Light shielding film
113 Pinning layer
114 Planarization film
115 Color filter
116 On-chip lens
120, 130 Wiring layer
121 Cathode electrode
122 Anode electrode
125, 135, 135A, 136 Connection pad
210, 210A Single photon avalanche diode (SPAD)
211 Shield resistor part
211A Resistance element
211B P-channel MOS transistor
211C N-channel MOS transistor
212 Quench resistor part
212A Constant current source
212B Active recharge circuit
212S Switch
212C Control unit
230 Readout circuit
230A Inverter
240 Digital counter circuit
241 TDC circuit
242 Generation unit
243 Signal processing unit 250 Bias voltage generation unit
260 Bonding part
310 Column circuit
320 Row scanning circuit
330 Interface circuit
600 Distance measurement apparatus
602 Light source unit
604 Control unit
605 Optical system
PAR Pixel array unit
$BL_0, BL_1, \ldots, BL_S$, BL Bit line
$WL_0, WL_1, \ldots, WL_N$, WL Word line
C1, C2 Parasitic capacitance
$R_L, R_S$ Resistor
IVT Inverter
C01 Cathode parasitic capacitance
C02 Input parasitic capacitance
VC1, VC2 Variable capacitance element
201 Imaging apparatus
202 Optical system
203 Shutter device
205 Driving circuit
206 Signal processing circuit
207 Monitor
208 Memory

The invention claimed is:

1. A light receiving element, comprising:
a photon response multiplication part that includes a charge multiplication region configured to multiply a charge generated based on incidence of a photon;
a first resistor part having a first end and a second end, wherein
the first end of the first resistor part is connected to a first end of the photon response multiplication part, and
a first resistance value of the first resistor part is larger than a second resistance value between a cathode and an anode of the photon response multiplication part;
a second resistor part having a first end, wherein
the first end of the second resistor part is connected to the second end of the first resistor part; and
a connection point to which the second end of the first resistor part, the first end of the second resistor part, and a readout unit are connected, wherein
the readout unit is configured to read an output from the photon response multiplication part.

2. The light receiving element according to claim 1, wherein the second resistor part has a third resistance value larger than the first resistance value of the first resistor part.

3. The light receiving element according to claim 1, wherein
the first end of the photon response multiplication part has a first capacitance, and
the second end of the first resistor part has a second capacitance.

4. The light receiving element according to claim 3, further comprising a variable capacitance element that configures each of the first capacitance and the second capacitance.

5. The light receiving element according to claim 4, wherein the variable capacitance element includes one or more transistors.

6. The light receiving element according to claim 1, wherein the second resistor part includes:
a switch between the readout unit and a power supply, wherein
the switch is configured to electrically connect the power supply and a second end of the second resistor part; and
a control unit configured to detect an output of the readout unit and control the switch based on a detection result.

7. The light receiving element according to claim 1, wherein the second resistor part is a constant current source.

8. The light receiving element according to claim 1, wherein the photon response multiplication part includes a single photon avalanche diode.

9. The light receiving element according to claim 8, wherein the first end of the photon response multiplication part is one of the cathode or the anode of the single photon avalanche diode.

10. The light receiving element according to claim 1, wherein the photon response multiplication part includes a silicon photomultiplier tube.

11. The light receiving element according to claim 1, wherein the first resistor part is one of a polysilicon resistor part or a metal resistor part.

12. The light receiving element according to claim 1, wherein the first resistor part includes one or more transistors.

13. The light receiving element according to claim 1, further comprising:
a first substrate that includes a first connection part on a first surface of the first substrate; and
a second substrate that includes a second connection part, corresponding to the first connection part, on a first surface of the second substrate, wherein
the second connection part of the second substrate is electrically and mechanically bonded to the first connection part of the first substrate,
the photon response multiplication part is in the first substrate, and
the readout unit is in the second substrate.

14. The light receiving element according to claim 13, wherein
the first connection part and the second connection part include copper, and
the first connection part is bonded with the second connection part by a close contact of surfaces of the first connection part and the second connection part.

15. The light receiving element according to claim 13, wherein the first connection part and the second connection part are bonded with metal bumps.

16. The light receiving element according to claim 1, further comprising:
a first substrate that includes a first connection part on a first surface of the first substrate;
a second substrate that includes a second connection part, corresponding to the first connection part, on a first surface of the second substrate and a third connection part on a second surface opposite to the first surface of the second substrate, wherein second connection part of the second substrate is electrically and mechanically bonded to the first connection part of the first substrate; and
a third substrate that includes a fourth connection part, corresponding to the second connection part, on a first surface of the third substrate, wherein the fourth connection part of the third substrate is electrically and mechanically bonded to the third connection part of the second substrate, wherein
the photon response multiplication part is provided in the first substrate.

17. The light receiving element according to claim 1, further comprises a counting unit connected to an output end of the readout unit, wherein the counting unit is configured to count number of outputs of a signal from the readout unit.

18. The light receiving element according to claim 1, further comprises a time-to-digital converter connected to an output end of the readout unit, wherein the time-to-digital converter is configured to generate a digital signal indicating a time difference between a reference signal having a specific frequency and first signal generated based on the reference signal.

19. An optical device, comprising:
a plurality of light receiving elements arranged in a matrix, wherein each of the plurality of light receiving elements includes:
a photon response multiplication part that includes a charge multiplication region configured to multiply a charge generated based on incidence of a photon;
a first resistor part having a first end and a second end, wherein
the first end of the first resistor part is connected to a first end of the photon response multiplication part, and
a first resistance value of the first resistor part is larger than a second resistance value between a cathode and an anode of the photon response multiplication part;
a second resistor part having a first end, wherein the first end of the second resistor part is connected to the second end of the first resistor part; and
a connection point to which the second end of the first resistor part, the first end of the second resistor part, and a readout unit are connected, wherein
the readout unit is configured to read an output from the photon response multiplication part.

20. An electronic apparatus, comprising:
an optical system; and
an optical device that includes a plurality of light receiving elements, wherein
photons transmitted through the optical system are incident on the plurality of light receiving elements,
the plurality of light receiving elements is arranged in a matrix, and
each of the plurality of light receiving elements includes:
a photon response multiplication part that includes a charge multiplication region configured to multiply a charge generated based on incidence of a photon that has transmitted through the optical system;
a first resistor part having a first end and a second end, wherein
the first end of the first resistor part is connected to a first end of the photon response multiplication part, and
a first resistance value of the first resistor part is larger than a second resistance value between a cathode and an anode of the photon response multiplication part;
a second resistor part having a first end, wherein the first end of the second resistor part is connected to the second end of the first resistor part; and
a connection point to which the other second end of the first resistor part, the first end of the second resistor part, and a readout unit are connected, wherein
the readout unit is configured to read an output from the photon response multiplication part.

* * * * *